(12) United States Patent
Wang et al.

(10) Patent No.: US 11,120,319 B2
(45) Date of Patent: Sep. 14, 2021

(54) UNIQUELY IDENTIFIABLE ARTICLES OF FABRIC AND SOCIAL NETWORKS EMPLOYING THEM

(71) Applicant: Advanced Functional Fabrics of America, Cambridge, MA (US)

(72) Inventors: Tairan Wang, Chelmsford, MA (US); Tosha Hays, Atlanta, GA (US); Yoel Fink, Brookline, MA (US); Alexander Stolyarov, Belmont, MA (US); Mihai Ibanescu, Somerville, MA (US)

(73) Assignee: Advanced Functional Fabrics of America, Inc., Cambridge, MA (US)

( * ) Notice: Subject to any disclaimer, the term of this patent is extended or adjusted under 35 U.S.C. 154(b) by 0 days.

(21) Appl. No.: 16/457,075

(22) Filed: Jun. 28, 2019

(65) Prior Publication Data

US 2019/0325279 A1   Oct. 24, 2019

Related U.S. Application Data

(63) Continuation of application No. PCT/US2018/012193, filed on Jan. 3, 2018.
(Continued)

(51) Int. Cl.
*G06K 19/06* (2006.01)
*G06T 7/13* (2017.01)
*G06T 11/00* (2006.01)

(52) U.S. Cl.
CPC . *G06K 19/06103* (2013.01); *G06K 19/06028* (2013.01); *G06T 7/13* (2017.01);
(Continued)

(58) Field of Classification Search
CPC .......... G06K 19/027; G06K 19/06028; G06K 19/06037; G06K 19/06103;
(Continued)

(56) References Cited

U.S. PATENT DOCUMENTS

| 4,397,142 A | 8/1983 | Bingham |
| 4,766,301 A | 8/1988 | Evers |

(Continued)

FOREIGN PATENT DOCUMENTS

| CN | 202351910 U | 7/2012 |
| EP | D919650 A1 | 6/1999 |

(Continued)

OTHER PUBLICATIONS

"Announcing Popcode 0.8" URL =<http://web.archive.org/web/20100903145835/http://www.popcode.info/>.
(Continued)

*Primary Examiner* — Thien T Mai
(74) *Attorney, Agent, or Firm* — Nutter McClennen & Fish LLP

(57) ABSTRACT

An article is a selected one of a set of articles. Each article of the set includes a fabric and is associated with a unique identification code. The selected article has a pattern distributed over at least 10% of an exposed surface of the selected article. The pattern encodes the identification code associated with the selected article, wherein the pattern is configured to be read and decoded by a mobile computing device in a manner wherein the selected article is contextually recognizable. A two-dimensional plaid pattern may be used to carry the identification code, which can be decoded according to described methods.

20 Claims, 51 Drawing Sheets

Related U.S. Application Data

(60) Provisional application No. 62/442,283, filed on Jan. 4, 2017, provisional application No. 62/521,150, filed on Jun. 16, 2017.

(52) U.S. Cl.
CPC .... *G06T 11/00* (2013.01); *G06T 2207/20021* (2013.01); *G06T 2207/30204* (2013.01)

(58) Field of Classification Search
CPC G06K 9/00671; G06K 2209/27; G06T 11/00; G06T 2207/30204; G06T 7/13; G06T 2207/20021

See application file for complete search history.

(56) References Cited

U.S. PATENT DOCUMENTS

| | | | |
|---|---|---|---|
| 5,592,561 | A | 1/1997 | Moore |
| 5,726,435 | A | 3/1998 | Hara et al. |
| 5,854,148 | A | 12/1998 | Asada et al. |
| 6,141,441 | A | 10/2000 | Cass et al. |
| 6,296,022 | B1 | 10/2001 | Lowe |
| 6,301,044 | B1 | 10/2001 | Huber et al. |
| 6,315,202 | B2 | 11/2001 | Costin et al. |
| 6,641,053 | B1 | 11/2003 | Breidenbach et al. |
| 6,647,130 | B2 | 11/2003 | Rhoads |
| 6,656,319 | B1 | 12/2003 | Boyd et al. |
| 7,032,823 | B2 | 4/2006 | Nojiri |
| 7,066,644 | B2 | 6/2006 | Padgett |
| 7,194,327 | B2 | 3/2007 | Lam |
| 7,195,165 | B2 | 3/2007 | Kesler et al. |
| 7,310,885 | B2 | 12/2007 | Tedesco et al. |
| 7,409,769 | B2 | 8/2008 | Tedesco et al. |
| 7,802,313 | B2 | 9/2010 | Czajka |
| 8,094,870 | B2 | 1/2012 | Crookham et al. |
| 8,229,799 | B2 | 7/2012 | Singhal |
| 8,261,972 | B2 | 9/2012 | Ziegler |
| 8,945,328 | B2 | 2/2015 | Longinotti-Buitoni et al. |
| 9,390,358 | B1 | 7/2016 | Cheung |
| 9,416,468 | B2 | 8/2016 | Bassi |
| 9,562,998 | B2 | 2/2017 | Edmonds et al. |
| 9,607,199 | B2 | 3/2017 | Stein |
| 10,607,052 | B2 | 3/2020 | Broselow |
| 2003/0106985 | A1 | 6/2003 | Fagin et al. |
| 2004/0115430 | A1 | 6/2004 | Leonard |
| 2004/0157686 | A1 | 8/2004 | Sauer |
| 2006/0169783 | A1 | 8/2006 | Gagne |
| 2006/0249582 | A1 | 11/2006 | Golabek et al. |
| 2007/0033697 | A1 | 2/2007 | Soldwedel |
| 2010/0192433 | A1 | 8/2010 | Lewis |
| 2010/0319712 | A1 | 12/2010 | Czajka |
| 2011/0073655 | A1* | 3/2011 | Simske ............ G06K 19/06028 235/462.32 |
| 2012/0085829 | A1 | 4/2012 | Ziegler |
| 2012/0146784 | A1 | 6/2012 | Hines et al. |
| 2012/0212789 | A1 | 8/2012 | Shirakura et al. |
| 2013/0037609 | A1 | 2/2013 | Merritt-Munson et al. |
| 2013/0117909 | A1 | 5/2013 | Paas |
| 2013/0254966 | A1 | 10/2013 | Pattison |
| 2014/0103123 | A1 | 4/2014 | McKinney, Jr. |
| 2014/0203085 | A1 | 7/2014 | Park |
| 2014/0358806 | A1 | 12/2014 | DiVincenzo et al. |
| 2015/0010725 | A1 | 1/2015 | Vogt et al. |
| 2015/0106290 | A1 | 4/2015 | Stevenson |
| 2015/0145671 | A1 | 5/2015 | Cohen et al. |
| 2015/0186965 | A1 | 7/2015 | Paul |
| 2015/0231481 | A1 | 8/2015 | Jones et al. |
| 2016/0128156 | A1 | 5/2016 | Segers |
| 2017/0037546 | A1* | 2/2017 | Lau ................. G06K 19/027 |
| 2017/0233904 | A1 | 8/2017 | Weening et al. |
| 2017/0283662 | A1 | 10/2017 | Nelson et al. |
| 2019/0213369 | A1 | 7/2019 | Ackley et al. |

FOREIGN PATENT DOCUMENTS

| | | |
|---|---|---|
| EP | 1158452 A2 | 11/2001 |
| EP | 2163286 A2 | 3/2010 |
| JP | 2006249638 A | 9/2006 |
| WO | 1997026619 A1 | 7/1997 |
| WO | 2000048139 A1 | 8/2000 |
| WO | 2014098130 A1 | 6/2014 |
| WO | 2014126654 A1 | 8/2014 |
| WO | 2016108221 A1 | 7/2016 |
| WO | 2017008435 A1 | 1/2017 |
| WO | 2017042628 A1 | 3/2017 |
| WO | 2018/129051 A1 | 7/2018 |
| WO | 2019/240867 A1 | 12/2019 |

OTHER PUBLICATIONS

"Emma Marrone & QR Tribe—Internet Promo" URL =<https://vimeo.com/20891404>.

"LED Buttons" URL =<https://www.aliexpress.com/item/758118749.html>.

"LED Illuminated Pushbutton—30 mm Round" URL =<https://www.adafruit.com/product/492>.

"QR Code Version 1 to 10" (QR Code) 2010 (2010); retrieved from the internet Feb. 21, 2018; entire document, especially Table.

"Reed-Solomon Error-correcting Codes The Deep Hole Problem" (KETI) Nov. 8, 2012 (Nov. 8, 2012); retrieved from the internet Feb. 21, 2018; URL=<https://www.math.uci.edu/~mketi/research/advancementsummary.pdf>; especially 1 Introduction to Error-correcting Codes paragraph 1 p. 2, and QR Codes p. 7.

"Smartphone Augmented Reality Marker by Augment" (Augment) Jul. 27, 2016 (Jul. 27, 2016); retrieved from the Internet Feb. 21, 2018; URL=<https://www.youtube.com/watch?v=uavpTPciYb0>; entire video, especially ~0:09-0:30.

"Zappar—Augmented Virtual & Mixed Reality Solutions" URL =<www.zappar.com>.

Bruzzese, Cosimo. "Emma Marrone & QR Tribe—Internet Promo," Vimeo, Viemo Inc., 2001, https://vimeo.com/20891404.

Horn, Leslie. "Those Who Wear a QR Code T-Shirt Deserve Nothing Ridicule," Gizmodo, Gizmodo Media Group, Jun. 25, 2012, http://gizmodo.com/5921094/those-who-wear-a-qr-code-t-shirt-deserve-nothing-but-ridicule.

International Search Report and Written Opinion for Application No. PCT/US18/12193 dated May 2, 2018 (19 pages).

International Search Report and Written Opinion for Application No. PCT/US2019/026549 dated Aug. 2, 2019 (10 pages).

Kinney, Chance. "Wear Your Heart on Your Sleeve With QRTribe Apparel," ChipChick, Chip Chick Media, Jun. 25, 2012, http://www.chipchick.com/2012/06/qrtribe-apparel.html?utm_source=rss&utm_medium=rss&utm_campaign=qrtribe-apparel.

Kooser, Amanda. "Scan My Bosom with ScanMe's QR Code T-shirts". URL =<https://www.cnet.com/news/scan-my-bosom-with-scanmes-qr-code-t-shirts/>.

Larson, Julie. "Dynamic QR Codes: Reuse the Same QR Code" URL =<https://www.searchenginepeople.com/blog/dynamic-qr-codes.html>.

Tine "Black and White Stickers" URL =<https://shop.tinetag.com/products/tine-tags-100-pack?variant=10614640580>.

Wikipedia "Scan (company)". URL =<https://en.m.wikipedia.org/wiki/Scan_(organisation)>.

Wikipedia "Shotcode". URL =<https://en.m.wikipedia.org/wiki/ShotCode>.

Wikipedia "Steganography" URL =<https://en.wikipedia.org/wiki/Steganography>.

Wikipedia "Visible Light Communication" URL =<https://en.wikipedia.org/wiki/Visible_light_communication>.

Chow, Chi-Wai et al. "Visible Light Communication Using Mobile-Phone Camera with Data Rate Higher than Frame Rate". Optical Society of America. vol. 23, No. 20. 2015.

Pathak, Parth H. et al. "Visible Light Communication, Networking, and Sensing: A Survey, Potential and Challenges". IEEE Communications Surverys & Tutorials. vol. 17, No. 4. Fourth Quarter 2015.

(56) References Cited

OTHER PUBLICATIONS

Zhang, Jialiang et al. "Towards a Visible Light Network Architecture for Continuous Communication and Localization". URL =<https://dl.acm.org/doi/pdf/10.1145/2981548.2981556>.

* cited by examiner

As processed by the software based on known spectral content

As seen by the eye

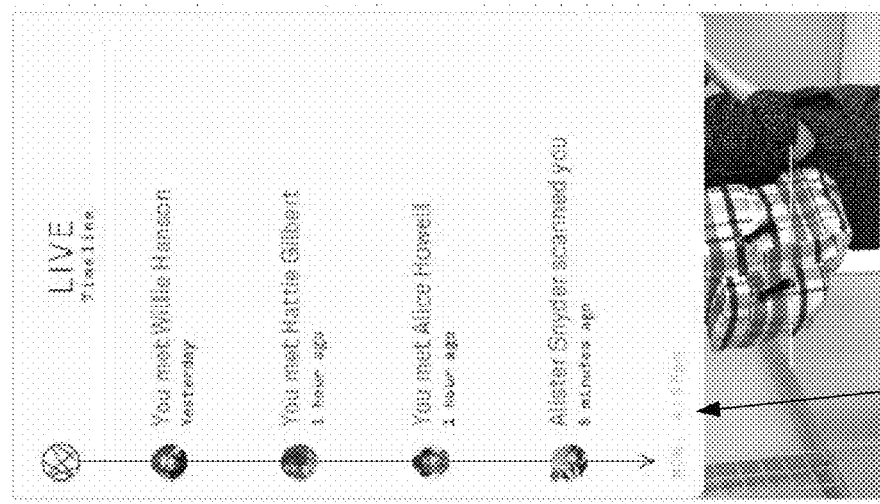
FIG. 34A  FIG. 34B  FIG. 34C
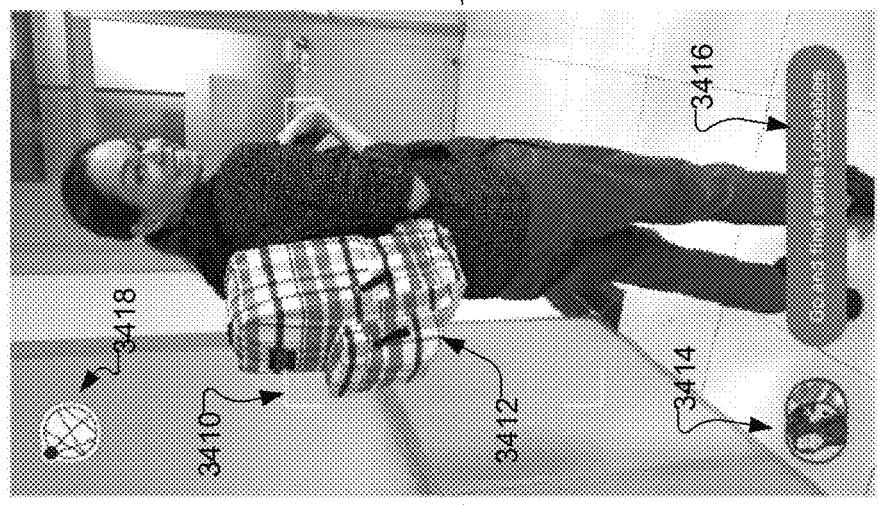
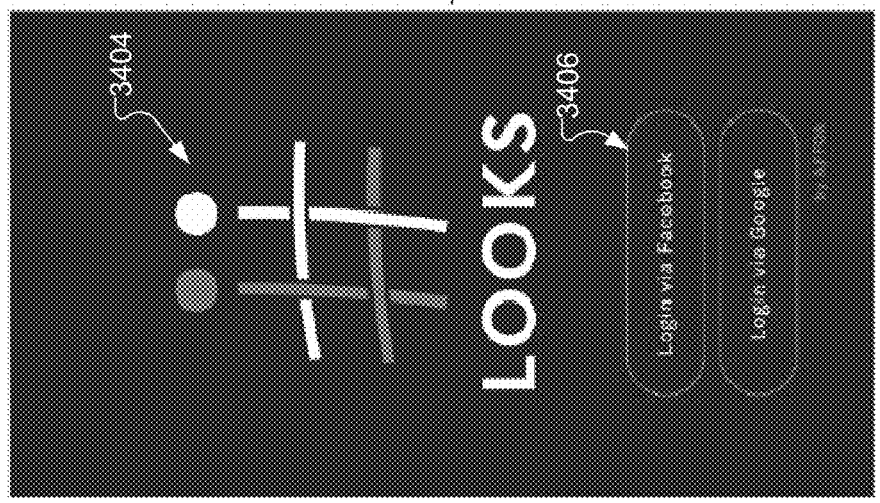

UNIQUELY IDENTIFIABLE ARTICLES OF FABRIC AND SOCIAL NETWORKS EMPLOYING THEM

CROSS-REFERENCE TO RELATED APPLICATION(S)

This patent application is a continuation of International Application PCT/US2018/012193 having an international filing date of Jan. 3, 2018, which claims priority from U.S. Provisional Patent Application No. 62/442,283 filed Jan. 4, 2017 and also claims priority from U.S. Provisional Patent Application No. 62/521,150 filed Jun. 16, 2017. Each of these patent applications is hereby incorporated herein by reference in its entirety.

STATEMENT AS TO FEDERALLY FUNDED RESEARCH

This invention was made with U.S. Government support under Agreement No. W15QKN-16-3-0001 awarded by the ACC-NJ. The Government has certain rights in the invention.

TECHNICAL FIELD

The present invention relates to methods and systems for unique identification of articles of fabric, and more particularly to use of such methods and systems in the context of social networking.

SUMMARY OF THE EMBODIMENTS

In accordance with one embodiment of the invention, there is provided an article, the article being a selected one of a set of articles. In this embodiment, each article of the set includes a fabric and is associated with a unique identification code. Additionally, the selected article has a pattern distributed over at least 10% of an exposed surface of the selected article. In this embodiment, the pattern encodes the identification code associated with the selected article, wherein the pattern is configured to be read and decoded by a mobile computing device in a manner wherein the selected article is contextually recognizable.

In a related embodiment, the identification code is represented in the pattern in a large format, wherein each item of information content in the identification code is represented in the pattern by a set of attributes, each attribute of the set of attributes having a minimum dimension of 1 mm.

In yet another related embodiment, each attribute of the set of attributes has a minimum dimension of 2 mm. Optionally, each attribute of the set of attributes has a minimum dimension of 3 mm. Optionally, the pattern is distributed over at least 30% of the exposed surface of the selected article.

In a further related embodiment, the exposed surface of the selected article includes a front and a back of the selected article. Optionally, the pattern includes an error correction code. Alternatively or in addition, the error correction code is a forward error correction code.

Optionally, the pattern includes a repetition of encoding of the identification code. Further optionally, the pattern encodes a minimum of 24 bits of information comprising the identification code. Optionally, the pattern encodes a minimum of 32 bits of information comprising the identification code. Also optionally, the pattern encodes a minimum of 64 bits of information comprising the identification code.

In a related embodiment, the unique identification code, encoded by the pattern, was transmitted by a server system for use in manufacturing of the article. In a further related embodiment, the unique identification code has been associated with an owner of the article by updating information in the server system in connection with a sale of the article to the owner.

In yet another related embodiment, the pattern is not discernible to an ordinary unaided human observer.

Optionally, the pattern includes a plurality of horizontal lines having varying thickness, spacing, and color, wherein the plurality of horizontal lines extending over at least 80% of a first dimension of the exposed surface of the article of clothing. Also optionally, the article of clothing is from a group consisting of a shirt, jacket, sweater, and vest, wherein the first dimension is parallel to a line drawn from shoulder-to-shoulder of the article of clothing.

In another embodiment, the invention provides a server-based method for identifying a specific article of fabric in a social context, the method includes computer processes which include:

receiving at a server system a request message, from a first instance of a fabric identification application executing on a mobile computing device of a regarding individual who has caused the mobile computing device to capture an image in which at least a part of the specific article appears, the request message containing identity data corresponding to a pattern on the article, the pattern encoding a unique identification code associated with the specific article and the pattern configured to render the article contextually recognizable, processing by the server system the identity data, in relation to a database system storing identification codes for a set of articles in relation to corresponding user information, to identify a specific user associated with the specific article of fabric; and sending by the server system a reply message to the application executing on the mobile computing device that, consistent with permissions of the specific user, includes user-defined content, such content defined by the specific user.

Optionally, the user-defined content includes personal information concerning the specific user. Also optionally, the user-defined content includes music selected according to preferences of the specific user.

In a related embodiment, the invention provides a method that further includes, before sending the reply message by the server system:

receiving by the server system, from the first instance of the fabric identification application executing on the mobile computing device of the regarding individual, first geolocation data defining a location of the computing device of the regarding individual;

receiving, by the server system, from a second instance of the fabric identification application executing on a mobile computing device of the specific user, second geolocation data defining a location of the specific user's computing device;

processing by the server system the first and second geolocation data to determine if the mobile computing device of the regarding individual is within a predetermined distance from the specific user's mobile computing device, and, if not within the predetermined distance, configuring the reply message to convey denial of permission to provide personal information about the specific user.

In a further related embodiment, the method includes sending by the server system, after receiving the identity data, to the application executing on the mobile computing device, a confirmatory message including validity information associated with the identity data.

In yet a further related embodiment, the identity data has been derived by the application executing on the mobile computing device from a processed version of the image, the processed version being a result of processing of the image on the mobile computing device.

In another related embodiment, the method includes receiving by the server system the image captured by the mobile computing device and processing by the server system the image to derive the identity data. Optionally, the method further includes configuring by the server system the reply message to the application to initiate a request to a third-party application executing on the mobile computing device using the identity data.

In yet another embodiment, the method includes, if the permissions of the specific user prevent the personal information about the specific user from being included in the reply message, configuring, by the server system, the reply message to redirect the application executing on the mobile computing device of the regarding individual to cause other appropriate content to be displayed thereon.

In another related embodiment, wherein the user-defined content includes a plurality of content items, a specific one thereof being selected, for transmission to the mobile computing device of the regarding individual, according to a set of selection criteria specified by the specific user. Optionally, the set of selection criteria includes an identity of the regarding individual. Also optionally, the set of selection criteria includes an item selected from the group consisting of time of day of receipt by the server system of the request message, date of such receipt, geolocation of the mobile computing device of the regarding individual, and combinations thereof.

In yet another related embodiment, the reply message includes at least some third party-defined content. Optionally, the at least some third party-defined content includes advertising.

In another related embodiment, the fabric identification application is a portion of a social network application, wherein a first instance of the social network application is executing on the mobile computing device of the regarding individual.

In a further related embodiment, the fabric identification application is a portion of a social network application, wherein a first instance of the social network application is executing on the mobile computing device of the regarding individual and a second instance of the social network application is executing on the mobile computing device of the specific user.

In another embodiment, the invention provides a server-based method for identifying a specific article of fabric in a social context, the method comprising computer processes including:

receiving at a server system a request message, from a first instance of a fabric identification application executing on a mobile computing device of a regarding individual who has caused the mobile computing device to capture an image in which at least a part of the specific article appears, the request message containing identity data corresponding to a pattern on the article, the pattern encoding a unique identification code associated with the specific article and the pattern configured to render the article contextually recognizable, processing by the server system the identity data, in relation to a database system storing identification codes for a set of articles in relation to corresponding user information, to identify a specific user associated with the specific article of fabric; and sending by the server system a reply message to the application executing on the mobile computing device that, consistent with permissions of the specific user, includes third party-defined content.

In another embodiment, the invention provides a method for alerting a regarding individual having a first mobile computing device that an encoded pattern is present in an article of clothing of a specific user having a second mobile computing device, the encoded pattern not discernible to an ordinary unaided human observer, the method comprising initiating wireless communication from the first mobile computing device to the second mobile computing device, the wireless communication including an alert viewable on a fabric identification application executing on the first mobile computing device that the encoded pattern is not discernible to the ordinary unaided human observer.

In another embodiment, the invention provides a fabric onto which has been impressed a pattern, the pattern including at least one repeatable unit wherein the repeatable unit includes, in a first direction, a first leading strip and a first set of associated data strips and, in a second direction, a second leading strip and a second set of associated data strips, the second direction distinct from the first direction, each data strip having a set of stripes shaped to convey data, each stripe defined by a first transition edge from a first color to a second color and a second transition edge from the second color to a third color, the first transition having a distance D1 from a leading edge of the data strip and the second transition having a distance D2 from the leading edge of the data strip, wherein D2>D1, and D1 and D2 collectively encode data. Optionally, this embodiment includes all of the features associated with the embodiment described in the first paragraph of this Summary of Embodiments. Also optionally, the first and second directions correspond to local directions associated with a warp and a weft of the fabric respectively, and the warp and weft directions vary over at least a portion of the fabric.

In a related embodiment, the first and second directions are orthogonal to one another. Optionally, the first direction is vertical and the second direction is horizontal.

In another related embodiment, the first set encodes data distinct from the data encoded by the second set.

In yet another related embodiment, each of the first and second leading strips comprises stripes of the first and second color, the first leading strip having a stripe of the first color with a minimum width W1 and the second leading strip having a stripe of the first color with a minimum width W2, wherein W1 does not equal W2.

In another related embodiment, the repeatable unit has no more than three data strips in the first set and no more than three data strips in the second set. Optionally, the repeatable unit has a dimension of at least 75 mm in the first direction and a dimension of at least 75 mm in the second direction.

In yet another related embodiment, the repeatable unit has a dimension of at least 75 mm in the first direction and a dimension of at least 75 mm in the second direction.

In another related embodiment, the surface has a dimension and the pattern includes no more than five repeatable units along the dimension. Optionally, the surface has a dimension and the pattern includes no more than ten repeatable units along the dimension.

In yet another related embodiment, the repeatable unit has no more than five data strips in the first set and no more than five strips in the second set. Optionally, the repeatable unit has no more than eight data strips in the first set and no more than eight strips in the second set.

In another embodiment, the invention provides a tangible item onto which has been applied a pattern, the pattern including at least one repeatable unit wherein the repeatable unit includes, in a first direction, a first leading strip and a first set of associated data strips and, in a second direction, a second leading strip and a second set of associated data strips, the second direction distinct from the first direction, each data strip having a plurality of stripes shaped to convey data, each stripe defined by a first transition edge from a first color to a second color and a second transition edge from the second color to a third color, the first transition having a distance D1 from a leading edge of the data strip and the second transition having a distance D2 from the leading edge of the data strip, wherein D2>D1, and D1 and D2 collectively encode data.

In another related embodiment, the repeatable unit has no more than three data strips in the first set and no more than three data strips in the second set. Optionally, the repeatable unit has a dimension of at least 75 mm in the first direction and a dimension of at least 75 mm in the second direction.

In yet another related embodiment, the repeatable unit has a dimension of at least 75 mm in the first direction and a dimension of at least 75 mm in the second direction.

In another related embodiment, the surface has a dimension and the pattern includes no more than five repeatable units along the dimension. Optionally, the surface has a dimension and the pattern includes no more than ten repeatable units along the dimension.

In yet another related embodiment, the repeatable unit has no more than five data strips in the first set and no more than five strips in the second set. Optionally, the repeatable unit has no more than eight data strips in the first set and no more than eight strips in the second set.

In another embodiment, there is provided a method of decoding an image of a pattern in fabric, the pattern encoding text, the image having been captured by a camera, the method carried out to capture the encoded text and employing computer processes. In this embodiment, the method includes:
  selecting a first portion of the image for analysis;
  slicing the image into sub-images; and
  processing each of the sub-images.
In turn, processing each of the sub-images includes:
  locating edge boundaries of the sub-image;
  mapping the edge boundaries into a set of symbols; and
  determining for each decoded symbol set, determining whether it applies to a weft or to a warp.

In a further related embodiment, processing each of the sub-images further comprises validating each symbol set for closeness of fit and validating each symbol set against a set of design rules. In another related embodiment, processing each of the sub-images further comprises collecting votes for symbol candidates for each sub-image and determining a wining symbol candidate for reach sub-image.

BRIEF DESCRIPTION OF THE DRAWINGS

The patent or application file contains at least one drawing executed in color. Copies of this patent with color drawings(s) will be provided by the Patent and Trademark Office upon request and payment of the necessary fee. Unless the context otherwise suggests, in these drawings, like elements are indicated by like numerals. The drawings and the elements depicted therein are not necessarily drawn to consistent scale or to any scale.

The foregoing features of embodiments will be more readily understood by reference to the following detailed description, taken with reference to the accompanying drawings, in which:

FIG. 34A is an exemplary start screen for an exemplary application interface. FIG. 34B is an exemplary scan screen for the exemplary application interface. FIG. 34C is an exemplary timeline screen for the exemplary application interface.

FIG. 41A illustrates a fabric in which there has been embedded, in two distinct dimensions, a unit of the pattern in accordance with an embodiment of the present invention;

FIG. 41B illustrates another embodiment of a fabric in which the pattern has been altered so that the two distinct components are presented in two distinct horizontal rows and yet the pattern remains decodable;

FIG. 41C illustrates yet another embodiment of a fabric in which the pattern has been further altered so that the components are presented in a manner having an arbitrarily oriented repetition and yet the pattern remains decodable;

In FIG. 45A, the fabric of a chair is shown to have impressed thereon an encoded pattern, and in FIG. 45B, this code is used to produce an augmented reality experience in which an avatar and name associated with the code are caused to overlie the image of the pattern;

FIG. 45C shows that the avatar can follow the fabric pattern even when the wearer of the fabric is in motion;

In FIG. 45D, the fabric pattern is associated with a backpack and the avatar, name, and greeting are displayed over the pattern of the backpack.

In FIG. 45E, there are present three different backpacks, each with a different pattern, and the augmented reality system overlays on each distinct pattern a distinct name and avatar associated with the distinct pattern;

DETAILED DESCRIPTION OF SPECIFIC EMBODIMENTS

Figure 2:
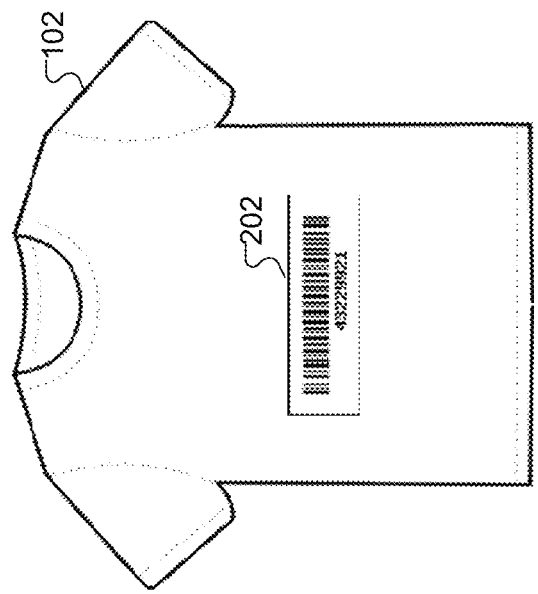
FIG. 2 is a diagram of an exemplary embodiment of an article of clothing having a pattern embedded with a unique identification code in form of a barcode.

Definitions. As used in this description and the accompanying claims, the following terms shall have the meanings indicated, unless the context otherwise requires:

A "fabric" is a flexible material that is made of woven or knitted yarn or threads or filaments or of felted fibers.

A "set" includes at least one member.

The "exposed surface" of an article is a portion of the entire surface of an article that is normally visible to an observer when the article is in normal use. In cases where the article is a garment worn by a human, the exposed surface of the article includes the front, back, and sides of the garment, but only those portions thereof that are normally visible to an ordinary observer when the garment is worn. (For this definition, we assume that the wearer of the article is standing and that the observer has an opportunity to walk 360 degrees around the wearer, and is approximately the same height as the wearer.) In a case where the garment is a coat, for example, the exposed surface of the garment includes the front, back, and sides of the coat, but excludes (a) the under-arm region of the coat, (b) the contiguous portion of the sleeve of the coat that faces the coat when the arms of the wearer of the coat are hanging straight down, and (c) the portion of the side of the coat that is covered when the arms of the wearer of the coat are hanging straight down. The exposed surface of the coat also excludes, for example, the entire interior of the coat.

A pattern encodes, in an article, an identification code in a "large format" wherein each item of information content in the identification code is represented in the pattern by a set of attributes wherein each attribute has a minimum dimension of 1 mm.

A pattern that is "configured to be readable and decodable by a mobile computing device" need not in practice actually be read and decoded by the mobile computing device as long as the pattern is capable of being read and decoded by the mobile computing device. Thus, in some applications, equipment other than a mobile computing device can be used to read and decode the pattern, such as a computer coupled to a digital imaging device having a telephoto lens.

A specific article of fabric is "contextually recognizable" if a mobile computing device having a typical camera with a resolution of at least 8 megapixels can read, while the article is in normal use and at a distance of at least 2 m from the mobile computing device, a pattern on the article that enables identifying the article in a manner that distinguishes the specific article from other articles.

A "mobile computing device" is any device selected from the group consisting of a smartphone, a tablet computer, and a portable computer, such device including a camera.

A pattern on an article of fabric encoding a unique identification code is "not discernable" to an ordinary unaided human observer if (a) this observer is unable to see any features of the pattern (as, for example, when the pattern exists only in the infrared region of the spectrum) or (b) features of the pattern do not appear to this observer as encoding information (as, for example, when the pattern is visible to this observer but appears to be either random or regular).

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

To "impress a pattern" onto fabric includes establishing a pattern on the fabric by weaving or knitting, applying the pattern to the fabric by printing or embossing or other means, and adhering to the fabric a decal having the pattern. To "impress a pattern" onto a tangible item includes establishing a pattern on the tangible item by weaving or knitting (when compatible with the nature of the item), applying the pattern to the item by printing or embossing or other means, and adhering to the item a decal having the pattern.

A "leading strip" of a repeatable unit of a pattern impressed on a tangible item is a strip having spatial properties that mark the presence of the repeatable unit on the item. The leading strip is used to identify a set of associated data strips. Although a leading strip can be considered to fall at the boundary of the repeatable unit, in fact, it is valuable, for decoding purposes, to consider that the actual position of the leading strip in the repeatable unit is arbitrarily located. The reason for this conceptualization is to address a circumstance wherein the leading strip cannot conveniently be recognized at a boundary of the unit.

A "color" of a pattern refers to a characteristic spectral content of the pattern involving electromagnetic energy in any or all of the visible, ultraviolet, or infrared spectra, and any other spectra of electromagnetic energy, in which the energy is subjected by the pattern to a process selected from the group consisting of reflection, absorption, transmission, and combinations thereof.

In the case of "a stripe defined by a first transition edge from a first color to a second color and a second transition edge from the second color to a third color," the third color need not be distinct from the first color. In such a case, the stripe would have a width defined by the second color and appear against a background defined by the first color. On the other hand, the first color can also be distinct from the third color.

A "tangible item" includes any item having a physical existence, including an item of fabric, a display of a computing device, a billboard, a pamphlet, a briefcase, a backpack, a messenger bag, a piece of luggage, etc.

A unit of a pattern is "repeatable" when (i) the unit includes a first set of components of which each component includes a leading strip and a set of associated data strips conforming to a symbol constellation distinct to such set of components and (ii) further instances of the set of components may optionally be present, but, if present, need not be oriented in the same direction or have the same overall size as the first set of components.

Figure 1:
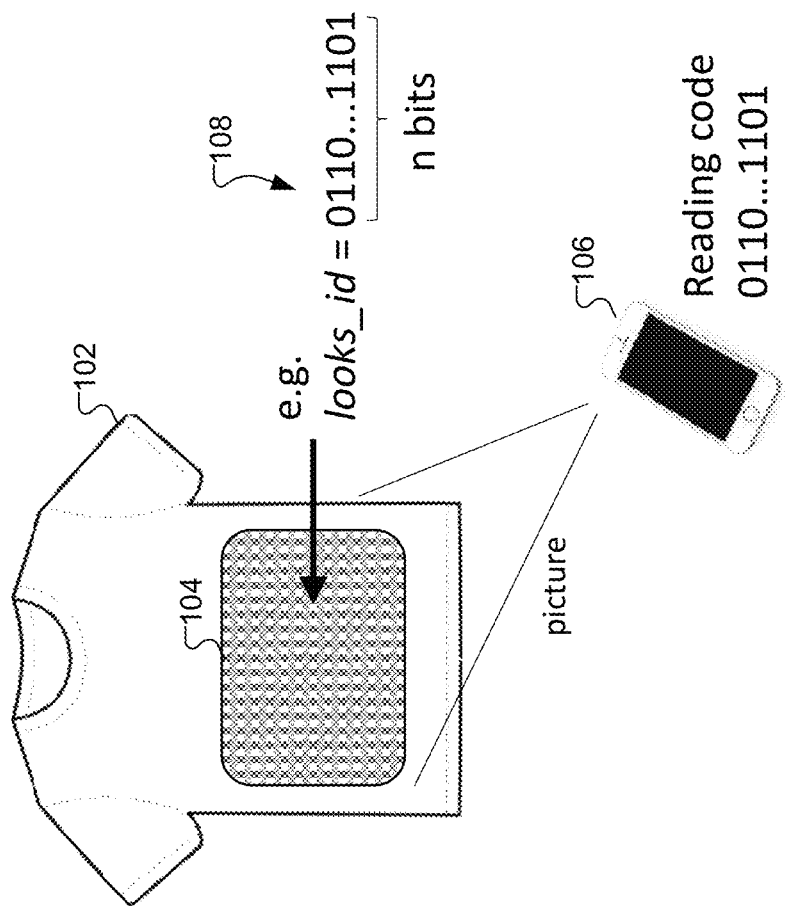
FIG. 1 is a diagram of an exemplary embodiment of a fabric-based article of clothing having a pattern and a mobile computing device interacting with the article of clothing.

FIG. 1 is a diagram of an exemplary embodiment of a fabric-based article of clothing 102 having a pattern 104 and a mobile computing device 106 interacting with the article of clothing 102. (In a manner similar to an article of clothing, other tangible items may be fabric-based and may similarly have such a pattern. Furthermore the tangible items need not be fabric-based.) The article of clothing 102 is associated with a unique identification code 108 (the "looks_id"). The unique identification code 108 is embedded in the article 102 in the form of a pattern 104 that can be optically read by the mobile computing device 106. The number of unique identification codes that can exist is a function of the number of bits in the code. For example, for a code with n=32 bits, there are $2^{32}$=4.3 billion unique combinations. For a code with n=64 bits, there are $2^{64}$=1.8× $10^{19}$ unique combinations. Note that the pattern 104 on each article of clothing 102 is encoded with a unique identification code 108. This unique identification code 108 can be linked to user-determined information corresponding to the user or owner of the article of clothing 102. The user information can include user name, user picture, user email, etc.

FIG. 2 is a diagram of an exemplary embodiment of an article of clothing 102 having a pattern 202 embedded with a unique identification code in form of a barcode. This barcode subscribes to the Code 128 barcode symbology. Note that this barcode pattern 202 is distributed over at least 10% of the exposed surface of the article of clothing 102, allowing the pattern 202 to be scanned by a mobile computing device 106 at a distance to return information about the user or wearer of the article of clothing 102. In embodiments, for a pattern 202 to be resolved by the camera of mobile computing device 106, the minimum dimension of the attributes of the barcode is at least 1 mm. For example, the bars of the barcode pattern 202 have widths of at least 1 mm (drawing in FIG. 2 not to scale). In other embodiments, for a pattern 202 to be resolved by the camera of mobile computing device 106, the minimum dimension of the attributes of the barcode is at least 2 mm. In yet other embodiments, for a pattern 202 to be resolved by the camera of mobile computing device 106, the minimum dimension of the attributes of the barcode is at least 3 mm.

Figure 3:
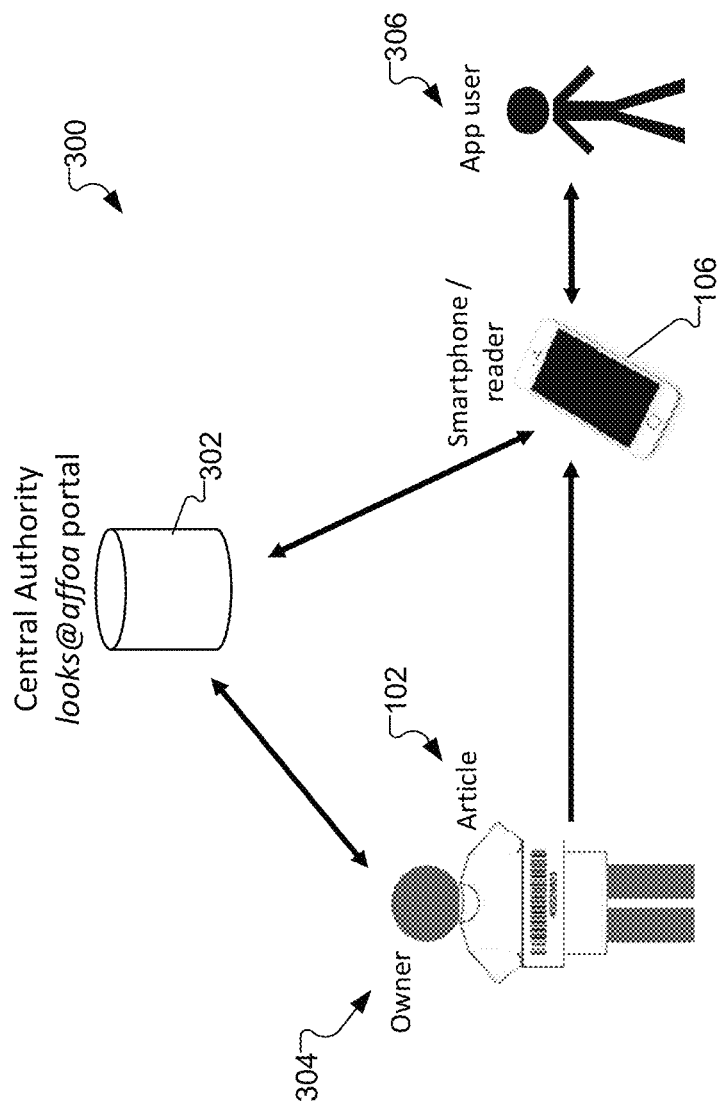
FIG. 3 is a diagram of an exemplary embodiment of a system network including an article of clothing and a mobile computing device.

FIG. 3 is a diagram of an exemplary embodiment of a system network 300 including an article of clothing 102, a mobile computing device 106, and a system server 302. The article of clothing 102 is coupled to a first user 304 (in this case, its owner) as will be further described below. A second user 306 ("app user") can use an application, such as a fabric identification application, executing on their mobile computing device 106 to scan the article of clothing 102 and decode its unique identification code. The application, typically connected to the Internet, is connected with a server system 302 ("Central Authority") to retrieve information that the first user 304 has previously determined that he or she wants to share. In some embodiments, the functionalities of the fabric identification application may be packaged as an "add-on" to third-party applications such as Facebook, Instagram, Snapchat, and the like.

Registration of Unique Identification Codes

Figure 4:
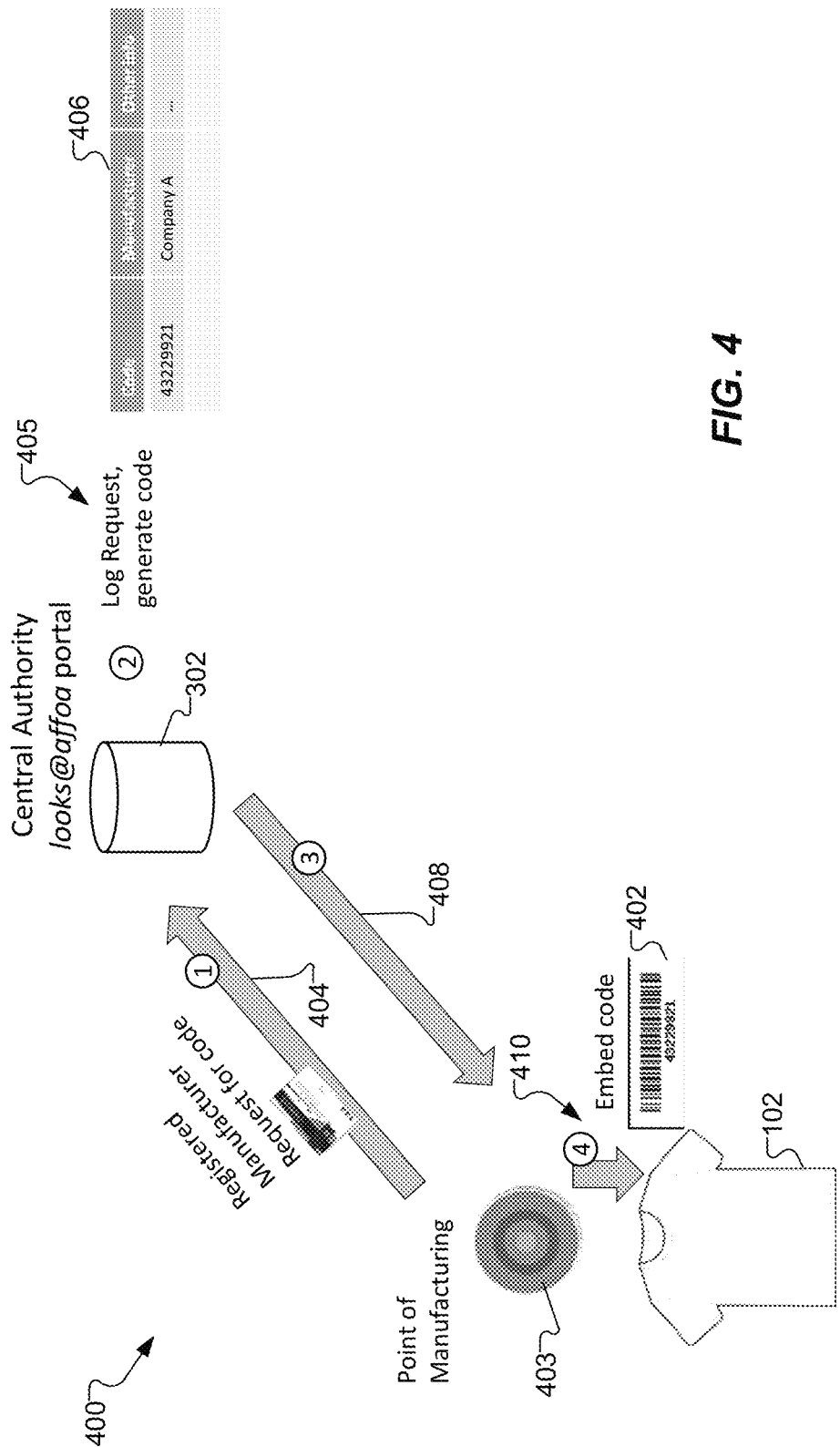
FIG. 4 is a diagram of an exemplary embodiment of a process for embedding a unique identification in the article of clothing at the point of manufacturing.

FIG. 4 is a diagram of an exemplary embodiment of a process 400 for embedding a unique identification code in a pattern 402 in the article of clothing 102 at the point of manufacturing 403. As first step 404, a manufacturer 403, registered with the Central Authority server system 302, sends a request to the server system 302 for a new unique identification code. In a second step 405, the server system 302 generates a new unique identification code (in this example, an eight-digit code "43229921") and logs the request event in a database 406. In step 408, the server system 302 sends the newly generated unique identification code to the manufacturer 403. In some embodiments, this unique identification code can be sent with other information, such as instructions on how to embed the code into a pattern on the article of clothing 102 that can be optically read, specifications for the pattern, and/or a pattern to encode the accompanying unique identification code. In step 410, the manufacturer 403 creates an article of clothing 102 with the unique identification code embedded in a pattern 402. The manufacturer 403 can repeat this process 400 for subsequent articles of clothing. Each time the manufacturer 403 issues a request, the Central Authority server system 302 returns a new unique identification code. In other embodiments, for increased efficiency, the manufacturer 403 can request a batch of unique identification codes. Each unique identification code can then be embedded in one article of clothing.

Figure 5:
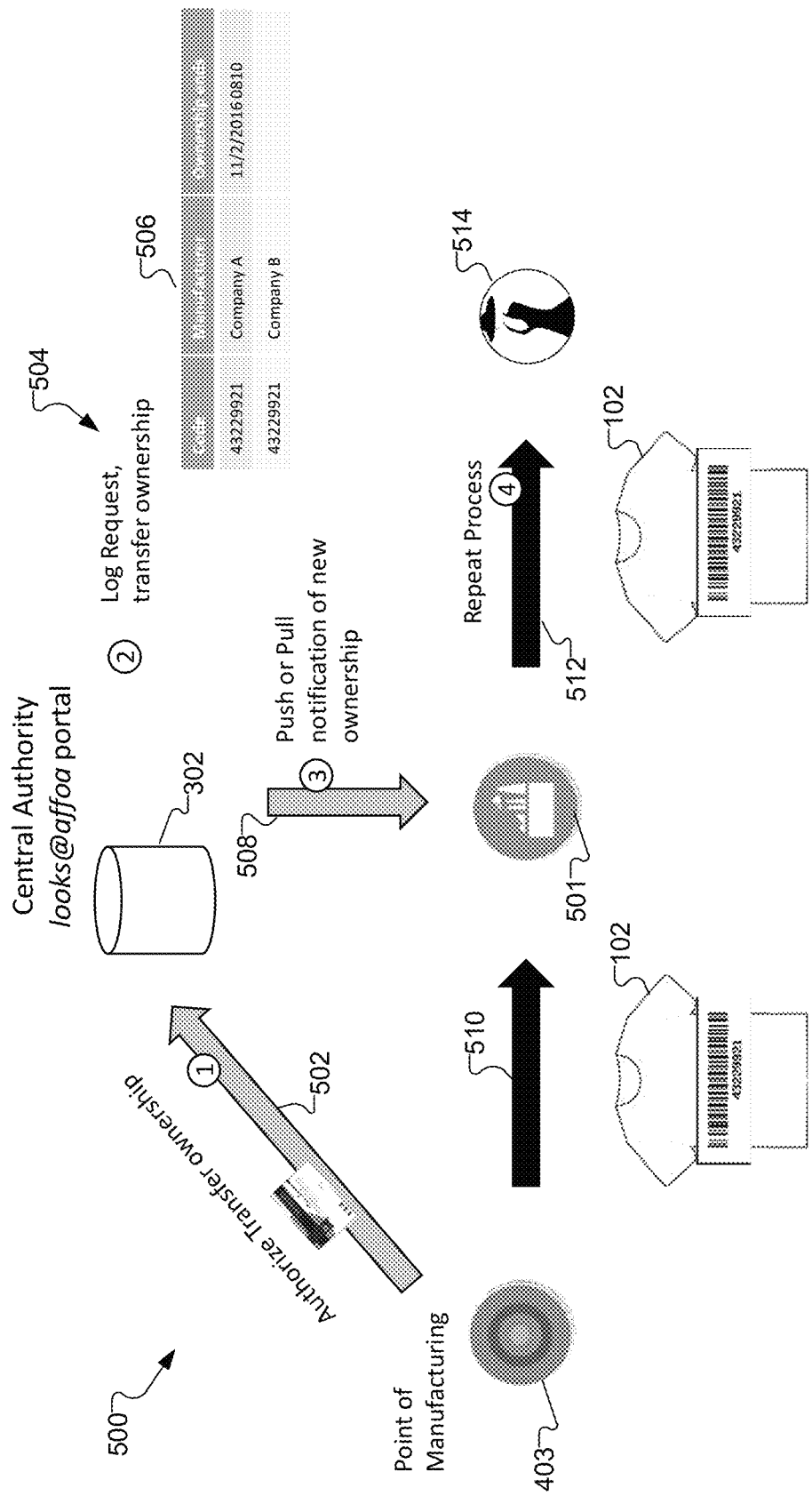
FIG. 5 is a diagram of an exemplary embodiment of a process for transferring ownership of the article of clothing from a first owner, such as the manufacturer, to another entity, such as a distributor.

FIG. 5 is a diagram of an exemplary embodiment of a process 500 for transferring ownership of the article of clothing 102 from a first entity, such as the manufacturer 403, to a second entity, such as a distributor 501. In step 502, the first entity 403 sends the Central Authority server system 302 a notification of the transfer of ownership of the article of clothing 102. In step 504, the server system 302 logs the transfer of ownership into database 506. In step 508, the second entity 501 receives the ownership information from the server system 302. In some embodiments, the second entity 501 can first request the ownership information and then receive the requested information via step 508. Note that in a parallel or serial step 510, the first entity 403 can provide the one or more articles of clothing 102 to the second entity 501. In step 512, the process of transfer of ownership can continue until the article arrives at the point of sale 514.

Figure 6:
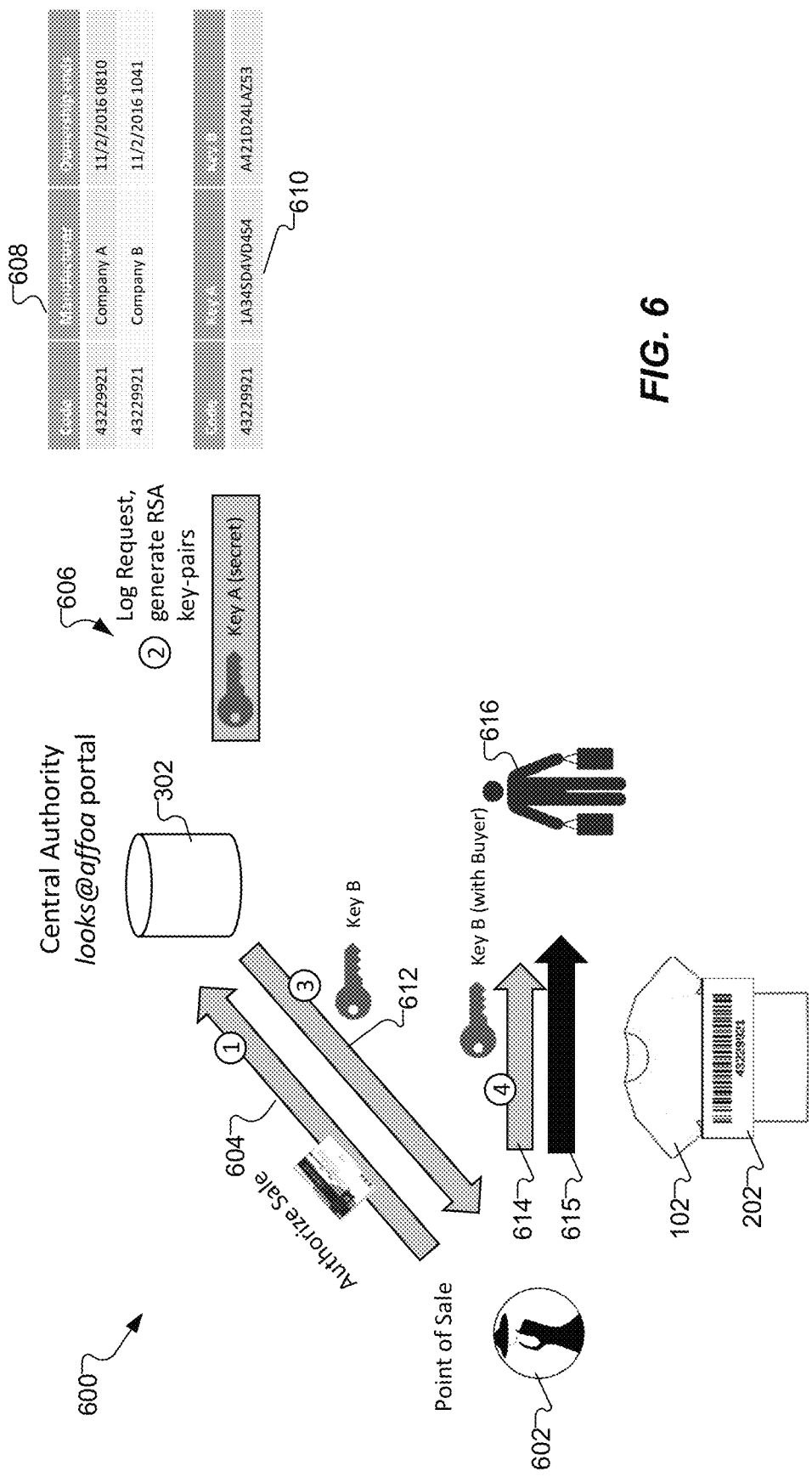
FIG. 6 is a diagram of an exemplary embodiment of a process of transactions taking place at the point of sale.

FIG. 6 is a diagram of an exemplary embodiment of a process 600 of transactions taking place at the point of sale. In step 604, the seller 602 sends a sale authorization to the Central Authority server system 302. In step 606, the server system 302 logs the sale authorization in database 608 with respect to the unique identification code associated with the article of clothing 102. The server system 302 generates a key pair, Key A and Key B, corresponding to the unique identification code, stored in database 610. The keys can be, for example, generated using a cryptosystem such as RSA. In step 612, the server system 302 returns a first key, "Key B", (while holding back the second key, "Key A") to the seller 602. In step 614, Key B is provided to user 616 at the time of purchase or thereafter. In step 615, in parallel or in serial with step 614, the article of clothing 102 having a pattern 202 is provided to a user 616 at the time of purchase. Key B of the key pair allows the user 616 to prove ownership to the server system 302 and initiate registration of the article of clothing 102.

Figure 7:
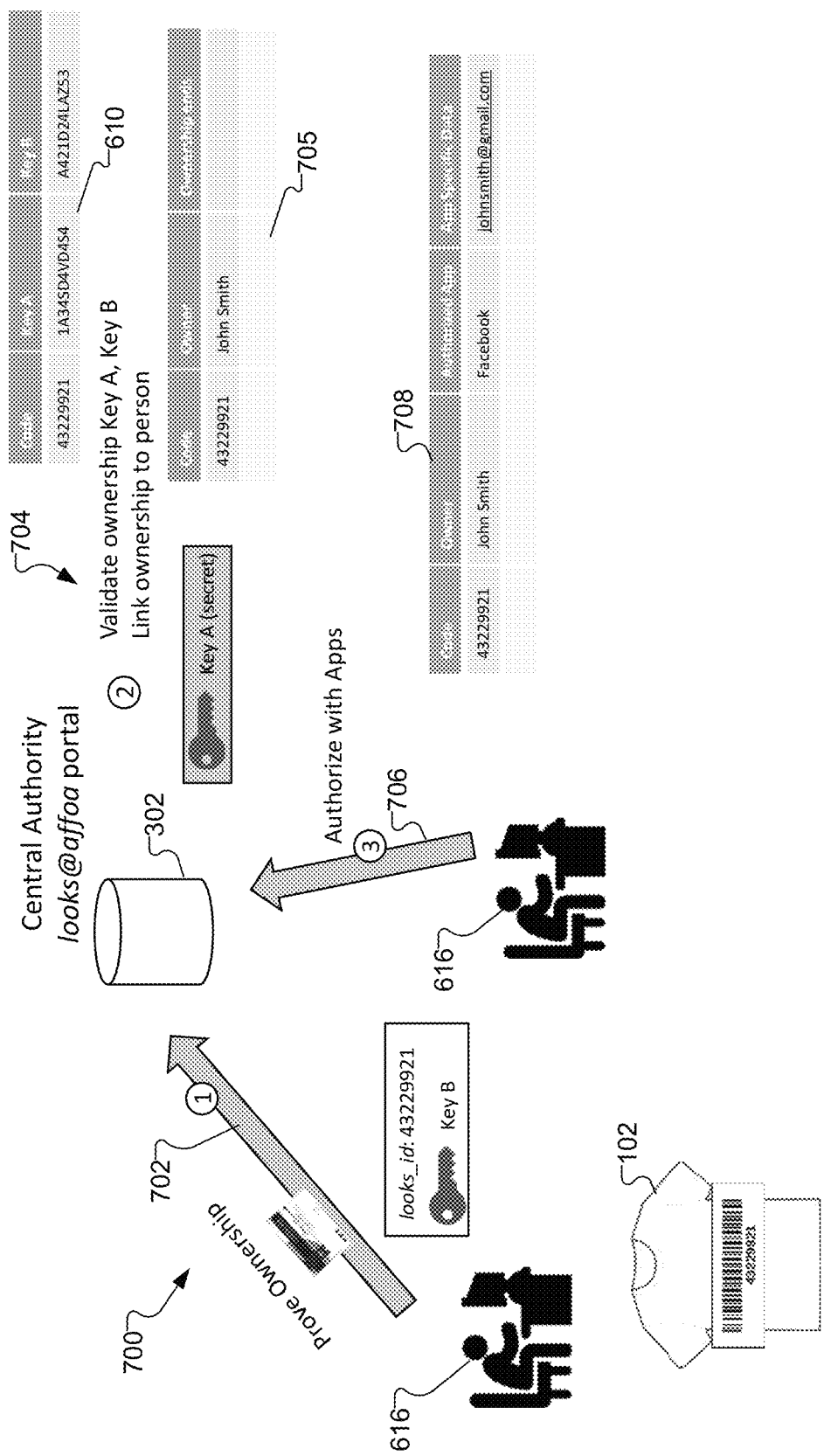
FIG. 7 is a diagram of an exemplary embodiment of a process for a user registering his or her purchase of the article of clothing with the server system.

FIG. 7 is a diagram of an exemplary embodiment of a process 700 for a user 616 registering his or her purchase of the article of clothing 102 with the server system 302. After purchasing the article of clothing 102 (with Key B), the user 616 can use the key to prove ownership to the server system 302. In step 702, the user 616 may enter a web portal to provide Key B in addition to other information, such as the user details. The web portal can be under the control of the server system 302. User details can include user name, password, email, phone number, user preferences, user picture, and the like. At step 704, the server system 302 validates ownership of the article of clothing 102 by checking database 610 for the corresponding key information. Having validated the ownership, the server system 302 can associate the unique identification code ("looks_id") with user input details at the web portal and add the user input details into a database 705, which can include when the ownership of the particular article of clothing starts and ends. For example, an owner of the article of clothing may sell or gift the article of clothing, at which time the ownership of the previous owner ends. Optionally, in step 706, the user 616, at the same time or another time, can link other applications to the server system 302. For example, the user 616 may authorize the server system 302 to interact with his or her social media (such as Facebook, Twitter, Snapchat, Instagram, etc.) application by inputting application specific data, such as username, links, etc. This application specific data can be stored in a database 708.

Scanning an Encoded Pattern on an Article of Clothing

Figure 8:
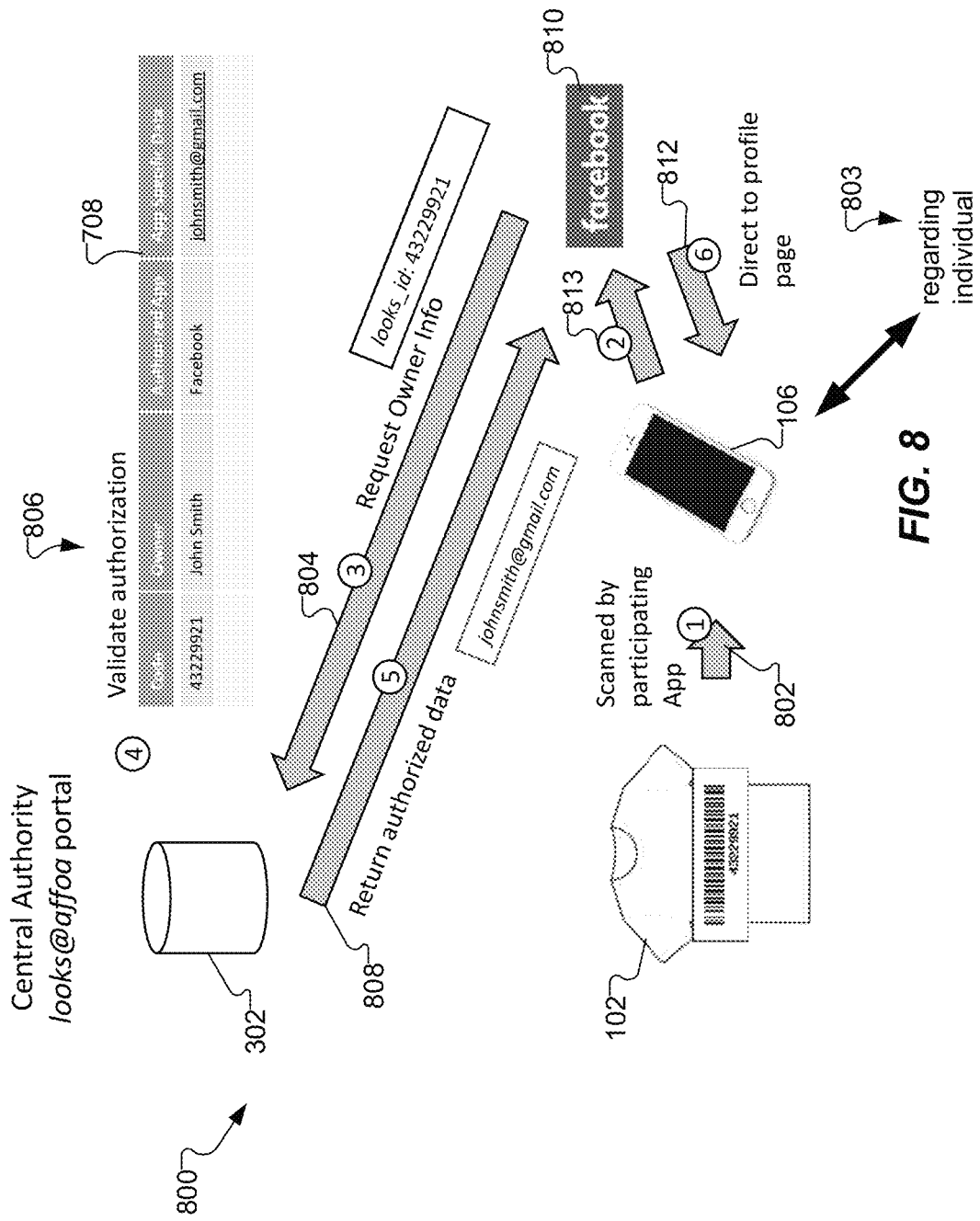
FIG. 8 is a diagram of an exemplary embodiment of a process for accessing authorized user information, encoded in an article of clothing, by a mobile computing device.

FIG. 8 is a diagram of an exemplary embodiment of a process 800 for accessing authorized user information, encoded in an article of clothing 102, by a mobile computing device 106. In step 802, a user (the "regarding individual" 803) of the mobile computing device 106 scans the article of clothing 102 using an application, such as a fabric identification application, executing on the mobile computing device 106. For example, the regarding individual may see a person in a social setting, such as a bar or a conference, wearing a patterned shirt and access the application to scan the article having the pattern. In some embodiments, once the mobile computing device 106 has scanned the article of clothing 102, the server system 302 or application executing on the mobile computing device 106 can confirm to the regarding individual 803 (the user having the mobile computing device 106) that a valid pattern has been scanned. In some embodiments, the application itself may decode the embedded code and send the decoded information to the server 302. In step 804, the application requests authorized information about the user 616 by sending the decoded unique identification code to the server system 302. In step 806, the server system 302 checks one or more databases, to ensure the user 616 has authorized the release of his or her user information. Once validated, the server system can retrieve user-specific information from a social media database 708. In step 808, the server system 302 returns only the data that the user 616 has authorized for sharing.

In some embodiments, the fabric identification application can be a module of another application, including social network applications such as Facebook, Twitter, Instagram, Snapchat, and the like. For example, the fabric identification module of a social network application, such as Facebook, can scan and process the pattern on the article of clothing 102 to read the embedded code in the pattern. The module can then send the decoded information to a server system connected to the specific network application (in this case, a Facebook server system). In some embodiments, the Facebook server can communicate with the server system 302 to request authorized information related to the article of clothing 102. If the user 616 has authorized information to be shared, the information can be transmitted back to the mobile computing device 106 of the regarding individual 803.

In some embodiments, the regarding individual 616 using the mobile computing device 106 gives the fabric identification application access to certain data from a social network account, such as his or her Facebook account. The fabric identification application can send, to the server system 302, the embedded code in the pattern of the article of clothing 102 together with data from the Facebook account of the user 616. The server system 302 can determine what data related to the article of clothing 102 to return to the mobile computing device of the regarding individual based on the specifics of the data from the Facebook account of user 616.

The returned authorized data can be provided to a third-party application 810, such as Facebook, and in step 812, the user of the mobile computing device 106 may be redirected to the third-party application 810. In some embodiments, a third-party application 810 (such as Facebook) itself can be used for authentication (using standard third-party authentication methods). Optionally, in step 813, the scanned image of the article of clothing 102 can be processed, by an application specific to the server system 302 or by a third-party application 810 (in this example, Facebook).

Figure 9:
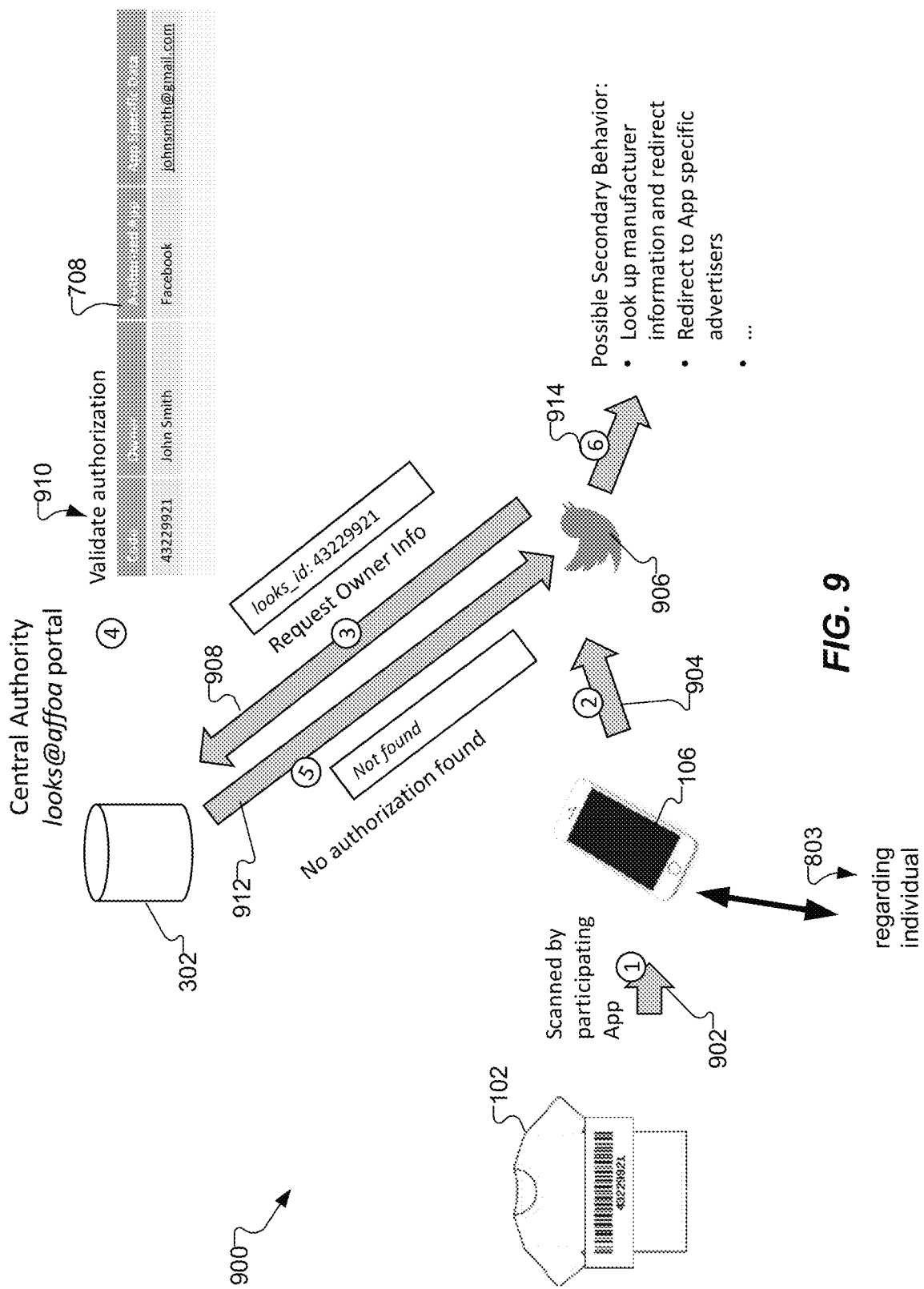
FIG. 9 is a diagram of an exemplary embodiment of a process for redirecting the user of a mobile computing device in the case where user does not authorize the sharing of user information.

FIG. 9 is a diagram of an exemplary embodiment of a process 900 for redirecting the application executing on the mobile computing device 106 in the case where user 616 does not authorize the sharing of user information. At step 902, the regarding individual 803 uses the mobile computing device 106 to scan the article of clothing 102 into an application executing on the mobile computing device 106. The scanned image of the article of clothing can be processed, at step 904, by an application specific to the server system 302 or by a third-party application 906 (in this example, Twitter). At step 908, the application can request, from the server system 302, the user information of user 616. At step 910, the server system 302 can check the authorization related to the unique identification code ("looks_id") in database 708. If the user 616 has not previously provided authorization (for example, through a user interface or web portal connected with the server system 302 as described for FIG. 7), then, at step 912, a message from the server system 302 can be provided back to the application, such as "Not found" or "Not authorized to share user information". In some embodiments, in addition to or instead of the "Not found" message, at step 914, the application may be redirected to retrieve manufacturer information and/or to an advertisement.

Examples of Encoded Patterns in Articles of Clothing

Figure 10C:
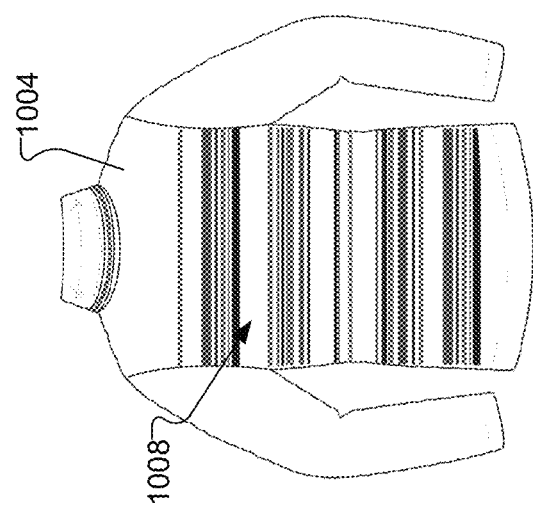
FIG. 10B-10C show graphic representations (front and back, respectively) of a pattern on the article of clothing.
Figure 10B:
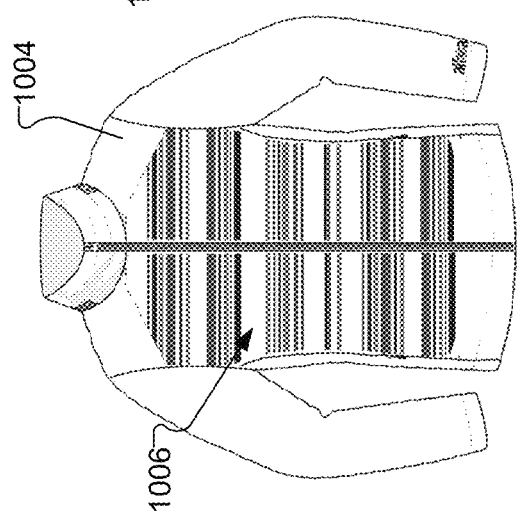
Figure 10A:
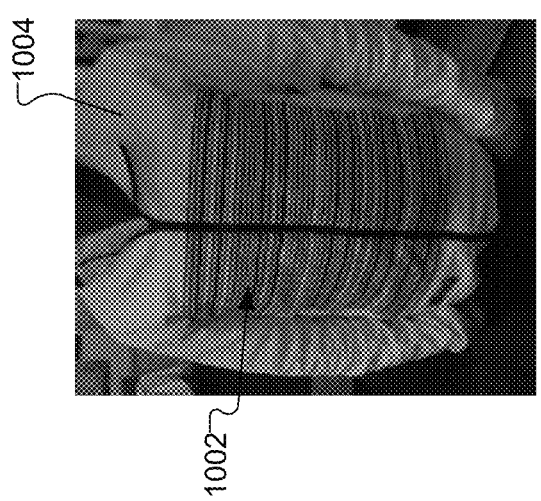
FIG. 10A shows a photograph of an exemplary embodiment of a pattern on an article of clothing in which a unique identification code is embedded in the form of a barcode.

FIG. 10A shows a photograph of an exemplary embodiment of a pattern 1002 on an article of clothing 1004 in which a unique identification code is embedded in the form of a barcode. FIG. 10B-10C show front and back graphic representations of pattern 1006 and 1008 on the article of clothing 1004. Note that in this example, the pattern is distributed on both the front and back of the article of clothing 1004. In embodiments, the unique identification code is repeated within the encoded pattern so that the mobile computing device can successfully capture the pattern into the application from multiple angles relative to the article of clothing. In pattern 1006 and 1008, the barcode uses standard Code 39 encoding (for further details, see standard ANSI/AIM BC1/1995, Uniform Symbology Specification—Code 39). In this example, the red and blue colors in the bars of the code were added for aesthetic reasons and do not affect the information content. The information is encoded in the presence and width of dark bars and light spaces. The format of information content is 7 alpha-numeric characters (e.g. "ATZMLZB"). Each character can take one of 39 possible values and therefore the information content is equivalent to approximately 37 bits ($\log_2(38^7)$ =36.99).

Note that this pattern 1006, 1008 is distributed over at least 10% of the exposed surface of the article of clothing 1004, allowing the pattern 1006, 1008 to be scanned by a mobile computing device at a distance to return information about the user or wearer of the article of clothing 1004. In embodiments, for a pattern to be resolved by the camera of mobile computing device, the minimum dimension of the attributes of the barcode is at least 1 mm. In other embodiments, for a pattern to be resolved by the camera of mobile computing device, the minimum dimension of the attributes of the barcode is at least 2 mm. In yet other embodiments, for a pattern to be resolved by the camera of mobile computing device, the minimum dimension of the attributes of the barcode is at least 3 mm. Note that the width of the narrow bars of the pattern 1006, 1008 in FIG. 10A is approximately 3 mm.

In some embodiments, other standard one-dimensional barcode symbologies can be used, such as Code 128, UPC, EAN, etc. Further, barcodes can be customized such that the widths of bars and spaces could be chosen to improve the aesthetics of the garment. For example, the spaces between the bars can be made wider to create a more subtle design that looks less like a standard barcode. In some embodiments, the barcodes can be further customized such that the color of the bars and spaces can be used to encode information.

Note that the patterns may be applied to the fabric of the articles of clothing described herein in a variety of manners, including by weaving into the fabric in a manner so as to be integral with the fabric, by printing, and/or by applying a carrier in which the pattern has been embedded to the fabric by means of an adhesive. Note also that articles of clothing can include standard forms of dress, including shirts, jackets, pants, shorts, dresses, skirts, outerwear, and accessories such as hats, bags, umbrellas, and the like.

Figure 11:
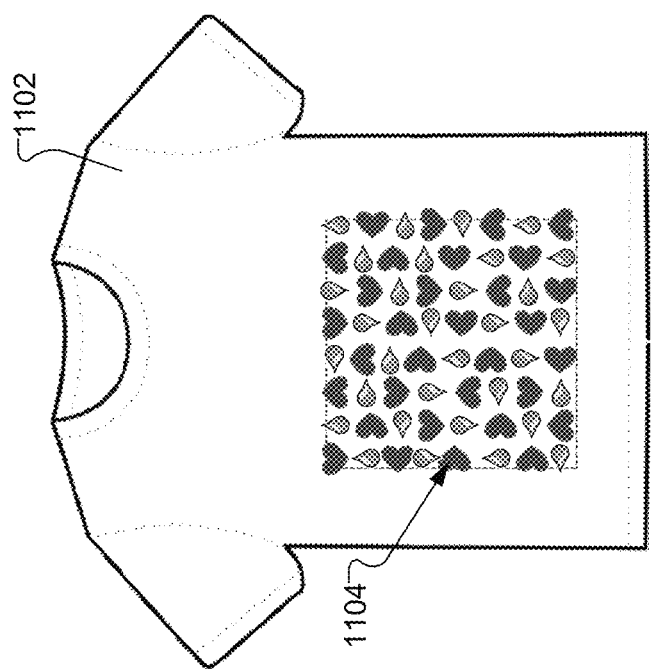
FIG. 11 is a graphical representation of an exemplary embodiment of an article of clothing with pattern that encodes information in the orientation(s) of a set of symbols.

FIG. 11 is a graphical representation of an exemplary embodiment of an article of clothing 1102 with pattern 1104 that encodes information in the orientation(s) of a set of symbols. Two types of symbols (in this case, hearts and droplets) are arranged on an 8-by-8 rectangular grid. Each symbol has 4 possible orientations: for example, the narrow tip of the heart symbol can be pointing left, right, top, or bottom. This corresponds to two bits of information per symbol (for example: "00" is right, "01" is top, "10" is left, and "11" is bottom). Since there are 64 symbols in the 8-by-8 grid, a total of 64×2=128 bits of information can be encoded in this fashion. Note that only the orientation of the symbols encodes information. The color and shape of each symbol can be chosen to improve the aesthetics of the garment. In some embodiments, the color and shape of the symbols themselves can also be used to encode information.

In some embodiments, the pattern in or on the article of clothing can include an error correction code (ECC), such as a forward error correction (FEC) code. This can ensure that any errors that may occur during a scan of the pattern by the mobile computing device can be detected and corrected. FEC can be used to encode the unique identification code in the pattern in a redundant manner to limit errors in scanning and decoding. Further, in some embodiments, the pattern may be repeated to ensure that scanning is more reliable in less than ideal situations, such as when the camera of the mobile computing device can scan only a portion of the pattern on the article of clothing. In the example used in FIG. 11, a unique identification code may be repeated in the top and bottom four rows of the 8-by-8 grid pattern to ensure robust scanning. In embodiments, the 8-by-8 grid pattern can be repeated on the exposed surface of the article of clothing so that the mobile computing device can successfully capture the pattern into the application from multiple angles relative to the article of clothing.

Figure 12:
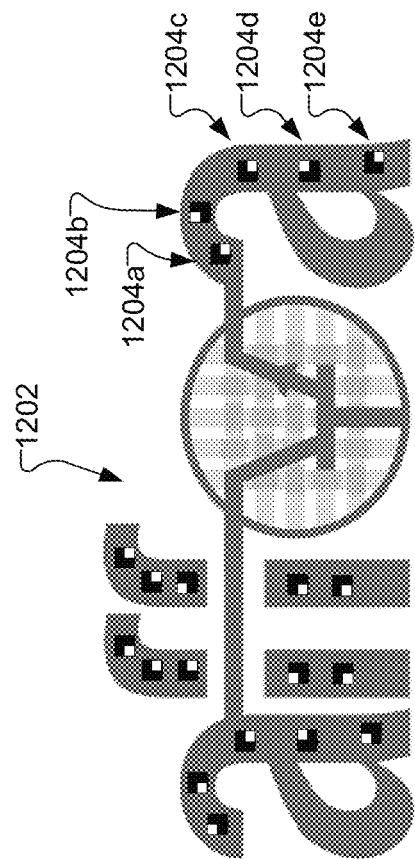
FIG. 12 is a graphical representation of an exemplary embodiment of pattern encoding information in the form of font modification.

FIG. 12 is a graphical representation of an exemplary embodiment of pattern 1202 encoding information in the form of font modification. For example, logo text ("affoa" provided in gray font) is displayed on a garment. Within each letter of the text, there are five white squares positioned in five areas 1204a-1204e along the letter. Each white square can have four positions relative to area of the letter in which it is embedded. The four possible positions are shown here by the larger black square around each white square. The white square could be in the top right corner of the black square (encoding bits "00"), in the top left corner (encoding "01"), in the bottom left corner (encoding "10"), or in the bottom right corner (encoding "11"). Each white square can thus encode two bits, and since there are 5 such white squares in a letter, a letter can encode 10 bits. The four letters that carry encoded information ("a", "f", "f", and "a" in this example) can carry a total of 40 bits of information. Note that black squares are shown here only for ease of understanding the concept. In some embodiments, the area shown in black can have the same color as the rest of the letter (gray) while the white squares are visible in contrast. In this type of encoding, the processor of the image can be pre-programmed to recognize the four possible positions available to a white square in each of the five areas 1204a-1204e in each letter of the alphabet. This is specific to the exact shape of the letter. This structure can be stored in the processor in the form an enhanced font that defines both the shape of each letter and the possible positions of the information encoding squares. Note that the processor may be in the mobile computing device or in the server system.

Figure 13:
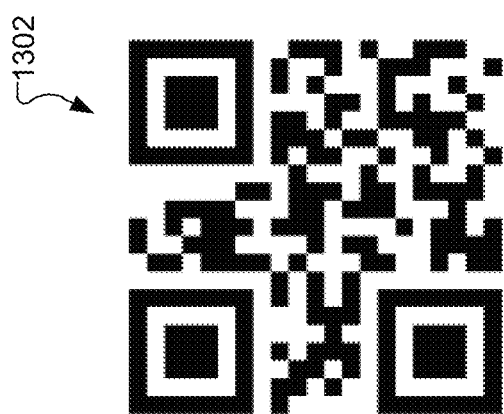
FIG. 13 is an exemplary embodiment of a QR code that can be used to encode a unique identification code in a pattern on an article of clothing.

FIG. 13 is an exemplary embodiment of a QR code that can be used to encode a unique identification code in a pattern on an article of clothing. QR Code is established as an International Standards Organization (ISO/IEC18004) standard. The Version 1 QR code, shown in this example, can encode 128 bits when using error correction level M (up to 15% damage to the QR code).

Figure 14:
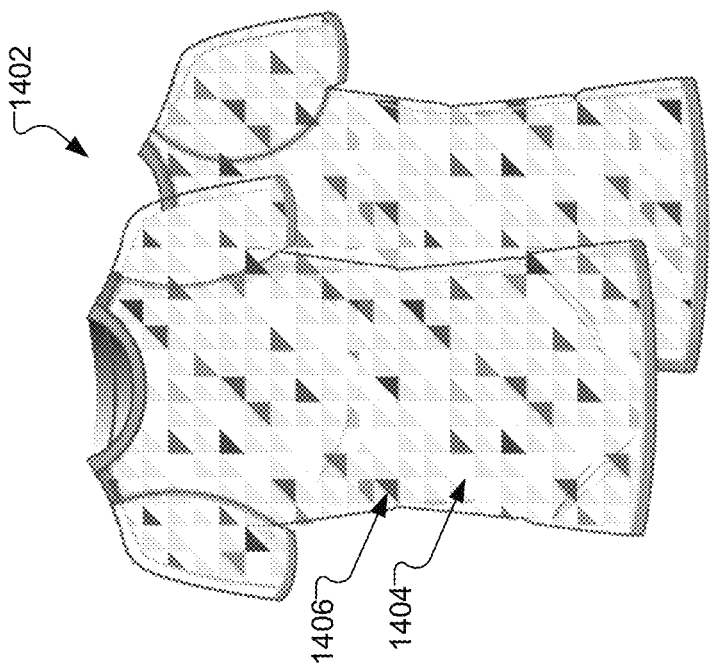
FIG. 14 is a front and back views of an exemplary embodiment of an article of clothing having encoded information in the form of a two-dimensional pattern.

FIG. 14 illustrates front and back views of an exemplary embodiment of an article of clothing 1402 having encoded information in the form of a two-dimensional pattern. Note that in this example, the pattern covers at least 30% of the exposed surface of the article of clothing 1402. The pattern of the lighter color (beige in this instance) triangles 1404 provides a reference two-dimensional grid of locations for the darker color triangles 1406. In this example code, there is a fixed or pre-programmed set of locations where darker color triangles are found. Note that, in this embodiment, the size of each triangle is approximately 25 mm by 25 mm. Each darker color triangle 1406 can have two orientations (90-degree angle pointing towards bottom-right or top-left) and thus can each encode one bit of information. In some embodiments, the color of the darker color triangles 1406 can also encode information. For example, two additional bits of information per triangle position if four possible colors are used.

Figure 15A:
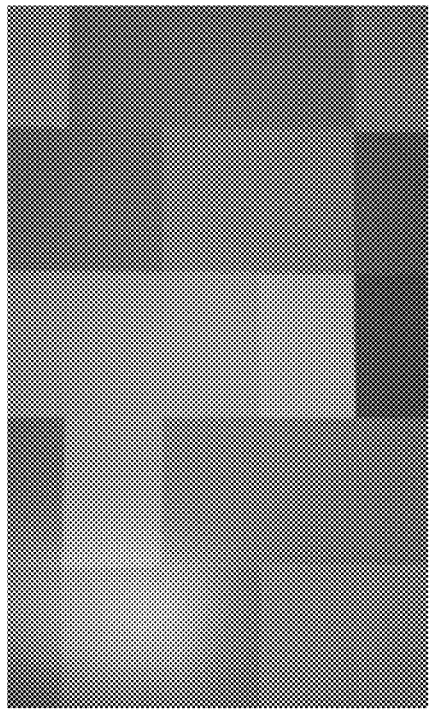
FIGS. 15A-15C are graphical representations of exemplary embodiments of patterns encoding information in the form of color content.
Figure 15B:
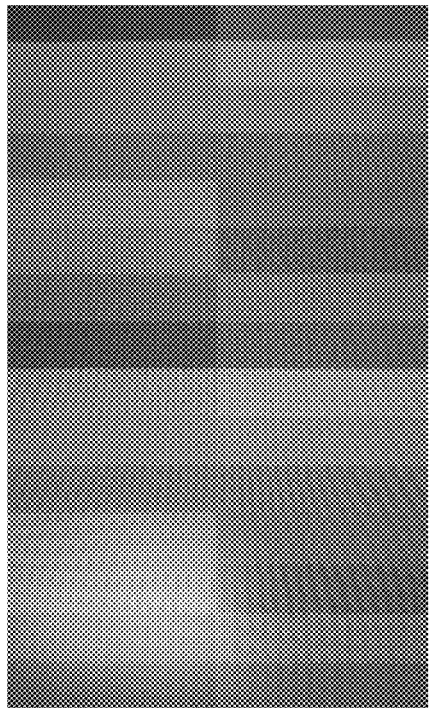
Figure 15C:

FIGS. 15A-15C are graphical representations of exemplary embodiments of patterns encoding information in the form of color content. In each example, a pre-defined standard set of distinguishable colors is first chosen. Each color corresponds to a bit. If the bit equals 1, then the corresponding color is present on the article of clothing. If the bit equals 0, then the color is absent from the article. A subset of colors that need to be present for each unique identification code is determined and an article is designed with a pattern that includes the "present" colors and none of the "absent" colors. Note that, in this example, the spatial location of each color is not constrained, which can provide flexibility to the designer to optimize aesthetics of the article of clothing. Decoding the information includes the extracting of a histogram of the colors present in an image of the garment. In some embodiments, to make decoding more robust to noise that may interfere with the decoding, the set of colors can be chosen to have significant amount of contrast relative to one another. In particular, the colors can be chosen based on a rectangular grid of points in the three-dimensional RGB color space. In the examples shown in FIGS. 15A-15B, 14 out of a possible 27 colors are present (corresponding to a 27-bit binary code with 14 "1"s and 13 "0"s). These colors can be spatially arranged in many ways. FIGS. 15A-15B shows colors arranged in rectangular shapes with different aspect ratios 1502 and 1504. FIG. 15C shows colors used in a non-geometric or free-form arrangement 1506.

Figure 16:
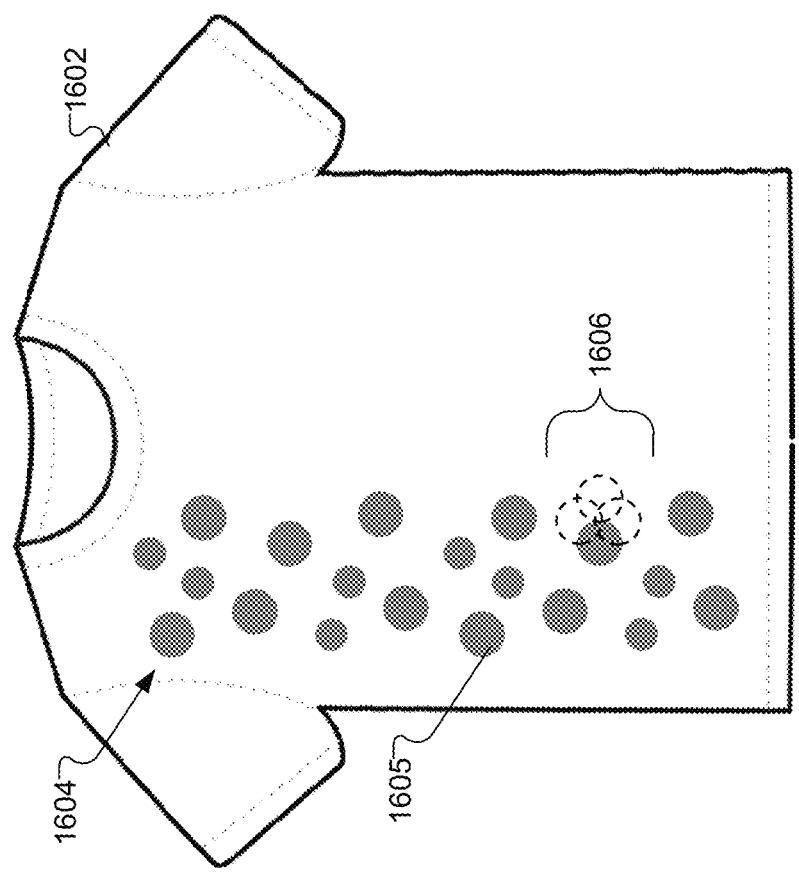
FIG. 16 is a graphical representation of an exemplary embodiment of an article of clothing having a pattern encoding information in the positions of a set of symbols.

FIG. 16 is a graphical representation of an exemplary embodiment of an article of clothing 1602 having a pattern 1604 encoding information in the positions of a set of symbols. In this example, each circular dot 1605 can have four possible positions 1606. These positions are shown for one of the dots as three dashed circles where the dot could be located in addition to its current position (solid gray dot). In some embodiments, the size and color of each dot 1605 can be used to encode information in addition to the position.

Figure 17B:
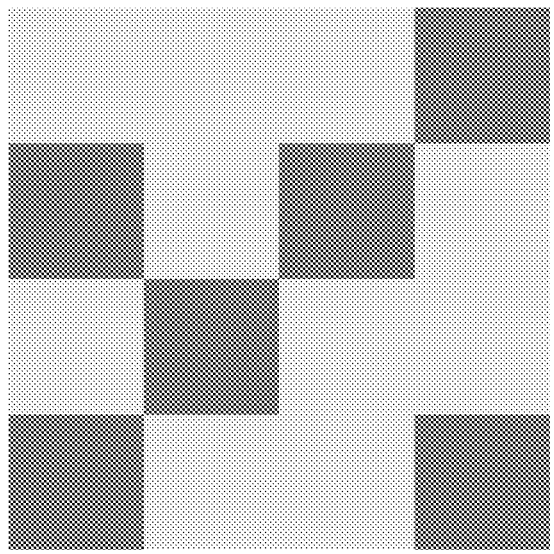
FIGS. 17A-17B are graphical representations of an exemplary embodiment of a pattern to encode a unique identification code.
Figure 17A:
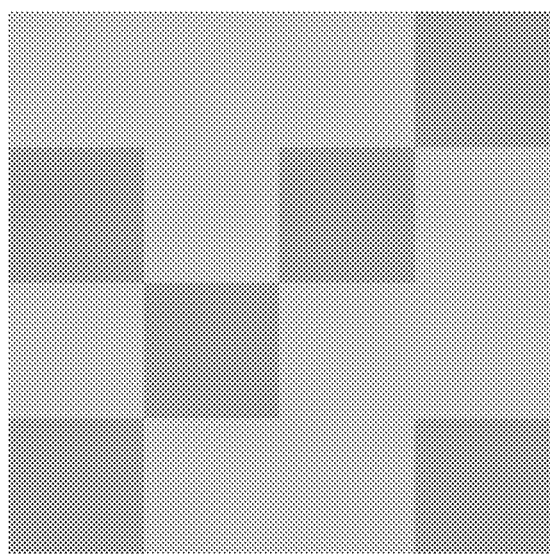

FIGS. 17A-17B are graphical representations of an exemplary embodiment of a pattern to encode a unique identification code. The difference between FIGS. 17A and 17B illustrate how specially-tailored spectral content in the garment can be used to enhance code readability with a mobile computing device, such as a smartphone, while keeping the appearance of the code more subtle to the human eye. Human eyes and smartphone charge-coupled-device (CCD) cameras have similar but different sensitivities to different wavelengths of light. For example, a CCD camera is more sensitive than the human eye to wavelengths around 700 nm, which are at the border between visible and near-infrared ranges. If an article of clothing contains a pattern of bright and dark regions at the 700 nm wavelength, such a pattern may not be easily visible to the human eye. A CCD camera, however, can detect a relatively larger contrast in the pattern. In embodiments, this contrast effect can be further enhanced by processing in the mobile computing device or in the server system.

Security Features

Figure 18A:
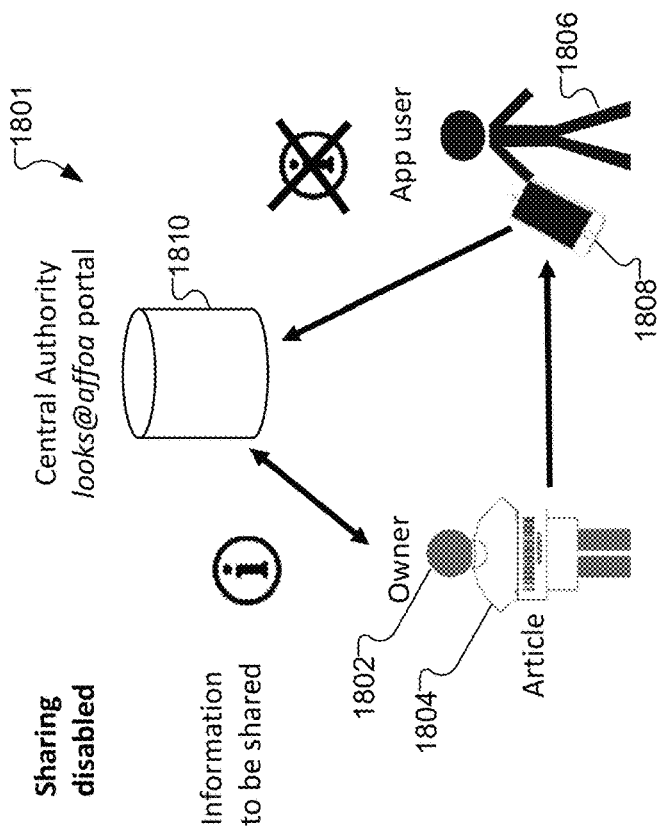
FIGS. 18A-18B are diagrams of exemplary embodiments of a network including a user of an article of clothing, an app user having a mobile computing device, and server system.
Figure 18B:
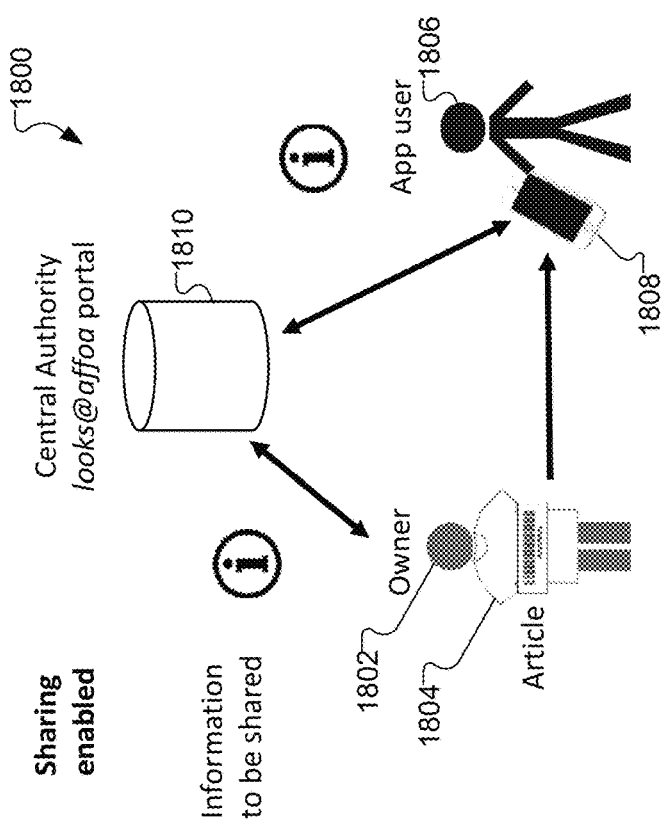

FIGS. 18A-18B are diagrams of exemplary embodiments of a network 1800 including a user 1802 ("owner") of an article of clothing 1804, an app user 1806 ("regarding individual") having a mobile computing device 1808, and server system 1810 ("Central Authority"). The interaction in the physical world (the app user 1806 scanning the owner's 1802 article of clothing 1804) can trigger an interaction with the server system 1810. The chain of events after an initial scan can depend on settings chosen by the owner 1802 and the app user 1806. FIG. 18A shows a first scenario in which the owner 1802 can determine application settings such that he or she will share the song he or she is currently listening to with any app user 1806 who is scanning his or her article of clothing 1804. FIG. 18B shows a second scenario in which the owner 1802 can determine settings such that he or she will not share any information to any app user 1806. In another scenario, the owner 1802 can determine settings such that he or she will share the song he or she is listening to only if the app user 1806 also has this particular setting enabled in the app user's instance of the application.

Figure 19:
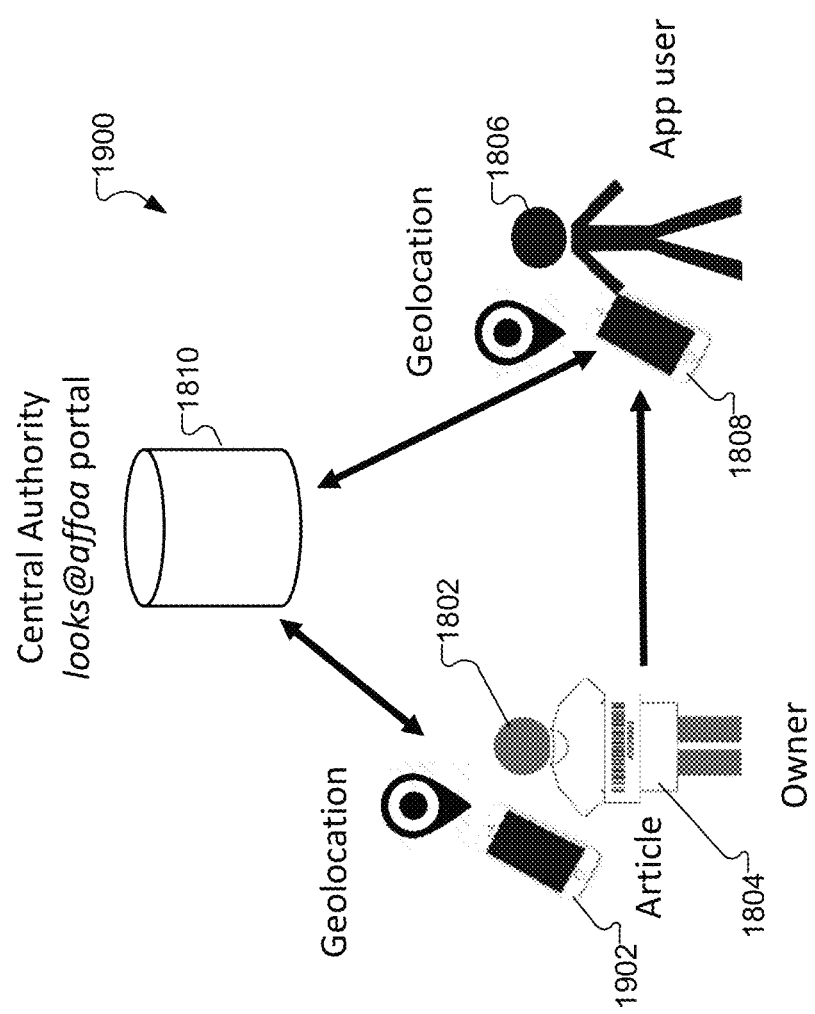
FIG. 19 is a diagram of an exemplary embodiment of a network including a user of an article of clothing, an app user having a mobile computing device, and server system.

FIG. 19 is a diagram of an exemplary embodiment of a network including a user 1802 ("owner") of an article of clothing 1804, an app user 1806 ("regarding individual") having a mobile computing device 1808, and server system 1810 ("Central Authority"). The interaction between the owner 1802 and the app user 1806 can be controlled by the server system 1810 by using the geolocations of the mobile computing devices 1902 and 1808 of the owner 1802 and the app user 1806, respectively. For example, the owner 1802 can determine a setting to share information with an app user 1806 only if the app user 1806 has a geolocation feature enabled on the app user's mobile computing device 1808 and the app user 1806 is located in close proximity to the owner 1802 (e.g. within a distance of 10 meters or 30 meters) as determined by their geolocations. In this example, the server system 1810, before sending a reply message to the mobile computing device of the regarding individual, can determine if the app user should be denied permission to access user information by collecting the geolocation data from each mobile computing device 1902 and 1808 and processing the location data to determine if the app user is within a predetermined distance (either set by the owner of the article of clothing or the server system). If the app user is at a distance greater than a predetermined distance, the server system 1810 can send a message to the app user's instance of the application executing on mobile device 1808 that the owner 1802 of the article of clothing 1804 denied permission to access user information. This measure can, for example, prevent an interaction that is triggered by an app user 1806 scanning a photograph of the owner's article of clothing 1804 when the app user 1806 is in reality far away from the owner 1802.

Exemplary User Interfaces

Figure 20B:
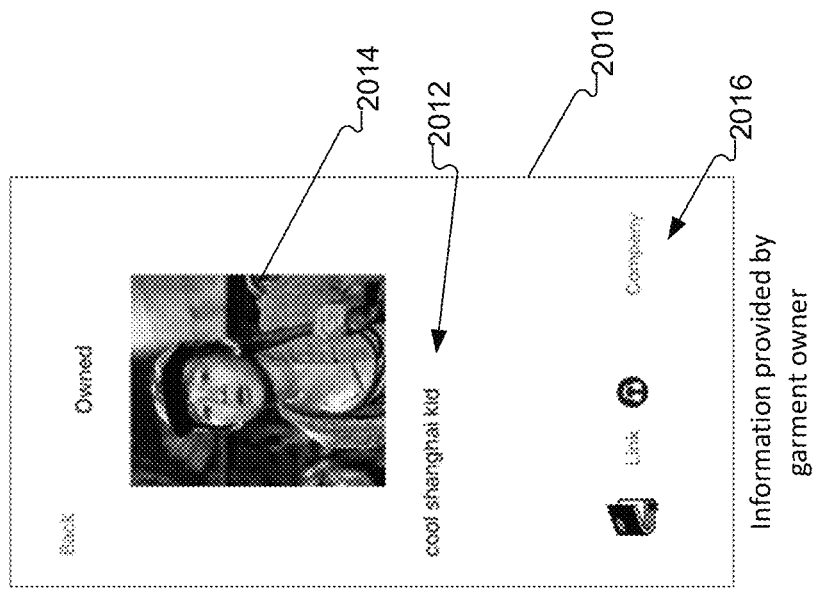
FIGS. 20A-20B shows screenshots of an exemplary embodiment of an application executing on a mobile computing device.
Figure 20A:
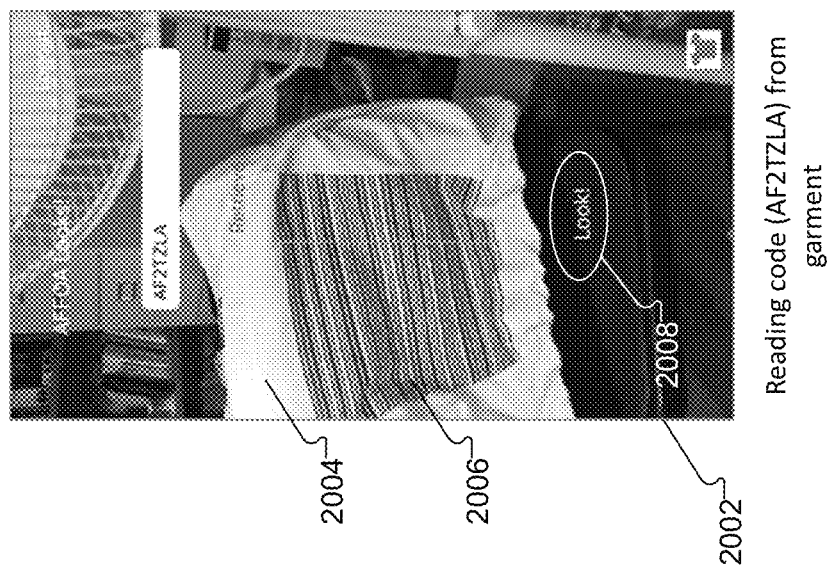

FIGS. 20A-20B show screenshots of an exemplary embodiment of an application executing on a mobile computing device. FIG. 20A is an application interface 2002 showing an image of an article of clothing 2004 having a pattern 2006 similar to that shown in FIG. 10 as seen by the camera of a mobile computing device while the device is moved around to see different parts of a room. After the pattern 2006 is identified, the code "AF2TZLA" is decoded from the article of clothing 2004. The app user can then choose to tap the "Look!" button 2008 on the interface 2002. This action changes interface 2002 to the interface 2010 as shown in FIG. 20B. In FIG. 20B, interface 2010 shows the profile page for the owner of the article of clothing 2004. The profile page can include the name 2012 of the owner, a picture 2014 of the owner, etc. The various types of information that the owner has chosen to share can be linked to the icons 2016 at the bottom of the profile page.

Figure 21:
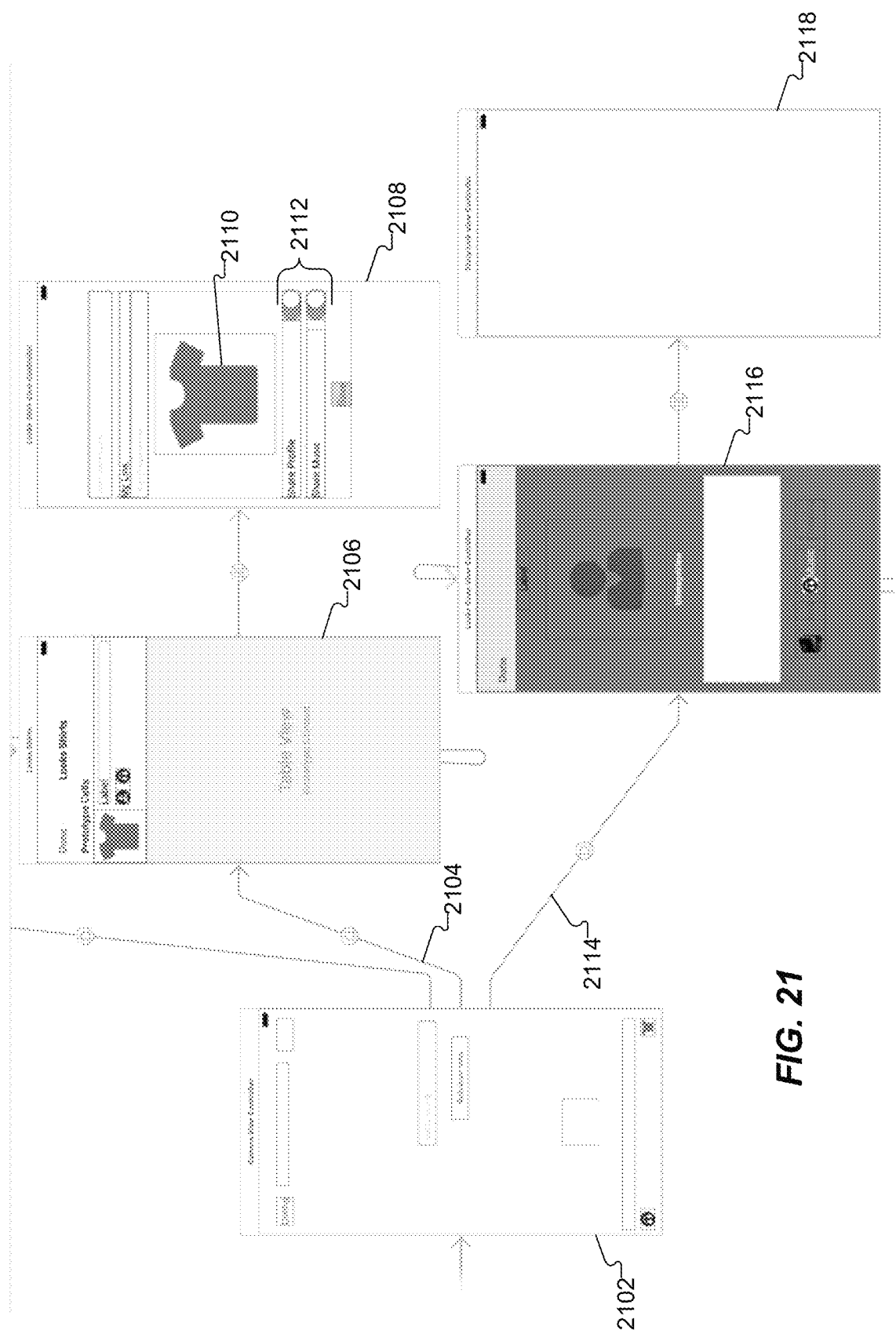
FIG. 21 is a diagram of an exemplary embodiment of architecture of the application in the form of a storyboard.

FIG. 21 is a diagram of an exemplary embodiment of architecture of the fabric identification application in the form of a storyboard. There are two major branches that separate from the main window 2102. The top branch 2104 allows a user that owns at least one article of clothing with an encoded pattern, for example, to manage the customization of owned articles in view 2106. In view 2108, the owner can determine the information to associate with each article of clothing 2110 in their collection and adjust settings to control the information 2112 shared with different types of users. The bottom branch 2114 allows a user to manage the scanning and decoding of an article of clothing. In view 2116, when a user scans an article of clothing, a query is sent to the Central Authority. Based on current settings of the owner of the article of clothing, a set of authorized information is displayed. In view 2118, the user can then choose to access that set of information in more detail. In some embodiments, the set of information can lead to a third-party application, such as a social media site, a music player, video player, and the like.

Server-Based Method for Identifying a Specific Article of Clothing

Figure 22:
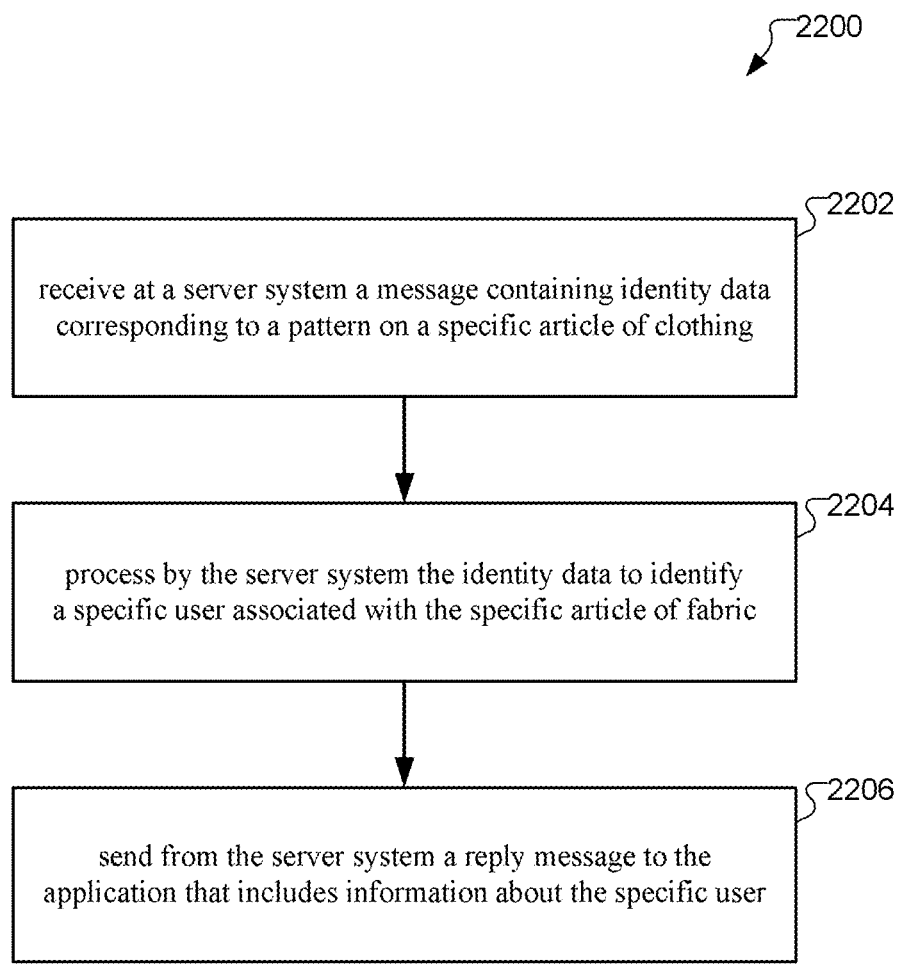
FIG. 22 is a flowchart of an exemplary embodiment of a server-based method for identifying a specific article of clothing in a social context.

FIG. 22 is a flowchart of an exemplary embodiment of a server-based method for identifying a specific article of clothing in a social context. In step 2202, the server system receives a message from the fabric identification application executing on the mobile computing device. The message can include identity data corresponding to a pattern on a specific article of clothing that was captured by the mobile computing device. The pattern encodes a unique identification code associated with the specific article. In step 2204, the identity data is processed by the server system in relation to a database system. The database system stores identification codes for a set of articles of clothing in related to corresponding user information. The identity data is processed to identify a specific user associated with the specific article of clothing. In step 2206, the server system sends a reply message to the application executing on the mobile computing device that, if the user of the article of clothing authorizes, includes information about the user of the article of clothing.

Other Embodiments

In some embodiments, the unique identification code can be linked to third party-defined content provided by marketers, campaigns, organizations, institutions, and the like. For example, the content that appears on the mobile computing device of a regarding individual as a result of scanning a pattern on an article of clothing can be an advertisement to a product or service. In some embodiments, the unique identification code can be linked to a plurality of content items including user-defined content and third party-defined content. For example, a first portion of the interface to the fabric identification application can be reserved for the profile of the specific user wearing the article of clothing with the scanned pattern while a second portion can be dedicated to an advertisement.

In some embodiments, the network includes a first mobile computing device of the specific user wearing the article of clothing and a second mobile computing device of the regarding individual. The network can allow unique isomorphic exchange of customized messages between the first mobile computing device and the second mobile computing device.

In some embodiments, the server system 302 can track usage by the regarding individual of the fabric identification application or module. This usage can be logged in a database by the server system. The log can have usage information such as when the regarding individual scanned a specific user's article of clothing. The specific user can view the log of scans of his or her article of clothing. In some embodiments, the regarding individual may not be able to view decoded information related to the scanned article of clothing unless the specific user has released his or her information. For example, the specific can review the log after some time of wearing his or her article of clothing in a social setting and determine if each regarding individual can view the decoded information encoded in the pattern of the article of clothing.

Example Use Cases: Encoded Apparel in Social Settings

In an exemplary embodiment, codes that are embedded within clothing can be decoded differently based on the profile type of the app user that scans the code. For example, such a code may be particularly suited for a conference or tradeshow environment. A user wearing an encoded shirt or jacket can be scanned by people in a conference, such as professional contacts, friends, or members of the public. The user can pre-set the types of information that each of these categories of people may see. For example, the user may categorize the conference attendee list (or a subset of) as "professional contacts". When a professional contact scans the encoded shirt or jacket, he or she may be linked to the user's LinkedIn page, prompted with a meeting invite, provided with a booth location at a trade show, and the like. In an embodiment, the user may link LinkedIn contacts to a "professional contacts" list in his or her profile so that anyone from the user's LinkedIn community can view the same material. Similarly, the user can add lists of friends or friend groups which, upon decoding the encoded clothing, may be privy to the user's Facebook profile, music playlists, and the like. For a member of the public, the user may link to a website, advertisement, blog, charity organization, and the like. Thus, in the above described example, the same code can be decoded in three different ways depending on who scans the code.

In some embodiments, the profile of the scanning user may be automatically provided to the server that is coupled to the scanning user's mobile device. The server may then determine to which category the scanning user's profile belongs based on, for example, a lookup table (such as the conference attendee list in the above example). The categories may be pre-set by the user of encoded clothing as described above or may be determined by the server. In some embodiments, the user of the encoded clothing may receive a notification on his or her mobile device to categorize the profile of a particular scanning user. In some embodiments, once a profile of a scanning user has been categorized (for example, into an "acquaintance" category), the user of the encoded clothing can re-categorize (or be prompted to re-categorize) the profile of the scanning user to another category (such as "close friend" category).

Returning to the example of a conference or tradeshow environment, the user may be prompted to register his or her encoded clothing to a particular profile at the start or registration phase of the conference. In an exemplary embodiment, even if a user does not have encoded clothing, his or her profile may be registered at a conference to facilitate social connections between attendees. For example, the registrations may be used in a game at a gathering or conference—such as a game to encourage attendees to scan as many people and collect rewards.

Example Use Cases: Communication and Encoded Fabrics

Figure 23:
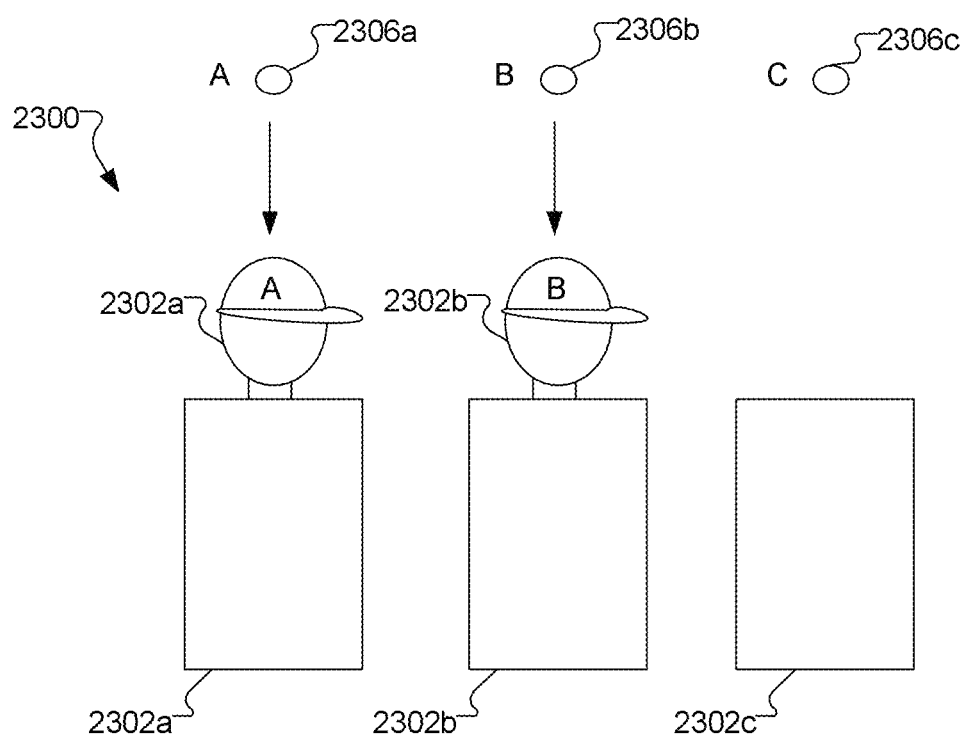
FIG. 23 is a diagram of exemplary stadium seating in which two users are viewing a sporting match between two teams.

In an exemplary embodiment, information can be communicated to users of encoded clothing. FIG. 23 is a diagram of exemplary stadium seating in which two users, user 2302*a* and user 2302*b*, are viewing a sporting match between two teams, Team A and Team B. User 2302*a* has headwear A with the logo, pattern, or color combination of Team A while user 2302*b* has headwear B with the logo, pattern, or color combination of Team B. Near each of the seats 2304*a*, 2304*b*, and 2304*c* is a corresponding data transmitter 2306*a*, 2306*b*, and 2306*c*, respectively. The data transmitter includes a scanner to scan the headwear of the user sitting in the corresponding seat and transmit data to the user depending on the team associated with the headwear. The user, having a data receiver and headphones, can receive information related to the sporting match via the headphones coupled to the data receiver. In this embodiment, because the users have headwear of opposing teams, transmitter 2306*a* transmits broadcasting by pro-Team A sportscaster to user 2302*a* while transmitter 2306*b* transmits broadcasting by a pro-Team B sportscaster to user 2302*b*. In some embodiments, the data transmitter-receiver system is a Bluetooth system or WiFi. In an exemplary embodiment, a data transmitter equipped with LiFi (line of sight wireless communication), modulated LEDs, or other optical communication device can transmit data to headwear having photovoltaic fibers. The photovoltaic fibers, for example, can receive optical signals from the optical transmitter to provide the user with the appropriate broadcasting. In some embodiments, a single data transmitter can be configured to transmit data to two or more users within signal range.

In an exemplary embodiment, encoded apparel can be used for navigation purposes. One or more users wearing encoded apparel can be tracked and provided information to move around a space or a building based on the encoding. For example, indoor navigation has been a particular challenge to conventional means such as GPS. By positioning scanners around a building, a person wearing encoded apparel can be scanned and information can be provided (by wireless communication such as WiFi, Bluetooth, cellular, radio, etc.) in real time or near real time to a mobile device. The information can include directions, maps, items of interest, and the like. A further advantage of such a scheme is that different information can be provided to different people. For example, advertisement can be targeted to specific users wearing encoded apparel in a commercial space (such as a shopping mall, downtown area of a city, etc.). An article of encoded apparel may be encoded with the profile of the user having information such as age, gender, residence, previous purchases, likes, dislikes, etc. This information can be used to better guide the particular user to areas of a commercial space suited to his or her tastes.

In another exemplary embodiment, encoded apparel can be scanned by aerial vehicles equipped with a scanner such as helicopters, planes, unmanned aerial vehicles (UAVs), drones, and the like. These aerial vehicles can provide information to the wearer of the encoded apparel. For example, in a rescue situation, a UAV may be able scan a side of a mountain or the woods for encoded apparel that may be otherwise difficult to detect. The UAV can attempt to transmit information to the wearer or use the location of the encoded apparel to aid a rescue effort.

In another exemplary embodiment, encoded apparel can be used for collision prevention. A vehicle equipped with a scanner may be able to detect the presence of a pedestrian having encoded apparel before the driver is able to see the pedestrian. For example, encoded apparel that can include reflective materials or materials with optical properties outside of the visible spectrum. Such clothing can be scanned by a scanner on a vehicle and processed to provide feedback to the driver or control system of the vehicle to avoid a collision with the pedestrian.

In some embodiments, the encoding of an article of clothing can be changed by the user in real time or near real time. For example, the user can access a portal to change profile information linked with the particular article to convey different information at different times. In this way, a user can communicate with a scanner at will.

In some embodiments, certain encoded fabrics can be "public use" articles in that they may be used a first user and encoded with a first information and subsequently released to be used by a second user and encoded with a second information, and so on. For example, an encodable life vest may be rented by a kayaker for a duration of time. At the rental registration, the life vest may be encoded with the kayaker's personal information in the case of an emergency such that, as previously described, a rescue vehicle is able to locate the kayaker. In another example, a user can communicate messages to a scanner. A user may change the encoding of his or her clothing based on the types of social settings he or she is in on a particular day. For example, the user may encode a first message or profile during the day time or in a professional setting and encode a second message or profile in the evening or casual setting. In another example, a user can pre-program messages and profiles such that the encoding of apparel changes over time or based on the location of the user. The server system having the encoded information for a particular article of clothing may be triggered to change the encoded information based on feedback from the user or the user's mobile device. The mobile device may provide information such as location of the user. The location of user, as described, can determine the type of information that is encoded in an article of clothing.

In an exemplary embodiment, military apparel can be encoded. For example, clothing with a camouflage pattern may be encoded such that a soldier wearing such clothing can be scanned in the field. A scanner used in the field can be configured to detect "friend v. foe" status, identity, or other information about the soldier. The scanner may be also used for rescue or recovery missions as described above. In some embodiments, weapons can be outfitted with a scanner to determine whether the weapon should fire upon trigger. In other words, the scanner may provide a control signal to allow a user to trigger the weapon.

In an exemplary embodiment, encoded apparel can be used to get through security checkpoints. For example, queues for security checkpoints at airports and stations are regularly held up due to the processing time needed to scan a person and their belongings. However, a person can don encoded apparel that is provides sufficient information to an agency such as the Transportation Security Administration (TSA) of the United States to process them at a faster rate than a person without encoded apparel.

In another exemplary embodiment, a unique code can be assigned to a group of articles owned by a single user instead of a unique code per article. For example, a hiker may choose encode all of his or her clothing or accessories with the same code. In another example, a unique code can be assigned per user, such as a soldier, such that the particular code is used in the camouflaging pattern in any or all of the soldier's gear. In an exemplary embodiment, a particular code can consist of a user code (which can be the same for a group of articles) and an article code (which can be unique per article of clothing or gear).

In an exemplary embodiment, the code can be stitched on or beaded onto an article. For example, a pattern of beads can encode information in similar ways to other methods of impressing codes described herein. In some embodiments, a craftsperson can make and encode his or her own apparel or accessories.

In an exemplary embodiment, an animal-skin pattern may be encoded with information. This can include fashion patterns leopard print, zebra print, snakeskin print, alligator skin print, and the like.

In some exemplary embodiments, apparel can be encoded with active fibers or materials, such as fibers that change color or properties based on heat exposure (thermochromic fibers) or electric current, voltage, or power (electrochromic fibers). For example, fiber affected by temperature can be used to encode at least two different data. The fiber in this example can be configured to have a first state at temperature T1 and a second state at temperature T2. In another example, encoded apparel having electrochromic fibers can be coupled to a controller that can determine amounts of current, voltage or power to be applied to the fibers. A user wearing the encoded apparel can determine the encoding by manipulating the controller. In some embodiments, the controller of the encoded apparel may be coupled, with or without a wire, to the user's mobile device, through which the user may affect changes to the fibers.

Note that any two or more of the methods or technologies of encoding of apparel may be combined or layered. In this way, the encoding may be enhanced or more data can be encoded in an article of clothing.

Exemplary Encoded Plaid in Apparel and Goods

Plaid (also referred to as 'tartan') is an exemplary aesthetic pattern that can be encoded with information. Typically, a plaid pattern includes horizontal and vertical bars of different thicknesses, spacing, colors, and opacities. In an exemplary embodiment, a two-dimensional code can be incorporated as part of a plaid pattern. In other words, a plaid pattern can constitute a two-dimensional code carrying information. In some embodiments, one or more aspects of a plaid pattern can be used to encode information such that the code is not discernable to a human but is decodable by a processor. Such an encoded plaid pattern may be hereinafter referred to as a "plaid code". An exemplary plaid code can include a first set of two or more strips in a first direction and a second set of two or more strips in a second direction, where the first set and second set are positioned relative to one another in the plane of a material, such as a fabric or a surface of a tangible item. For instance, the first set and second set can be positioned orthogonally relative to one another. In another instance, the first set and second set can be positioned at any angle greater than 0 degrees and less than 90 degrees. For instance, an encoded argyle pattern can include a first set of strips at an angle 30-60 degrees relative to the second set of strips.

Figure 24:
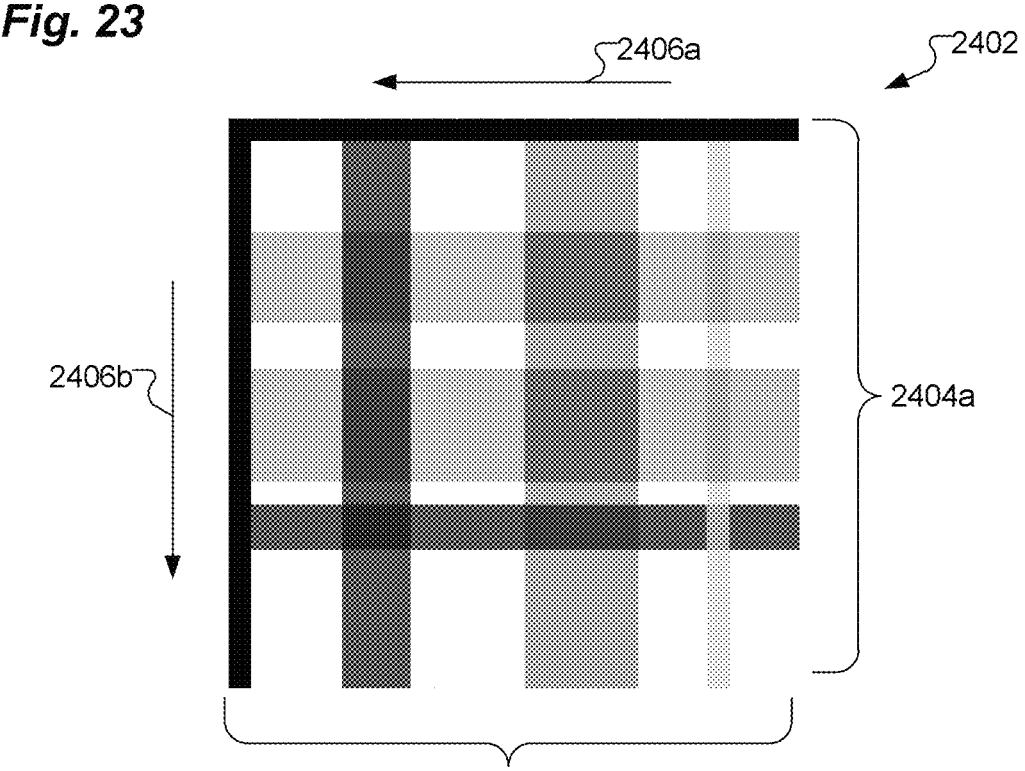
FIG. 24 is an exemplary embodiment of a repeatable unit of a plaid code that is encoded with a two-dimensional code.

In an exemplary embodiment of a plaid code, a plaid pattern is established by use of a "repeatable unit" that is repeated contiguously in or over a fabric. A plaid code implemented in this way can be virtually undetectable by the untrained human eye. The subtlety of such encoding promotes aesthetic desirability of the encoded article of clothing. FIG. 24 is an exemplary embodiment of a repeatable unit 2402 that is encoded with a two-dimensional code. Note that, in this example, not many strips are needed to encode. In some ways, the sparseness of the plaid code—low spatial frequency—allows a human eye to pass over the pattern without suspecting the presence of the code. For example, to enforce "low spatial frequency" in a particular plaid code, the repeatable unit may have no more than three strips in a first direction and no more than three data strips in a second direction. For a repeatable unit with a dimension of at least 75 mm in the first direction and at least 75 mm in the second direction, each strip would, in its minimum configuration, occupy 25 mm. There are at least three benefits associated with these constraints: (1) the pattern can be conveniently implemented in weaving or printing; (2) a pattern within those constraints can be designed to have aesthetic value; and (3) a camera on a smartphone at a suitable distance can read the encoded pattern. In another embodiment, however, it may be desirable to have a higher spatial frequency based on particular aesthetic choices or technical implementation details.

The distribution of the repeatable unit of the plaid code can further the goal of inconspicuousness. For example, the repeatable unit may be distributed over at least 70% of the visible portions of an article of clothing or tangible item (such as a purse, blanket, or furniture cover). In other cases, the repeatable unit may be distributed over at least 50% of the visible portions of an article of clothing or tangible item.

Figure 25:
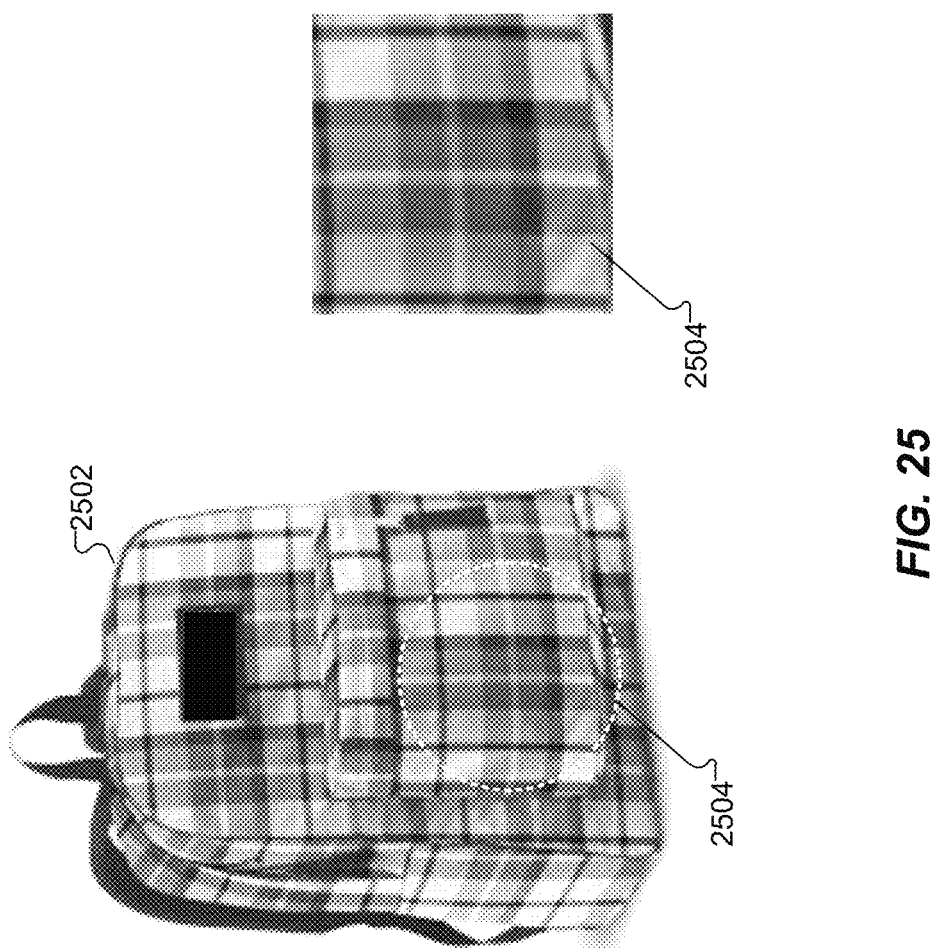
FIG. 25 is a backpack having an exemplary plaid pattern.

In an exemplary embodiment, the aesthetic component of the plaid code can be inspired initially from an existing plaid pattern or be composed by a plaid designer. From an established aesthetic component, the code component can be implemented. FIG. 25 is a backpack 2502 having an exemplary plaid pattern. A portion 2504 of the plaid is isolated. From this isolated portion 2504, the repeatable unit 2402 can be derived. The repeatable unit 2402 can be divided into a first set 2404a of strips in a first direction 2406a and a second set 2404b of strips in a second direction 2406b. Note that once a collection of unique repeatable units have been produced based an aesthetic goal, the repeatable units may undergo further scrutiny as a "quality check" on the attractiveness of a particular coded plaid. In this way, there may exist continuous feedback between the aesthetic and utility components of the plaid code.

Figure 26:
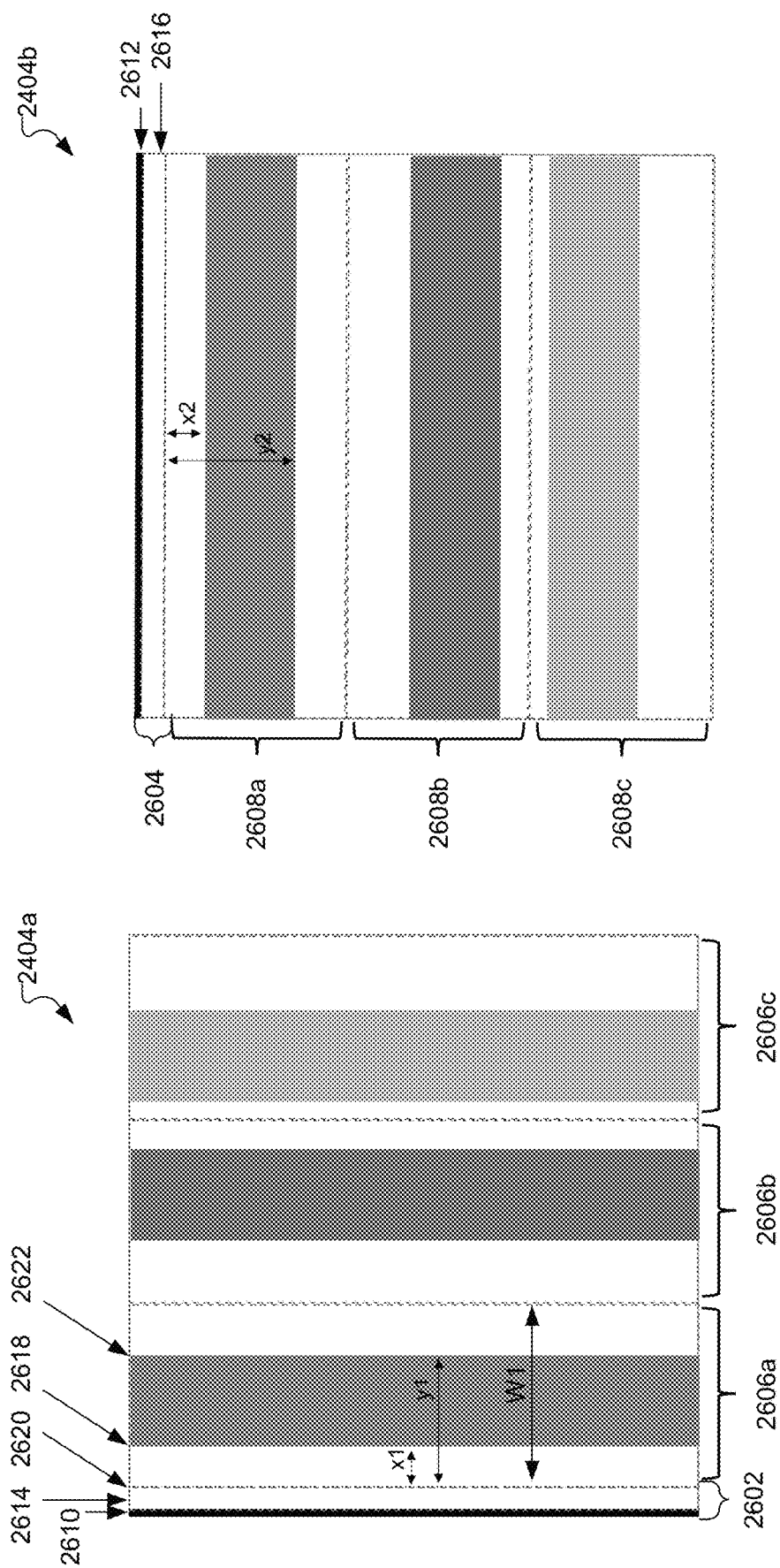
FIG. 26A is an exemplary first set of strips in the first direction for a repeatable unit and FIG. 26B is an exemplary second set of strips in the second direction for a repeatable unit.

FIG. 26A is an exemplary first set 2404a of strips in the first direction for a repeatable unit and FIG. 26B is an exemplary second set 2404b of strips in the second direction for a repeatable unit. In an exemplary embodiment, if the plaid code is implemented using weaving technology, the first direction corresponds to the 'weft' while the second direction corresponds to the 'warp'. Each of the first and second set 2404a, 2404b can be broken down further into a leading strip 2602 and 2604, respectively, and a set of associated strips 2606a-2606c and 2608a-2608c. Note that while this example includes three associated strips per leading strip, there can be as few as one associated strip. Each leading strip acts as a marker for the decoding of the associated strips in a particular direction. Note that, while the leading strip is shown to one side of the associated strips, the leading strip can be in any position within a repeatable unit. In the example shown, the leading strips 2602, 2604 each can include a dark stripe 2610, 2612, respectively, and a white stripe 2614, 2616, respectively. The dark stripe in a leading strip marks a "start" point that enables a scanner to identify the leading strip. The optional white stripe in a leading strip has the purposes of (i) allowing aesthetic adjustments to the plaid pattern and (ii) breaking the symmetry between the first set 2404a and second set 2404b. Breaking the symmetry refers to notion that the first set 2404a and second set 2404b are implemented such that they are not exactly the same. This allows a scanner, which can be configured to read the first set independently from the second set, to be able to identify the proper direction of a set of strips. In some embodiments, the scanner may not need to determine the direction of the strips before decoding. In an embodiment, each of the first and second directions of the plaid code may encode the same data.

In this example, each of the associated strips 2606a-2606c and 2608a-2608c correspond to a "symbol" having two transition edges. The first transition edge 2618 marks the line of transition from a first color to a second color. Note that x1 corresponds to a distance from a leading edge 2620 of the associated strip to the first transition edge 2618. The second transition edge 2622 marks the line of transition from a second color to a third color. Note that y1 corresponds to a distance from the leading edge 2620 of the associated strip to the second transition edge 2622. A first stripe in an associated strip may be defined by the leading edge 2620 and the first transition edge 2618. A second stripe in an associated strip may be defined by the first transition edge 2618 and the second transition edge 2622. In the example shown in FIGS. 26A-26B, the first color is white, the second color is gray (or a shade of black), and the third color is white. In other examples, the colors can be different from each other, shades or tints of the same color, and the like. In some embodiments, each stripe may contain multiple colors or patterns. In some instances, stripes that contain multiple colors or patterns may be configured such that their presence does not interfere with the detection of the transition edges, as detailed below. In some embodiments, y1 is required to be greater than x1 (y>x). In an example, x1=0 and y1=W1 causing the strip to be made up of one color. Note that the embodiments described herein for x1 and y1 also pertain to x2 and y2.

Figure 27:
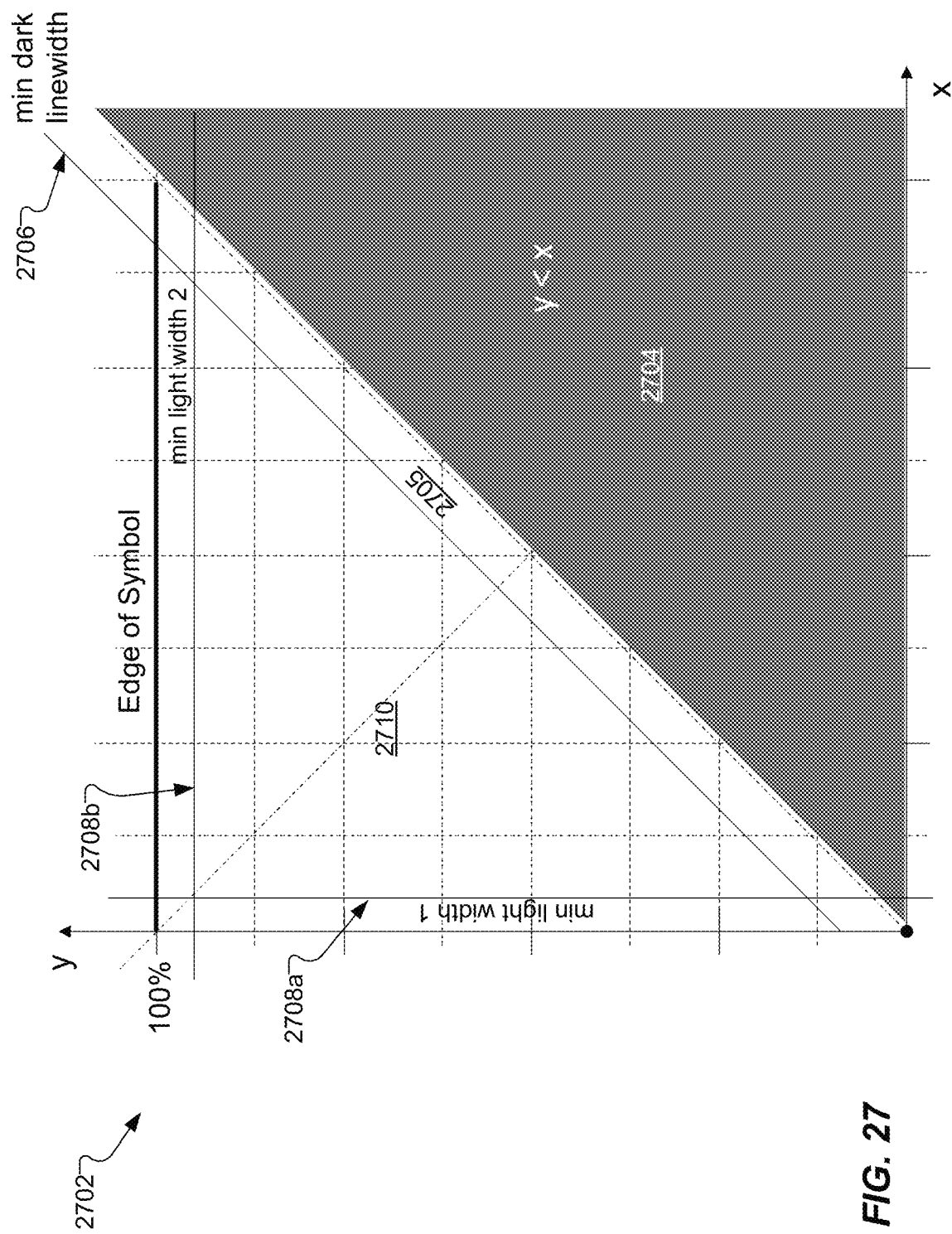
FIG. 27 is a plot of distances x and y illustrating constraints on distances x1, y1, x2, and y2 to encode the plaid pattern.

FIG. 27 is a plot of distances x and y illustrating constraints on distances x1, y1, x2, and y2 to encode the plaid pattern. Generally, the x-axis corresponds to either x1 or x2 and y-axis corresponds to the respective y1 or y2. The region 2704 of the plot 2702 for which y is less than x (y<x) is not considered to be valid coding space. In addition to the region 2702, the area ("min dark linewidth") 2705 defined between line 2706 and area 2702 further restricts the coding region to be within region 2710. This area 2705 is enforced to be greater than twice the width of the dark stripe 2610 in the leading strip 2602 to prevent an error in decoding. Specifically, this enforcement prevents the scanner from identifying a stripe in an associate strip (intended to carry encoded information) as the dark stripe 2610 of the leading strip 2602 (which, in contrast, marks the leading position of the associated strips). Note that region 2710 is further defined by lines 2708a and 2708b. Lines 2708a, 2708b corresponds to minimum light stripe widths of the optional light stripe 2614 within the leading strip 2602. In some embodiments, the minimum light stripe widths can be the same or different based on a favored aesthetic. For example, a minimum light stripe width may be greater than or equal to 10%, 30%, or 50% of the symbol width W1 (for the first direction) or W2 (for the second direction) with the goal of breaking symmetry between the strip(s) of the first direction relative to the strip(s) of the second direction, as discussed above.

Figure 28:
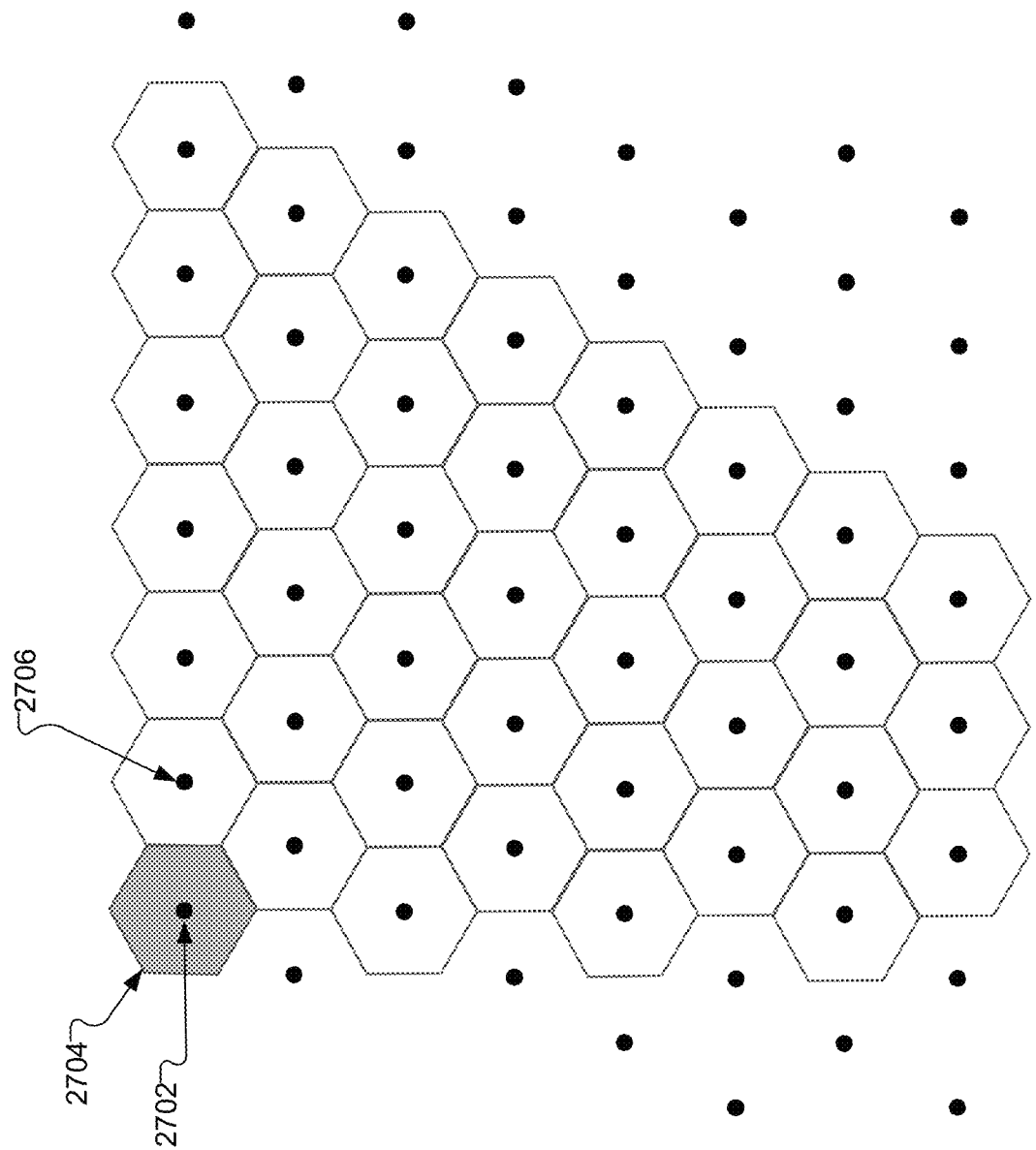
FIG. 28 is an exemplary representation of symbols for encoding information in plot.

FIG. 28 is an exemplary representation of symbols for encoding information in plot 2702. For maximum packing and protection, symbols are chosen from a hexagonal grid. For instance, the position of the origin 2702 of a hexagon 2704 encodes specific information. The hexagonal space 2704 prevents confusion with a neighboring symbol 2706.

Figure 29A:
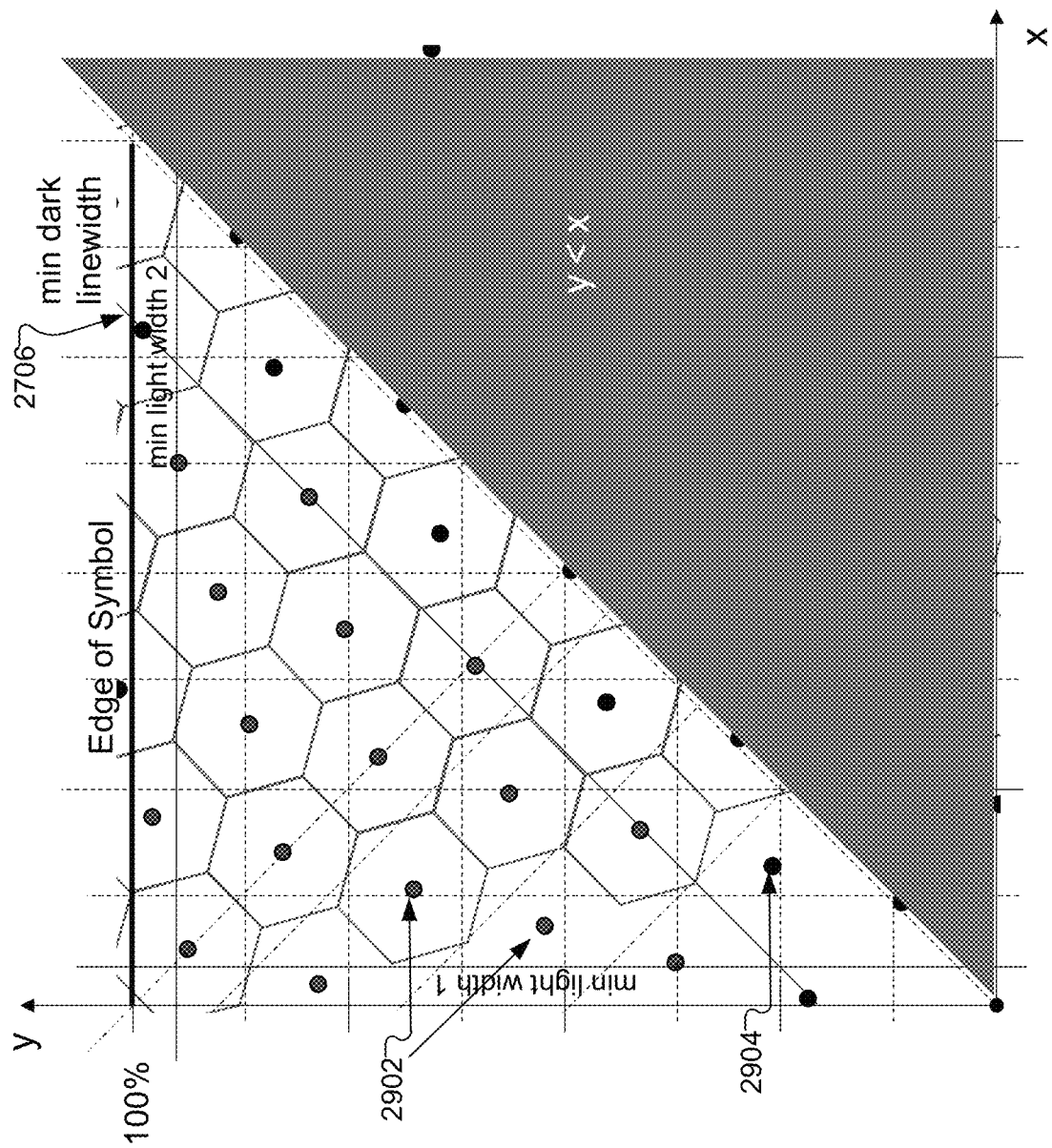
FIGS. 29A-29B are exemplary representations of symbols (such as those of FIG. 28) overlaid onto the plot of distances x and y (such as that of FIG. 27).
Figure 29B:
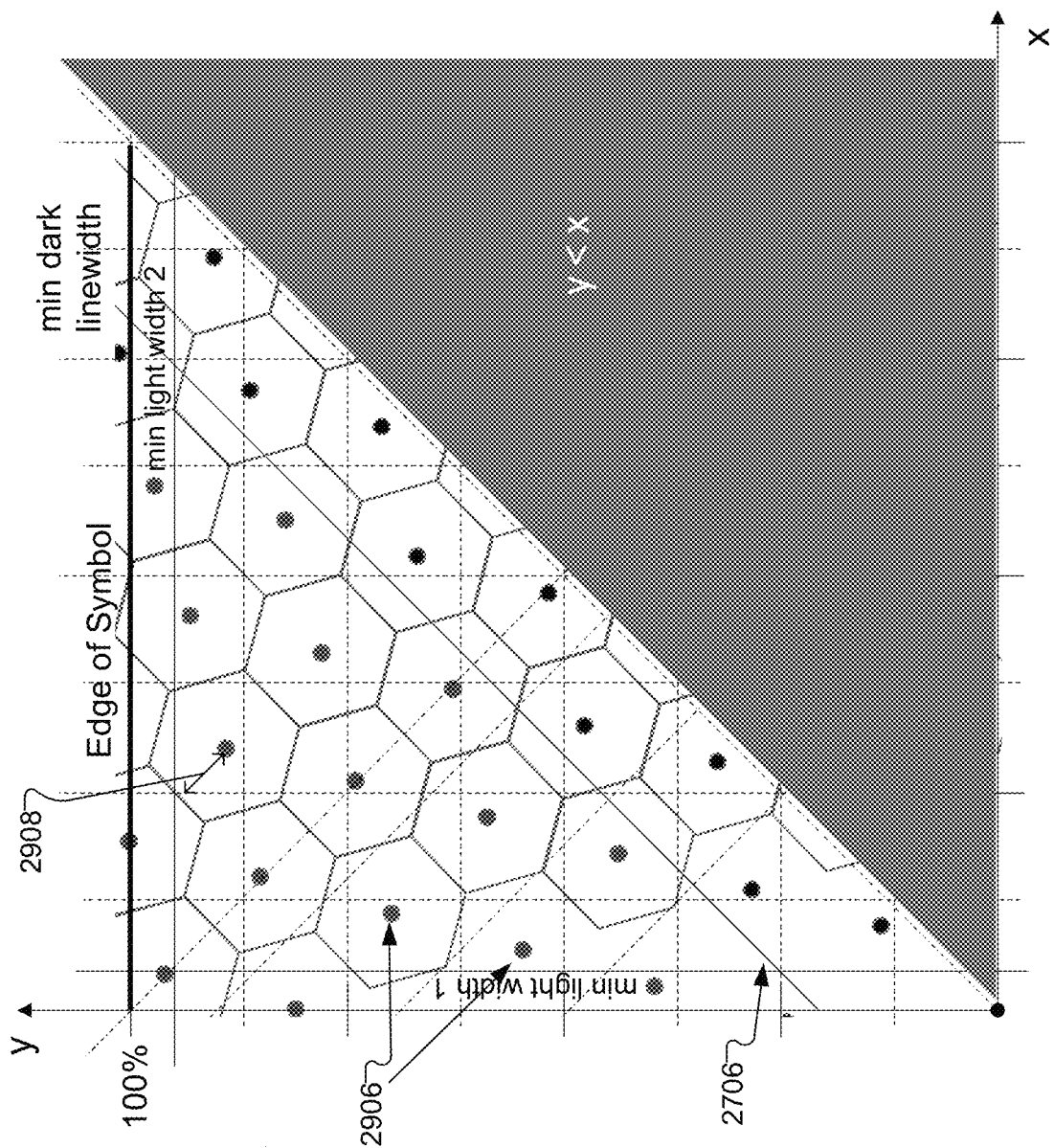

FIGS. 29A-29B are exemplary representations of symbols (such as those of FIG. 28) overlaid onto the plot of distances x and y (such as that of FIG. 27). In each of FIGS. 29A-29B, the overlaying of symbols onto the plot shows the number of possible codes that are encodable in an associated strip based on the various constraints described above. Those symbols that are encodable are shown to the top and left of the exemplary line 2706. Thus, for example, in FIG. 29A, symbols 2902 are encodable while symbol 2904 is excluded. Each of symbols 2902 have an x-distance and a y-distance that results in specific positions of the transition edges and thus one or more stripes of the associated strips.

FIG. 29A shows the symbols available for encoding in the first direction and FIG. 29B shows the symbols available for encoding in the second direction. Note that the symbols 2906 belonging to the second direction are shifted relative to the symbols 2902 belonging to the first direction by an amount 2908. This has the effect of breaking symmetry that may exist between the encoding of the strips in the first direction and the second direction. In some embodiments, the shifting amount 2908 can be half the size of the hexagonal space 2704.

In an exemplary embodiment, the shifting of the first set of strips in the first direction relative to the second set of strips in the second direction can encode information. In another exemplary embodiment, the colors, and their shades, used within the strips can further encode information.

Exemplary Decoding of Encoded Plaid

The above described encoding has advantages of being latent or otherwise hidden from detection by the human eye. However, in many embodiments, to enable proper decoding of the plaid code, the following exemplary guidelines are used:
  i) the repeatable unit is isolatable by the scanner;
  ii) the strips of the first direction are distinguishable from the strips in the second direction; and/or
  iii) the plaid code can be read in any orientation.

In some embodiments, to address the guideline (i) of isolatability of the repeatable unit, the dark stripe 2610 (or a stripe of a first color) of the leading strip 2602 is restricted to have a narrow width compared to the stripes in the associated strips 2606a-2606c (see FIGS. 26A-26B). Alternatively, the stripes of the associated strips 2606a-2606c have widths wider than the width of the dark stripe 2610.

In some embodiments, to address the guideline (ii) of distinguishability of the strips of the first direction from the strips of the second direction, a light stripe 2614 of the leading strip 2602 can be included. Further, the width of the light stripe 2614 of the first direction 2404a is different from the width of the light stripe 2616 of the second direction 2404b (see FIGS. 26A-26B). In some embodiments, to address guideline (ii), the grid of encoded symbols of the associated strips 2606a-2606c in the first direction 2404a is shifted with respect to the grid of encoded symbols of the associated strips 2608a-2608c in the second direction 2404b (see FIGS. 29A-29B).

Figure 30A:
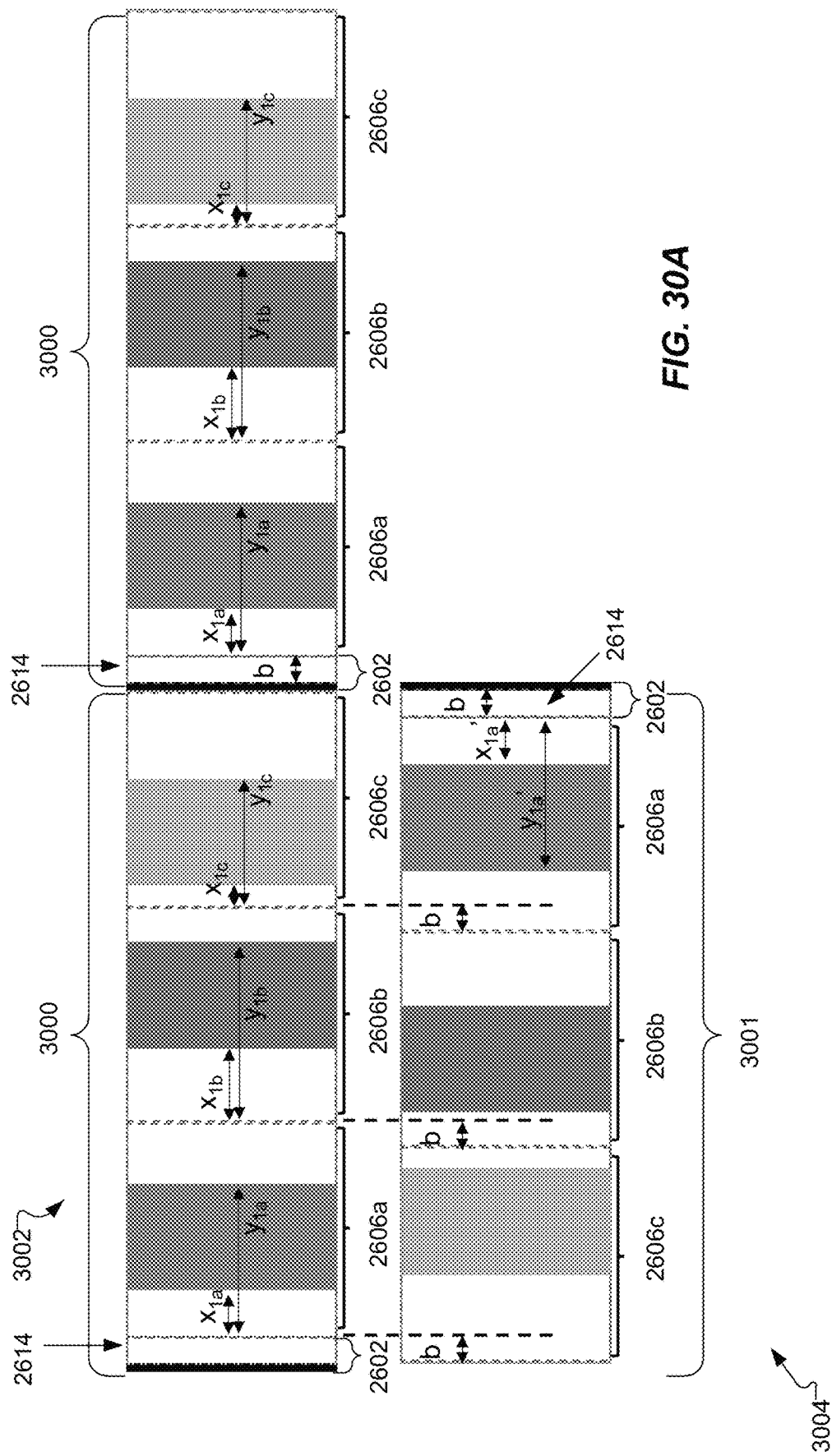
FIG. 30A is a diagram showing exemplary sets of strips in the first direction.

As previously discussed, the leading strip may be positioned in any part of a repeatable unit. For decoding, however, such positioning may present a challenge in correctly identifying the direction of the associated strips. Thus, in some embodiments, to address the guideline (iii) of the plaid code's being read in any orientation, the validity of the encoded symbols can be assessed by the processor coupled to the scanner. FIG. 30A is a diagram showing exemplary sets 3000a, 3000b of strips 2606a-2606c in the first direction 2404a (where 3000a=3000b). The diagram also shows a set 3001 of strips flipped horizontally to the left such that set 3001 is a mirror image of 3000a or 3000b. This scenario may happen if the fabric having the encoded plaid is flipped in the process of manufacturing apparel or a tangible item (such as a backpack, messenger bag, luggage, and the like) and the plaid visible to the scanner is a mirror image of the intended orientation of the plaid code.

Figure 30B:
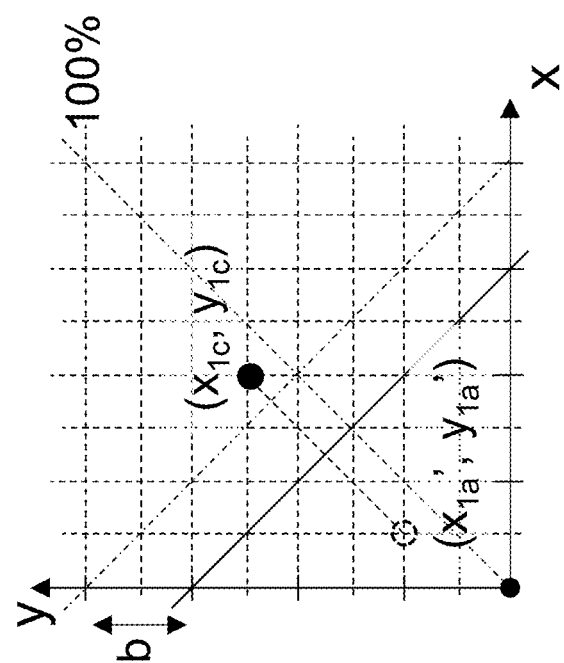
FIG. 30B is a plot illustrating the positions of valid symbol ($x_{1c}$, $y_{1c}$) and invalid symbol ($x_{1a}'$, $y_{1a}'$) in the x-y space.

The transition edges $x_{1a}'$ and $y_{1c}'$ of set 3001 can be defined by the following relationships:

$$x_{1a}'=(1-b)-y_{1c}$$

$$y_{1c}'=(1-b)-x_{1c}$$

where b is the width of the light padding stripe within the leading strip 2602. The processing of the plaid code ensures that if $(x_{1c}, y_{1c})$ is a valid symbol and that the possible symbol $(x_{1a}', y_{1a}')$ is not a valid symbol. This ensures that a valid code exists in one direction (such as the direction along the set 3000) and not in the mirror direction (such as the direction along set 3001). FIG. 30B is a plot illustrating the positions of valid symbol $(x_{1c}, y_{1c})$ and invalid symbol $(x_{1a}', y_{1a}')$ in the x-y space.

Figure 31:
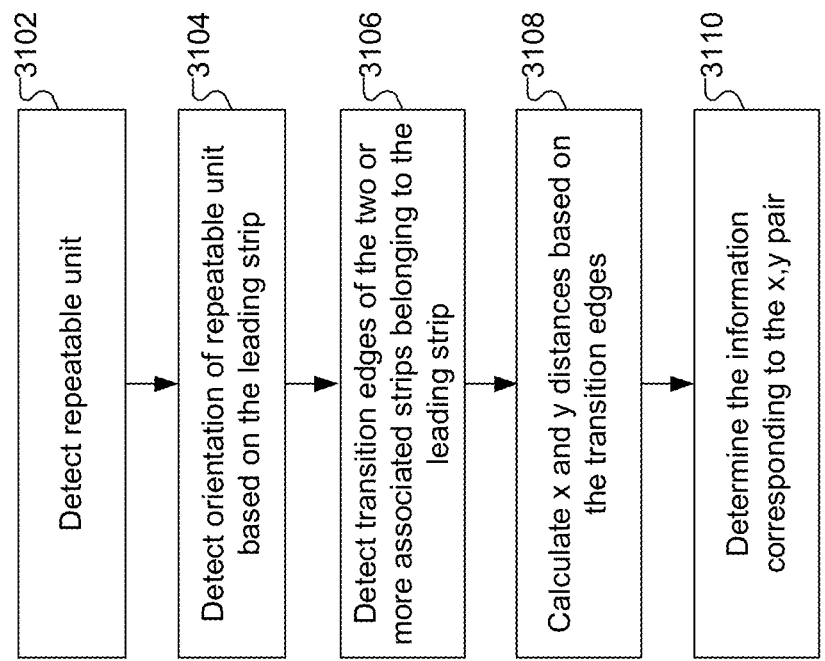
FIGS. 31-33 are flowcharts of exemplary methods of decoding the plaid code described herein.

FIG. 31 is a flowchart of an exemplary method of decoding the plaid code described herein. Process 3102 of the decoding method is the detecting, by a scanner, of the repeatable unit of the plaid code. This can be executed by identifying the leading strip as described in detail above. Process 3104 is the detecting, by the scanner, of the orientation of the repeatable unit based on the leading strip. Process 3106 is the detecting, by the scanner, of the transition edges of the two or more associated strips belonging to the leading strip. The transition edges can be detected by edge detection algorithms such as Hough, Canny, Derish, differential, Sobel, Prewitt, Roberts cross, and the like. Process 3108 is the calculating, by a processor coupled to the scanner, of the x and y distances of each of transition edges of the associated strips that encode information. Process 3110 is the determining, by the processor, the information corresponding to the x, y pair. The information can be determined by accessing a lookup table of codes. The lookup table may be stored in a server system to which the processor has access.

Figure 32:
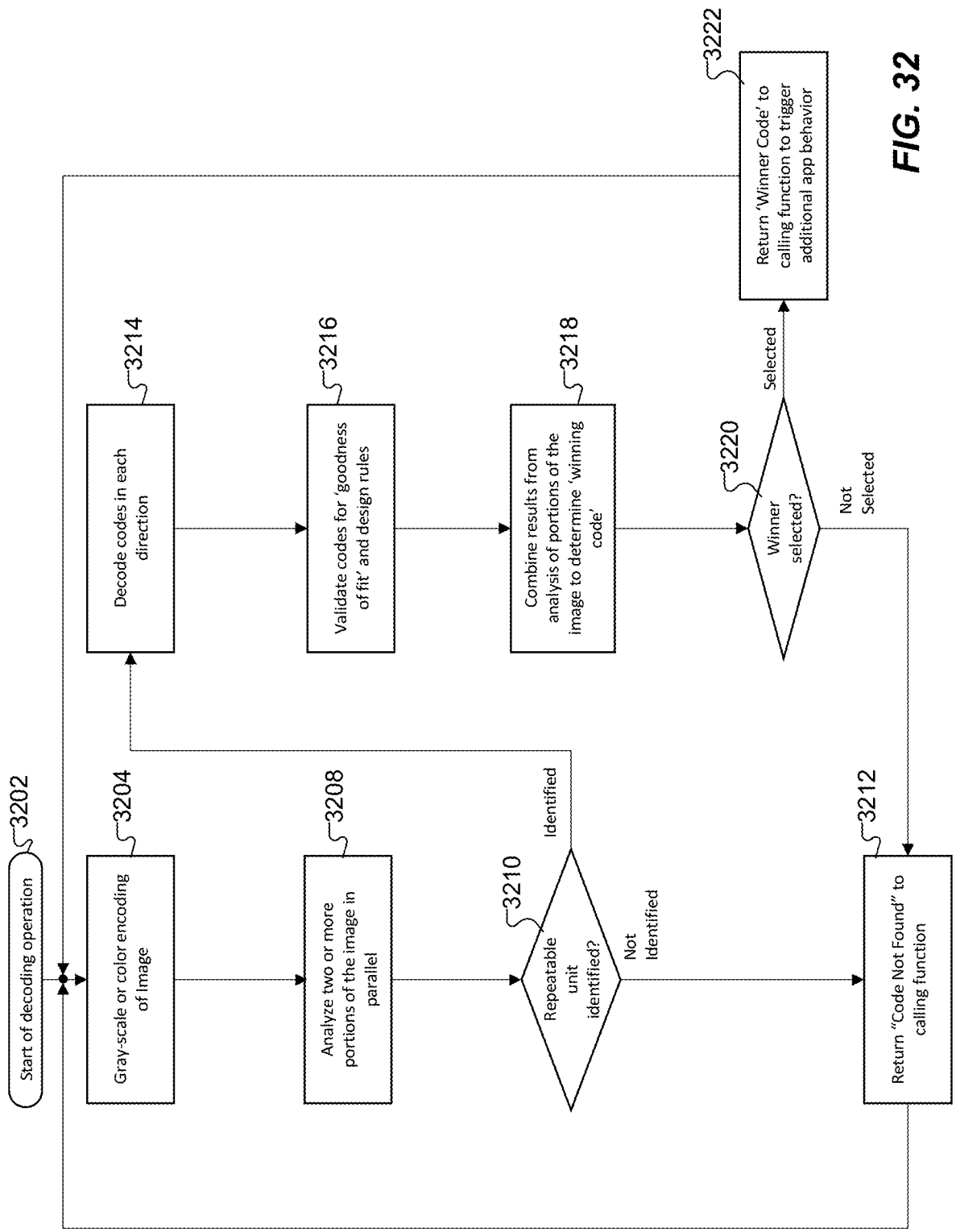

FIG. 32 is a flowchart of an exemplary method of decoding the plaid code described herein. At the start of the decoding process (process 3202), an image of a plaid code has been captured by camera or other image capture device. At process 3204, the image is encoded, by a processor coupled to the camera, in grayscale or color. At process 3208, one or more portions of the image are analyzed in parallel. If, at process 3210, a repeatable unit is identified, then control passes to process 3214. In process 3214, each set of strips of the plaid is decoded. In other words, the first set of strips in the first direction is decoded and the second set of strips in the second direction is decoded. In process 3216, each of the symbols is validated for 'goodness of fit' and the code is validated against design rules by the processor. Exemplary 'goodness of fit' checks include: (i) each strip (or symbol corresponding to the strip) should be more than 60% matched with an ideal shape stored in a database accessed by the processor; (ii) the light to dark contrast within a strip should be greater than 4%; and (iii) best fitting symbol should have a greater than ⅔₃ matching percentage than other symbols.

Design rules can be characterized as the aesthetic component of a plaid code, as described in detail above. In an embodiment, design rules can include constraints on choosing certain symbols in the x-y space for one or more of the strips of the repeatable unit. In some embodiments, the results of the decoded strips may be checked against a database of aesthetically acceptable plaid patterns. For example, an exemplary database entry may include the following: a set of strips in a direction of a repeatable unit containing a first strip with a first stripe having a width of 2 mm of a first color, a second stripe having a width of 10 mm of a second color, and a third stripe having a width of 21 mm of a third color; a second strip with a first stripe having a width of 7 mm of a first color, a second stripe having a width of 25 mm of a second color, and a third stripe of 1 mm of a third color; and a third strip with a first stripe having a width of 1 mm of a first color, a second stripe having a width of 25 mm of a second color, and a third stripe having a width of 7 mm of a third color. Such entries create visually pleasing dimensions while maintaining readability. In process 3218, the results of the decoded strips are combined to determine if there is a 'winning code'. In an embodiment, the 'winning code' can be the result that is the closest match to an entry in a lookup table. If, at process 3220, a winning code is determined, then the winning code is returned to the calling function in order to trigger additional application behavior, in process 3222. If no unit cells are located at process 3210 or no winning code is determined at process 3220, then the message "Code Not Found" is provided to the calling function at process 3212, and control passes back to the start of the decoding process (process 3202). In some embodiments, the calling function provides the message to the user interface to provoke the user to rescan the image.

Figure 33:
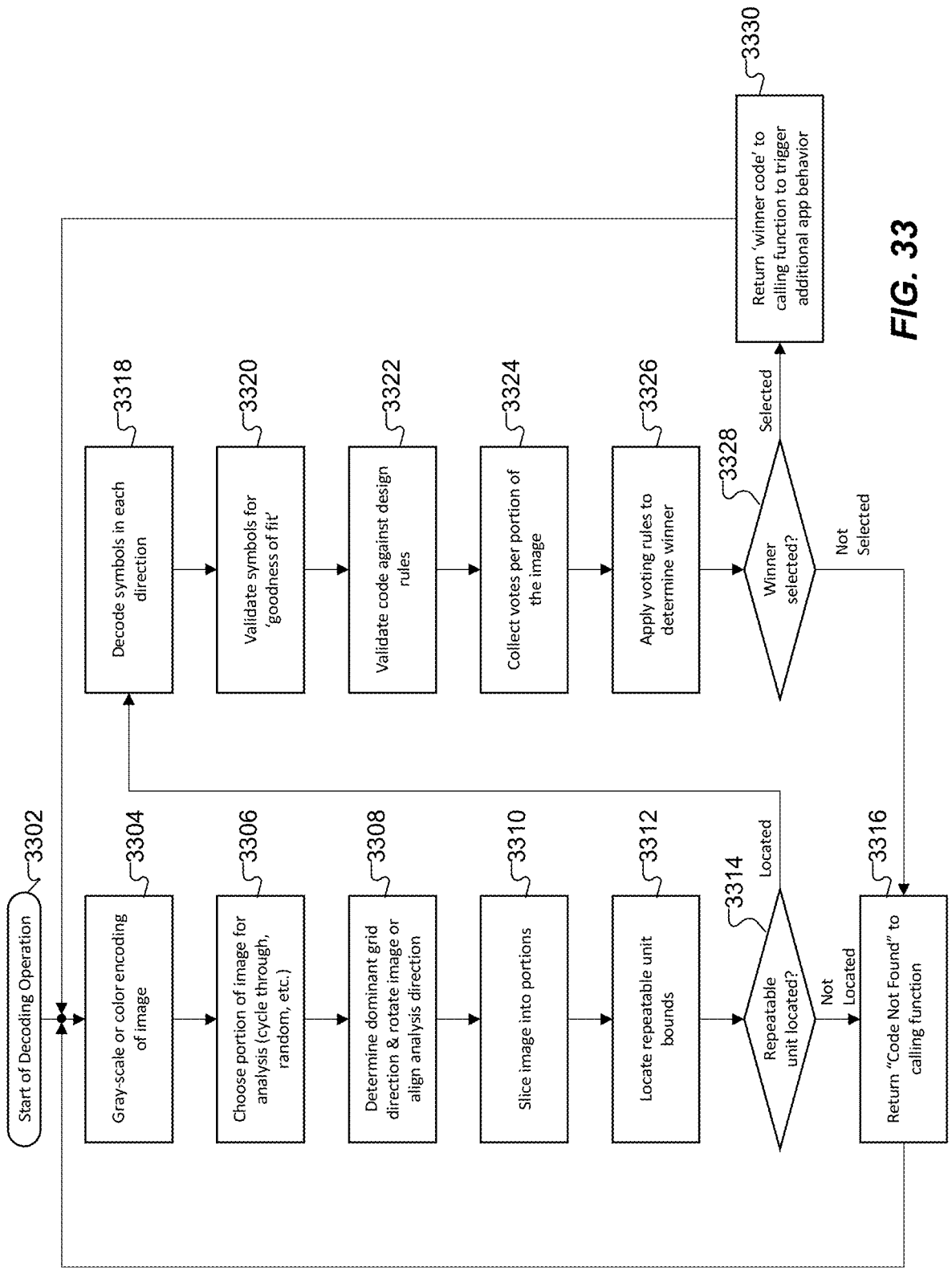

FIG. 33 is a flowchart of an exemplary method of decoding the plaid code described herein. At the start of the decoding process (process 3302), an image of a plaid code has been captured by camera or other image capture device. At process 3304, the image is encoded, by a processor coupled to the camera, in grayscale or color. At process 3306, one or more portions of the image are chosen for analysis by the processor. The portions can be chosen by the processor at random or cycled through for analysis. At process 3308, the dominant direction of the image can be determined by the processor and designated as the analysis direction. The dominant direction may be either the first or second directions. Subsequently, the image can be rotated to the analysis direction or the analysis direction can be aligned to the image by the processor. At process 3310, the image can be divided into portions by the processor. At process 3312, a repeatable unit can be identified by the processor. In some cases, the leading strips can be initially identified followed by the identification of the associated strips that constitute the repeatable unit. If, at process 3314, the repeatable unit is identified, control passes to process 3318. If, at process 3314, the repeatable unit is not identified, then, at process 3316, the message "Code Not Found" is provided to the calling function and control passes back to the start of the decoding process (process 3302). In some embodiments, the calling function provides the message to the user interface to provoke the user to rescan the image. Note that, in the above embodiments of decoding methods, one or more processes can be removed or added to the methods to achieve an acceptable outcome.

At process 3318, the strips in each direction of the repeatable unit are decoded, by the processor, to determine the corresponding symbols. At process 3320, the symbols are validated for 'goodness of fit' and, at process 3322, the code is validated against design rules by the processor. At process 3324, the processor collects votes per portion of the image. The votes are cast by features of the image seeking compatible model parameters. This scheme is used in an edge detection technique called the Hough transform. At process 3326, the processor applies voting rules (of the edge detection technique) to determine if there is a winning code. If, at process 3328, a winner is not selected, then control passes to process 3316. If, at process 3328, a winner is selected, then, at process 3330, the winning code is returned to the calling function to trigger additional application behavior. In an embodiment, additional application behavior can include displaying the decoded message of the plaid code on the user interface. In another embodiment, the behavior can include proving the winning code for further processing by, for example, a social media server system.

In an exemplary embodiment, the plaid code can be configured such that a scanner, configured to scan such a code, can collect portions of two or more repeatable units to successfully decode the plaid code. For example, the scanner may collect a first portion of a first repeatable code and a second portion of a second repeatable code. If the portions have any overlap or can be pieced together side-by-side to reconstruct a single repeatable unit, then the collected portions can be processed to enable efficacious decoding. If the features, such as folds, pockets, wrinkles, etc., of an article of clothing or tangible item force the repeatable unit to be represented in portions less than one whole unit, the scanner may be able to "piece" together the repeatable unit for decoding. Returning to the example of the backpack 2502, some features of the backpack may not contain a whole single repeatable unit (such as the sides of the backpack) and thus may require the "piecing" together of the unit for successful decoding.

In another exemplary embodiment, the scanner of the plaid code is configured to decode the first set of strips in the first direction separately from the second set of strips in the second direction. In another exemplary embodiment, the scanner is configured to decode the combination of the first set and the second.

In another exemplary embodiment, the size of the repeatable unit can be determined by a minimum distance required for imaging, and ultimately decoding, the plaid code. For example, a mobile phone having a camera positioned too close to the article of clothing having the repeatable unit and, therefore, may not be able to successfully decode the plaid code. In an exemplary repeatable unit, there can be four strips having equivalent widths (1 leading strip and 3 data strips). The leading dark stripe is about 10% of the symbol width, which makes it 2.5% of the repeatable unit width (in one direction), or the repeatable unit is 40 times the width of the leading dark stripe. If the leading dark stripe is 25 pixels, repeatable unit would be 1000 pixels, approximately filling the display of a smartphone. This is unlikely in a real use case. On the other hand, if the leading dark stripe is 1 pixel, the repeatable unit is 40 pixels. This is the resolution limit for the display and would result in a repeatable unit that is barely 4% of the display width. Thus, the actual operation range is in between these two extremes.

Exemplary Application for Interacting with Encoded Apparel and Tangible Items

A user can be enabled to interact with encoded articles, such as apparel or tangible items, via a user interface coupled to a scanner, such as a camera. An application executing on a mobile electronic device, such as a smartphone, tablet, laptop, notebook computer, and the like, can be used to interact with the encoded articles.

FIG. 34A is an exemplary start screen for an exemplary application interface. The start screen 3402 includes a logo 3404 and login 3406 options for the user to input login credentials. FIG. 34B is an exemplary scan screen for the exemplary application interface. The scan screen 3408 includes the view through the coupled camera lens. The view includes a scan frame 3410 prompting the user to align an encoded article 3412 within the bounds of the frame 3410 (the bounds, in this case, indicated by the corner lines of the frame). The scan screen 3408 includes a profile button 3414 and a prompt button 3416 labelled "Go and find some Lookables". The profile button 3414 leads to a profile screen 3502 and the prompt button 3416 leads to one or more "lookable" screens 3602*a*-3602*d* describing the types of articles to scan. The scan screen 3408 also includes a timeline button 3418 to access a timeline screen 3420 of events in chronological order, as illustrated in FIG. 34C.

Figure 35:
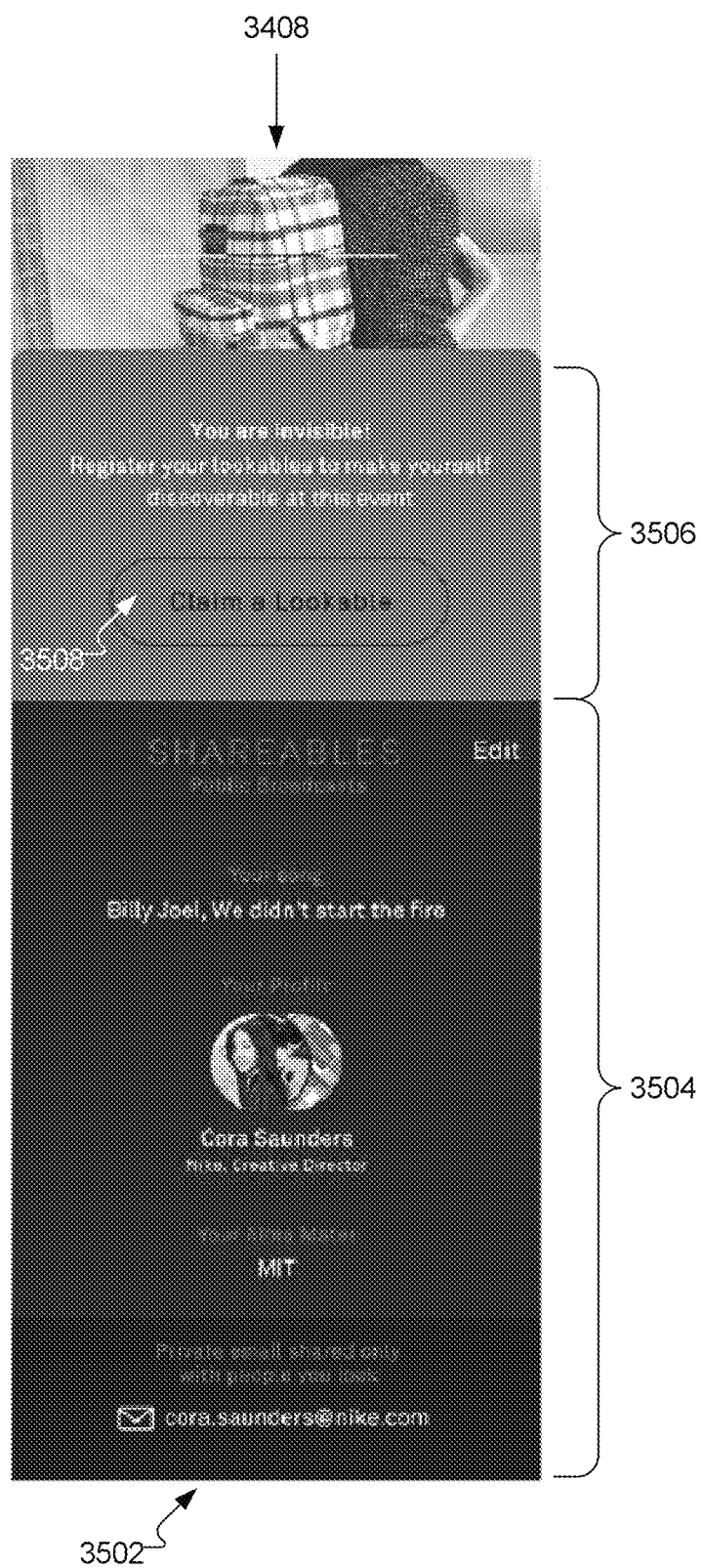
FIG. 35 is an exemplary profile screen for the exemplary application interface.
Figure 36B:
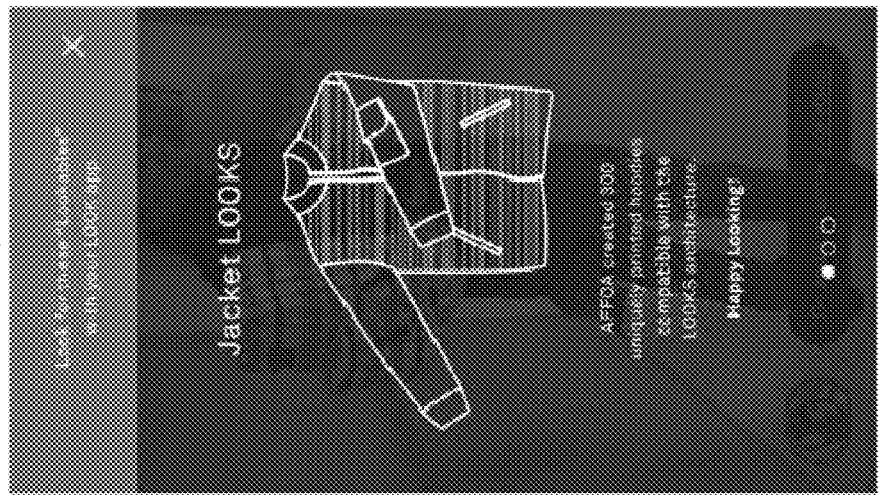
FIGS. 36A-36D are exemplary article screens for the exemplary application interface.
Figure 36A:
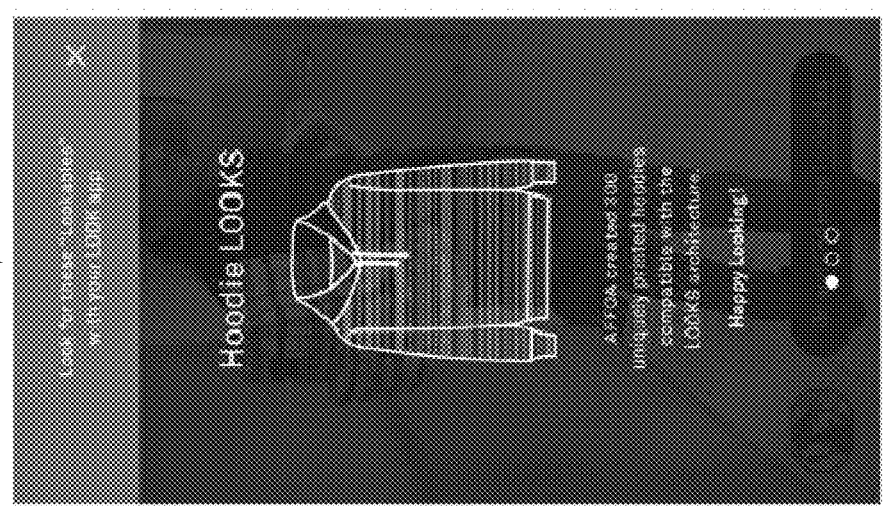
Figure 36D:
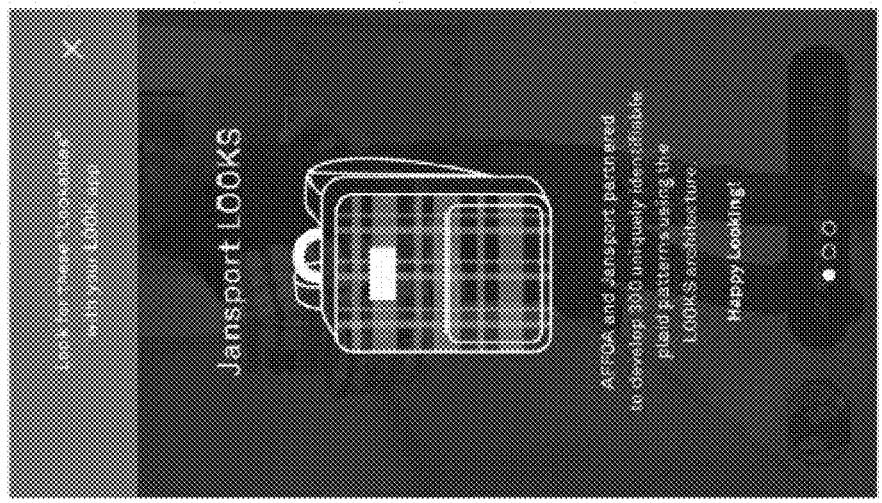
Figure 36C:
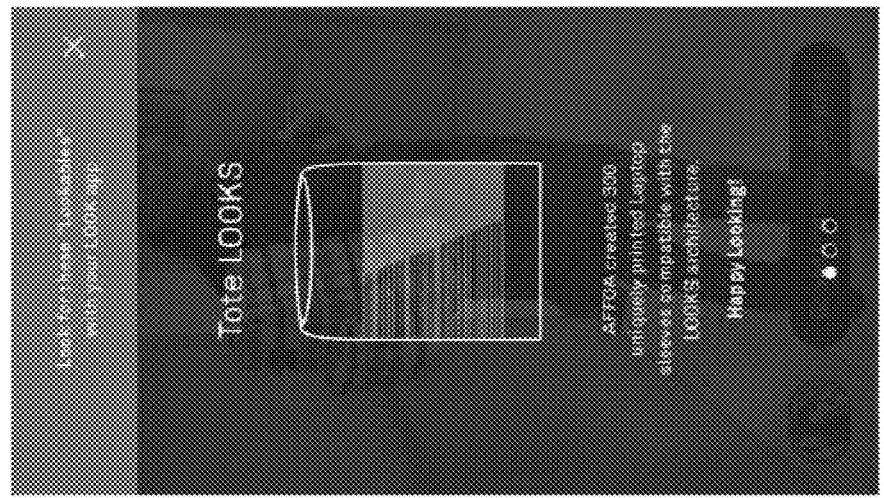

FIG. 35 is an exemplary profile screen for the exemplary application interface. The profile screen 3502 can be accessed from the profile button 3414 on screen 3408. The profile screen 3502 includes an editable portion 3504 to include user profile details such as a name, title, alma mater, song, email address, and the like. The profile screen 3502 also includes an article related portion 3506 prompting the user to claim or register one or more scannable articles with a button 3508 labelled "Claim a Lookable". Button 3508 leads to a claim scan screen 3702 as illustrated in FIG. 37A and described further below.

FIGS. 36A-36D are exemplary article screens for the exemplary application interface. The article screens 3602*a*-3602*d* can be accessed from the prompt button 3416 on screen 3408. Each of the article screens 3602*a*-3602*d* show a type of article, such as a hoodie 3602*a*, a jacket 3602*b*, a tote or laptop sleeve 3602*c*, or a backpack 3602*d*.

Figure 37B:
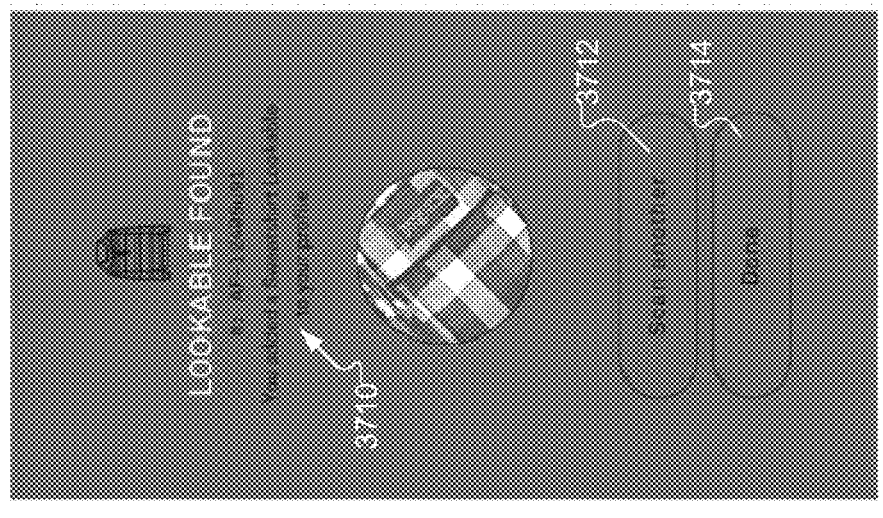
FIG. 37B is an exemplary confirmation screen following the scanning of an eligible article (referred to as a "Lookable").
Figure 37A:
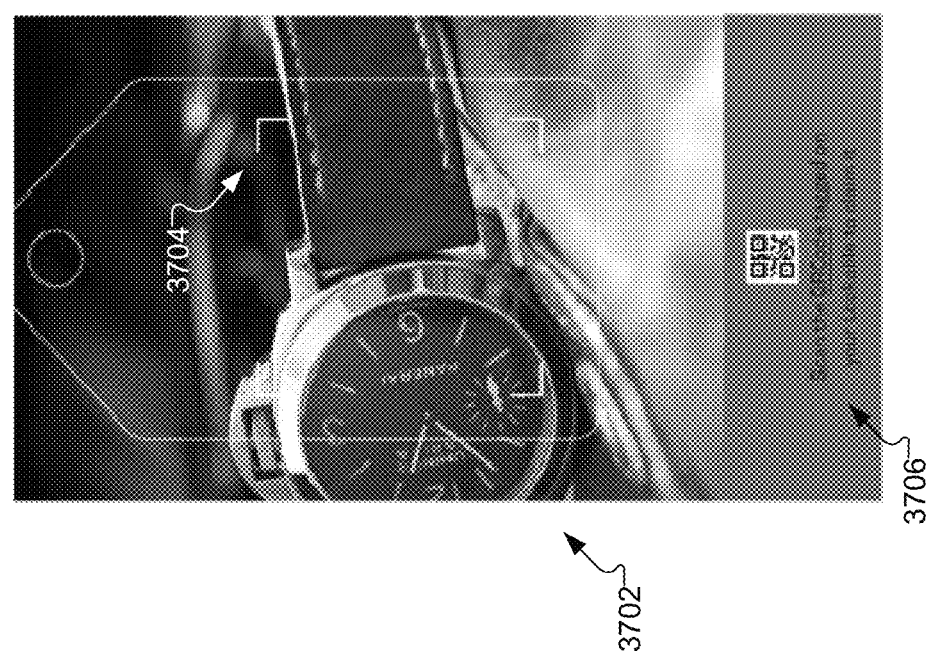
FIG. 37A is an exemplary claim scan screen for the exemplary application interface.
Figure 38A:
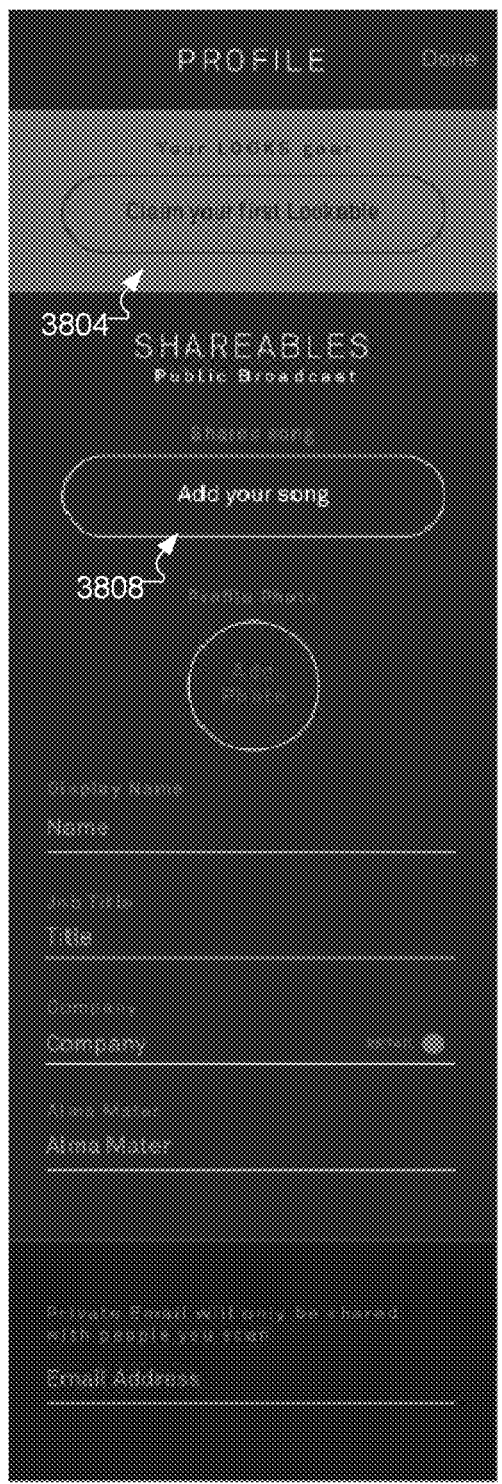
FIGS. 38A-38B are exemplary profile edit screens for the exemplary application interface.
Figure 38B:
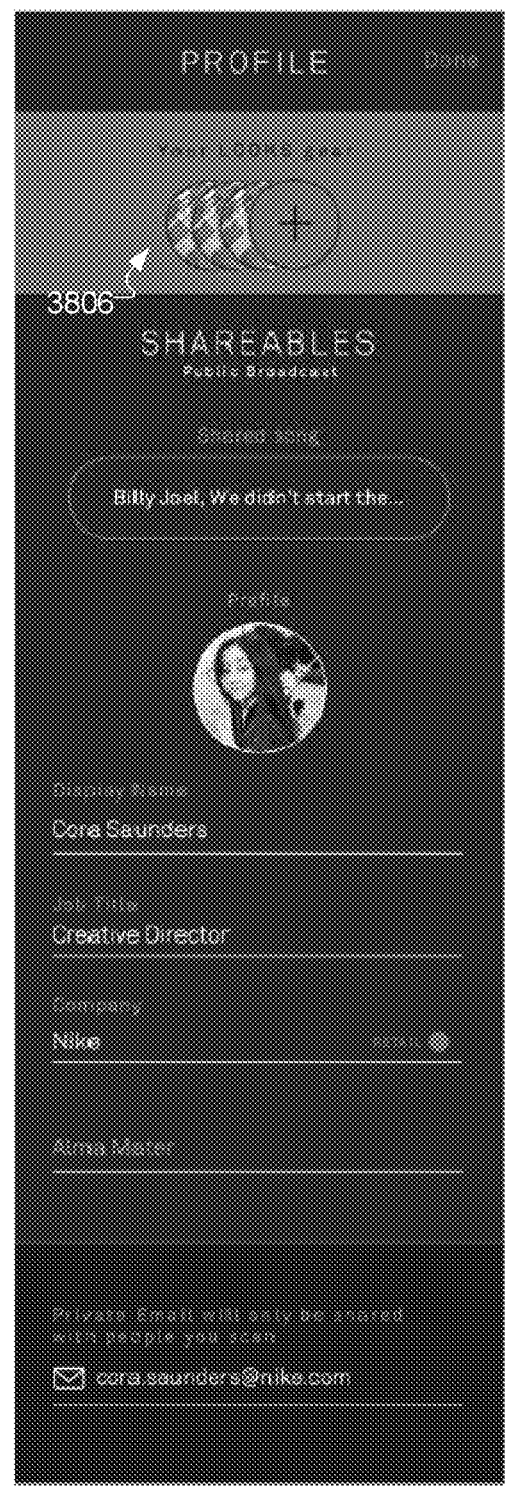

FIG. 37A is an exemplary claim scan screen for the exemplary application interface. The claim scan screen 3702 includes a scan frame 3704 with a prompt 3706 to scan the QR code tagged to an article with the goal of claiming or registering the particular article with the profile information provided in the profile screen 3502. Note that, other than scanning the QR code of a particular article, the process for claiming the article can also achieved by scanning the encoded pattern of the article (see, e.g., FIGS. 6-7 for examples of associating an article with a user). FIG. 37B is an exemplary confirmation screen following the scanning of an eligible article (referred to in this embodiment as a "Lookable"). Once the article has been scanned, a "Lookable found" confirmation screen 3708 includes a message 3710 that confirms that a "Lookable" such as a sweatshirt has been added to the user's profile. The confirmation screen 3708 includes a prompt button 3712 to scan another article or to complete the task ("Done" button 3714"). FIGS. 38A-38B are exemplary profile edit screens for the exemplary application interface. Each of the screens 3802*a*-3802*b* can be the result of selecting "Edit" in screen 3502. Screen 3802*a* shows the editable fields related to a user's profile before a user has filled the fields. The "Claim your first Lookable" button 3804 leads to the claim scan screen 3702. Once an article has been scanned, the button 3804 changes to a plus button 3806 indicating the number of articles claimed by a particular user (in this case, three articles). Screen 3802*b* illustrates some filled out text fields, such as the name and job title of the user. Screen 3802*b* also includes a button 3808 to add a song to the user's profile. In some embodiments, the screen can include a text field for a message or a mixed media field to share images, audio, or video.

Figure 39:
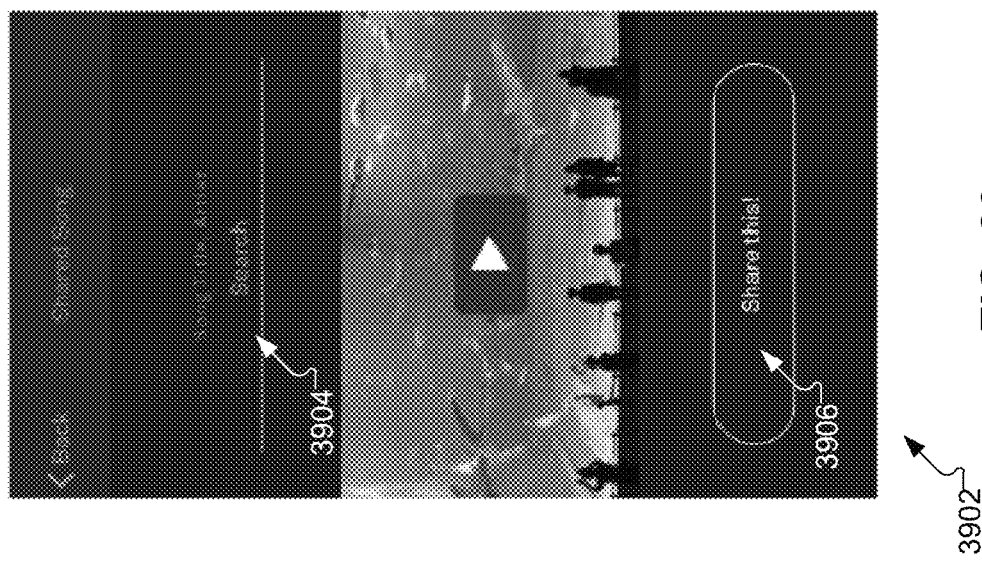
FIG. 39 is a shared song screen for the exemplary application interface.

FIG. 39 is a shared song screen for the exemplary application interface. The shared song screen 3902 has a search field 3904 for searching for music from a database or web based application, such as YouTube or Vevo. Once a song is selected, the button 3906 can be used to add the song to the profile, as shown on screens 3802*a*, 3802*b*.

Figure 40:
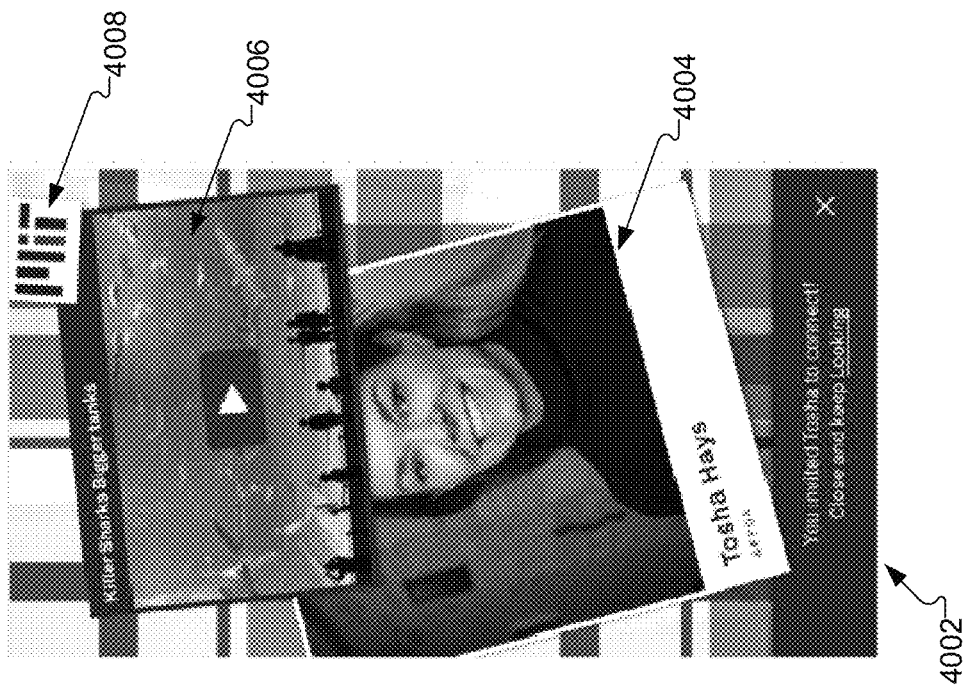
FIG. 40 is a connection screen for the exemplary application interface.

FIG. 40 is a connection screen for the exemplary application interface. The connection screen 4002 can result on the user interface when the mobile device is used to scan an encoded article, such as the backpack 3412 in screen 3408. The connection screen 4002 can include a picture 4004 of the user associated with encoded article, a shared song 4006, and alma mater 4008.

Enhanced Pattern Decoding

Figure 41A:
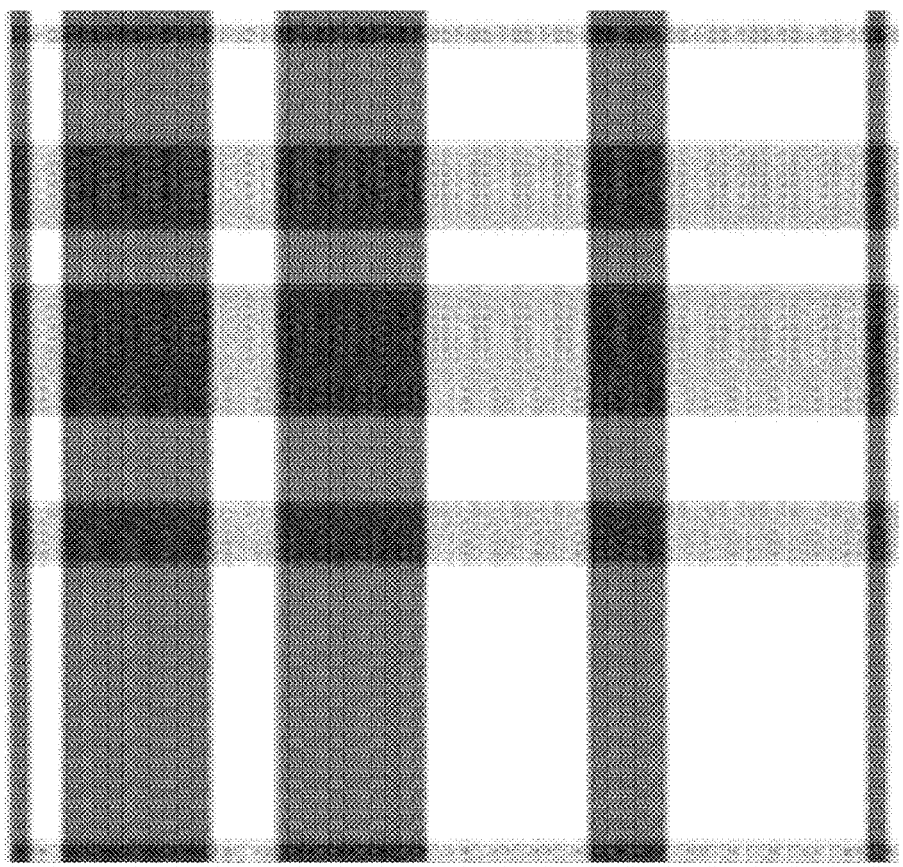
FIGS. 41A, 41B, and 41C illustrate an enhanced embodiment of the present invention for decoding fabric patterns in which repetition of the pattern is not strictly necessary and, when there is repetition, the repeated units can be arbitrarily positioned with respect to one another.
Figure 41B:
Figure 41C:
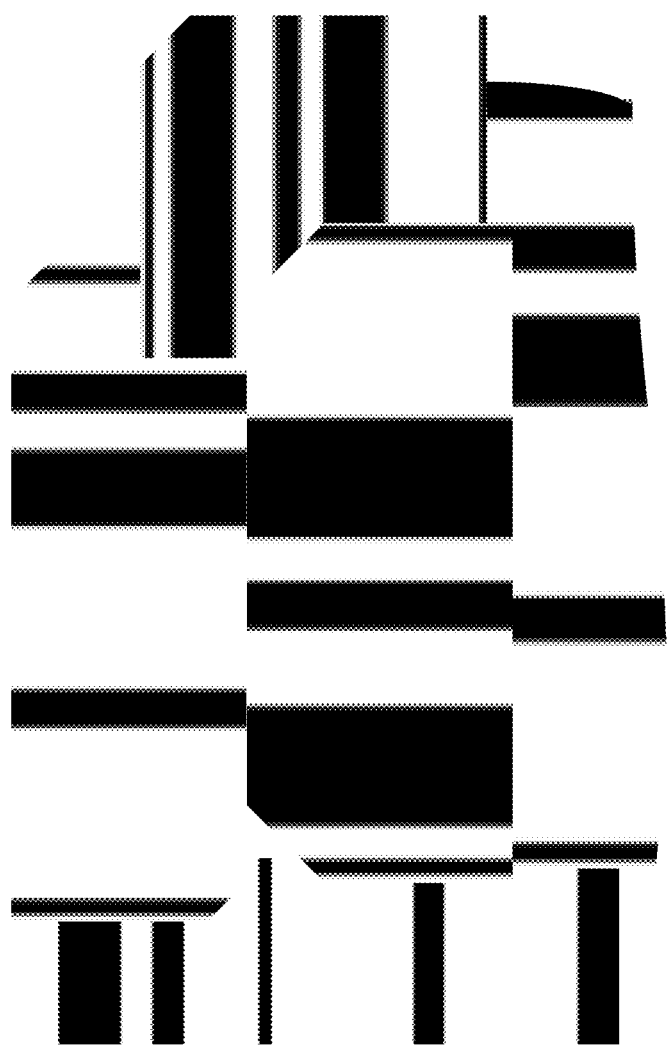

FIGS. 41A, 41B, and 41C illustrate an enhanced embodiment of the present invention for decoding fabric patterns in which repetition of the pattern is not strictly necessary and, when there is repetition, the repeated units can be arbitrarily positioned with respect to one another.

FIG. 41A illustrates a fabric in which there has been embedded, in a manner as discussed above, in two distinct dimensions, a unit of the pattern in accordance with an embodiment of the present invention.

FIG. 41B illustrates another embodiment of a fabric in which the pattern has been altered so that the two distinct components are presented in two distinct horizontal rows and yet, using the processes discussed below in connection with FIG. 42, the pattern remains decodable.

Similarly, FIG. 41C illustrates yet another embodiment of a fabric in which the pattern has been further altered beyond the extent of alteration shown in FIG. 41B, so that the components are presented in a manner having an arbitrarily oriented repetition. In this embodiment, the pattern remains decodable using the processes discussed below in connection with FIG. 42.

Figure 42:
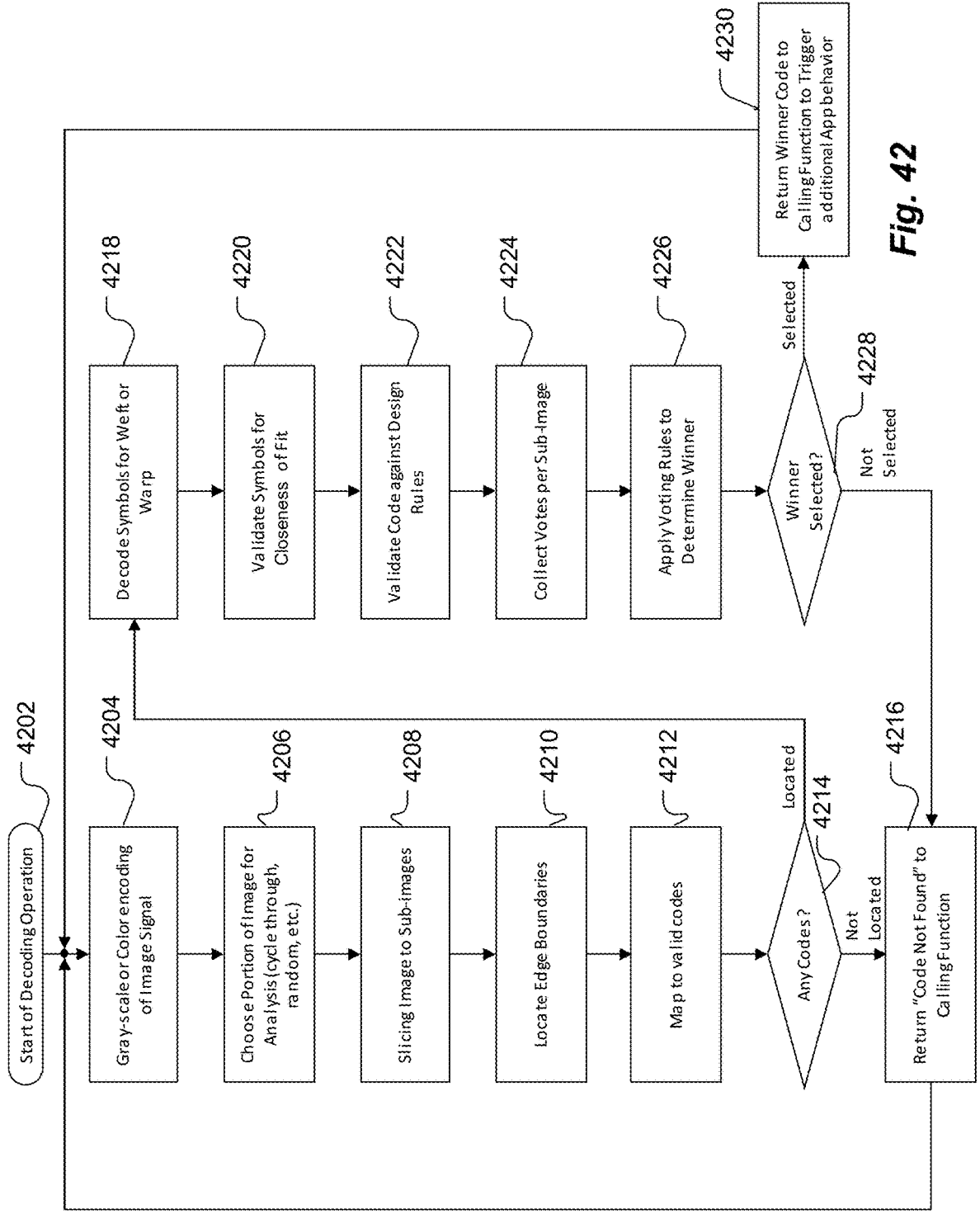
FIG. 42 is a logical flow diagram showing how processing of image data from the fabric pattern is achieved in accordance with the embodiments of FIGS. 41A, 41B, and 41C wherein repetition of the pattern is not necessary and, when there is repetition, the repeated units can be arbitrarily positioned with respect to one another.

FIG. 42 is a logical flow diagram showing how processing of image data from the fabric pattern is achieved in accordance with the embodiments of FIGS. 41A, 41B, and 41C wherein repetition of the pattern is not necessary and, when there is repetition, the repeated units can be arbitrarily positioned with respect to one another. At the start of the decoding process (process 4202), an image of a pattern in fabric has been captured by a camera in a smartphone or by another image capture device. At process 4204, the image is encoded, by a processor coupled to the camera, in grayscale or color. At process 4206, a first portion of the image is chosen for analysis by the processor. The portions can be chosen by the processor at random or cycled through for analysis. At process 4208, the image is sliced into sub-images. Thereafter each sub-image is subject to processing, and the processing of the sub-images can be carried out in parallel. Although we next discuss the process for a given sub-image, this processing is carried out until all sub-images are processed. At process 4210, the processor attempts to locate edge boundaries of the sub-image. At process 4212, the processor attempts to map the edge boundaries into valid codes (which we sometimes call "symbols"). If, at process

4214, one or more codes are located, control passes to process 4218. If, at process 4214, no codes are located, then, at process 4216, the message "Code Not Found" is provided to the calling function and control passes back to the start of the decoding process (process 4202). In some embodiments, the calling function provides the message to the user interface to provoke the user to rescan the image. Note that, in the above embodiments of decoding methods, one or more processes can be removed or added to the methods to achieve an acceptable outcome.

At process 4218, it is determined whether the decoded symbol is for the weft or for the warp. Because this embodiment does not require a fixed set of orientation directions for successful decoding, the directions for weft and warp need not necessarily be constant. In other words, the local directions associated with a warp and a weft of the fabric can vary over at least a portion of the fabric.

At process 4420, the symbols are validated for closeness of fit (to assure that a symbol is not selected that is outside a range of dimensional tolerances for selection) and, at process 4222, the code is validated against design rules by the processor (to assure that selection of a given code complies with system context requirements, such as checksum or other error checking methods). At process 4224, the processor collects "votes" for symbol candidates for each sub-image. (Although up to this point we have discussed the processes as if only a single symbol candidate is presented as part of the decoding processes, in fact the system allows for a plurality of symbol candidates.) Criteria giving rise to selection of a given symbol candidate as the decoded result of a given pattern element are evaluated to produce a number of "votes" or weights in favor of selection of a given symbol candidate.

At process 4226, the processor applies voting rules to determine if there is a winning symbol set. If, at process 4228, a winner is not selected, then control passes to process 4216. If, at process 4228, a winner is selected, then, at process 4230, the winning symbol set is returned to the calling function to trigger additional application behavior. In an embodiment, additional application behavior can include displaying the decoded message of the code on the user interface. In another embodiment, the behavior can include providing the winning code for further processing by, for example, a social media server system. In a further related embodiment, the processor is configured to handle a situation, as illustrated in FIG. 45E, wherein a plurality of distinct patterns are found in a single image; in that case, each pattern is first identified, and then each pattern is subject to separate processing, in each case as described above in connection with FIG. 42.

Figure 43:
FIG. 43 illustrates processes 4204, 4206, and 4208 of FIG. 42, in which the image is converted to gray-scale, a portion of the converted image is chosen for analysis, and then sliced into sub-images.

FIG. 43 illustrates processes 4204, 4206, and 4208 of FIG. 42, in which the image is converted to gray-scale, a portion of the converted image is chosen for analysis, and then sliced into sub-images. In FIG. 43, the superimposed grid lines and diagonal line indicate how the image may be sliced into sub-images.

Figure 44:
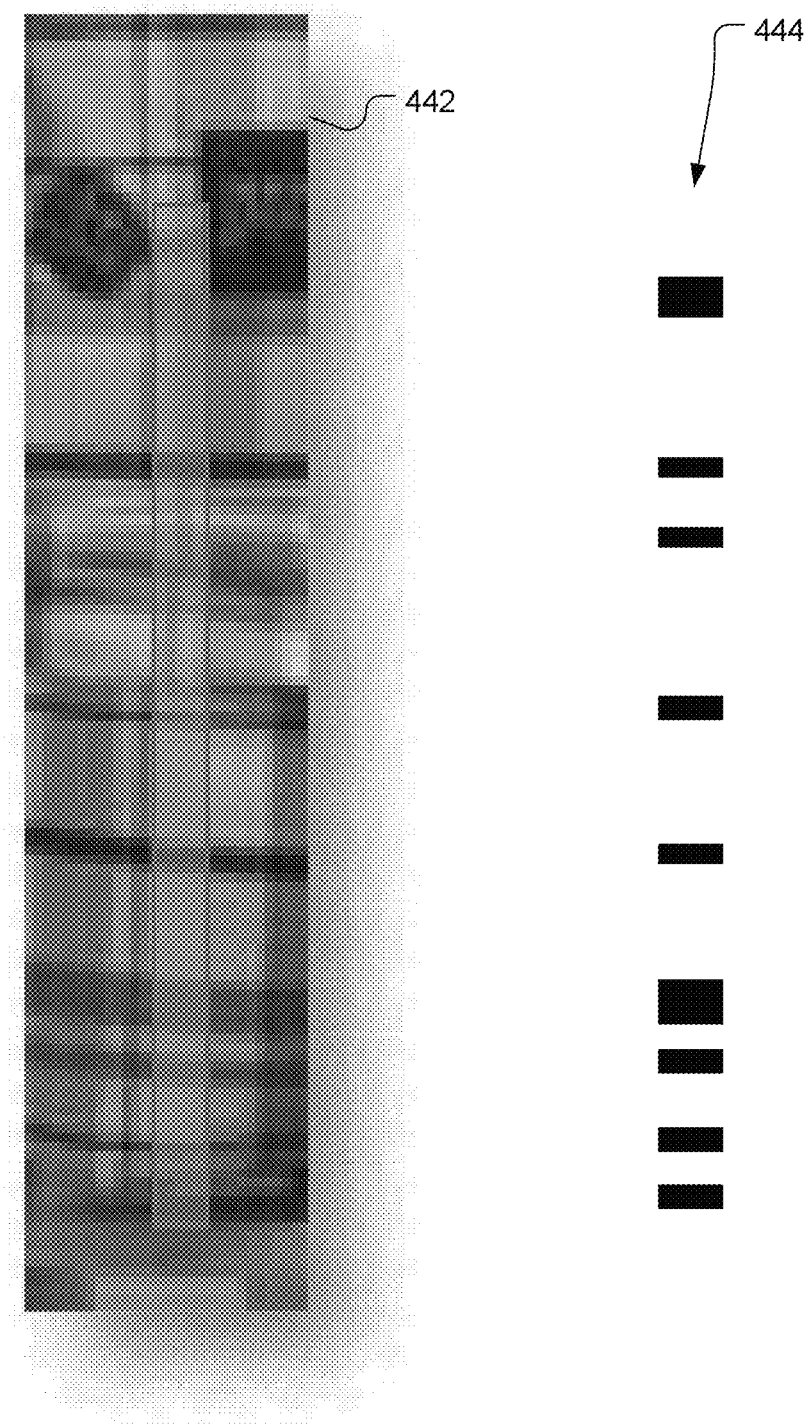
FIG. 44 illustrates processes 4210, 4212, 4214, 4216, 4218, 4220, and 4222, in which parallel processing, carried out for each sub-mage, involves locating edge boundaries, attempting to map the boundaries to valid codes, and, if the mapping is successful, decoding the pattern into a weft or warp symbol as the case may be, validating the resulting symbol for closeness of fit, and further validating the resulting symbol against design rules.

FIG. 44 illustrates processes 4210, 4212, 4214, 4216, 4218, 4220, and 4222, in which parallel processing, carried out for each sub-image, involves locating edge boundaries, attempting to map the boundaries to valid codes, and, if the mapping is successful, decoding the pattern into a weft or warp symbol as the case may be, validating the resulting symbol for closeness of fit, and further validating the resulting symbol against design rules. In FIG. 44, on the left is shown a sub-image 442 and on the right a corresponding set of boundaries 444 determined from the sub-image. These boundaries can be further processed to yield a set of symbol candidates as described previously in connection with FIG. 42.

An example of evaluating the votes provided for symbol candidates is provided in Table 1:

TABLE 1

| Collect results from all sub-image analyses | | Determine winning code if any |
|---|---|---|
| (warp) 044 | 12 votes | ✓ warp = 044 |
| (weft) AD2 | 10 votes | ✓ weft = AD2 |
| (weft) 0FD | 1 vote | |
| (weft) BDD | 2 votes | |
| (warp) 1D1 | 2 votes | |

Exemplary Augmented and Virtual Reality Applications

In various embodiments, one or more image frames capturing one or more encoded articles can be modified based on one or more codes contained in the encoded article(s) to provide an augmented or virtual reality experience. For example, a graphical element can be overlayed over part or all of an image frame, where the graphical element is selected based on one or more codes contained in the encoded article(s). The graphical element can include any type of graphic that can be displayed in an image frame, such as, for example, textual information, a digital image in any suitable format (e.g., gif, tiff, etc.), a computer-generated icon, an avatar, an animation (with or without sound), an "emoji," or other type of graphic. In appropriate contexts, the graphical element may be fixed (e.g., pre-selected and stored) or may be generated or updated in real-time. Multiple graphical elements may be displayed simultaneously based on multiple codes captured in the image frame, e.g., graphical elements for multiple people or items identified in the image frame.

In some embodiments, the owner of an encoded article (e.g., an article of clothing, a backpack, etc.) may be permitted to specify the graphical element to be displayed when the encoded article is captured in one or more image frames. For example, the owner of the encoded article may specify a photograph or avatar to be displayed.

In some embodiments, the graphical element can be interactive. For example, a user may be permitted to select or otherwise interact with a graphical element, e.g., to contact or obtain additional information about the owner of the encoded article associated with the graphical element. Additionally or alternatively, when multiple graphical elements are displayed, the graphical elements can be programmed to interact either under the control of a user or independently in order to provide additional augmented or virtual reality experiences.

In some embodiments, the position and/or size of a graphical element can be updated in real-time, such as to reflect changes across a sequence of image frames (e.g., changes in the position of a person wearing an encoded article). In this respect, the image processor may be configured to identify the location and visible size of a code in each image frame, select an appropriate graphical element based on the code (e.g., obtain a user-specified graphical element from a database), resize the selected graphical element if needed based on the visible size of the code in the image frame, and overlay the selected and optionally resized graphical element on the image frame based on the location of the code in the image frame.

It should be noted that augmented and virtual reality experiences can be used in a wide range of applications, including, without limitation, entertainment applications (e.g., social media and video games), security/tracking applications (e.g., identifying security personnel in security videos), and military applications (e.g. monitoring soldiers on a battlefield).

FIGS. 45A through 45E illustrate examples of augmented reality experiences provided through graphical elements (e.g., names, avatars, text) overlayed on image frames based on codes identified in encoded articles, in accordance with embodiments of the present invention. (In FIGS. 45B through 45E and 46A and B, the names and some of the avatars have been obscured to protect privacy.)

Figure 45A:
FIGS. 45A through 45E illustrate examples of augmented reality experiences provided through graphical elements (e.g., names, avatars, text) overlayed on image frames based on codes identified in encoded articles, in accordance with embodiments of the present invention.
Figure 45B:
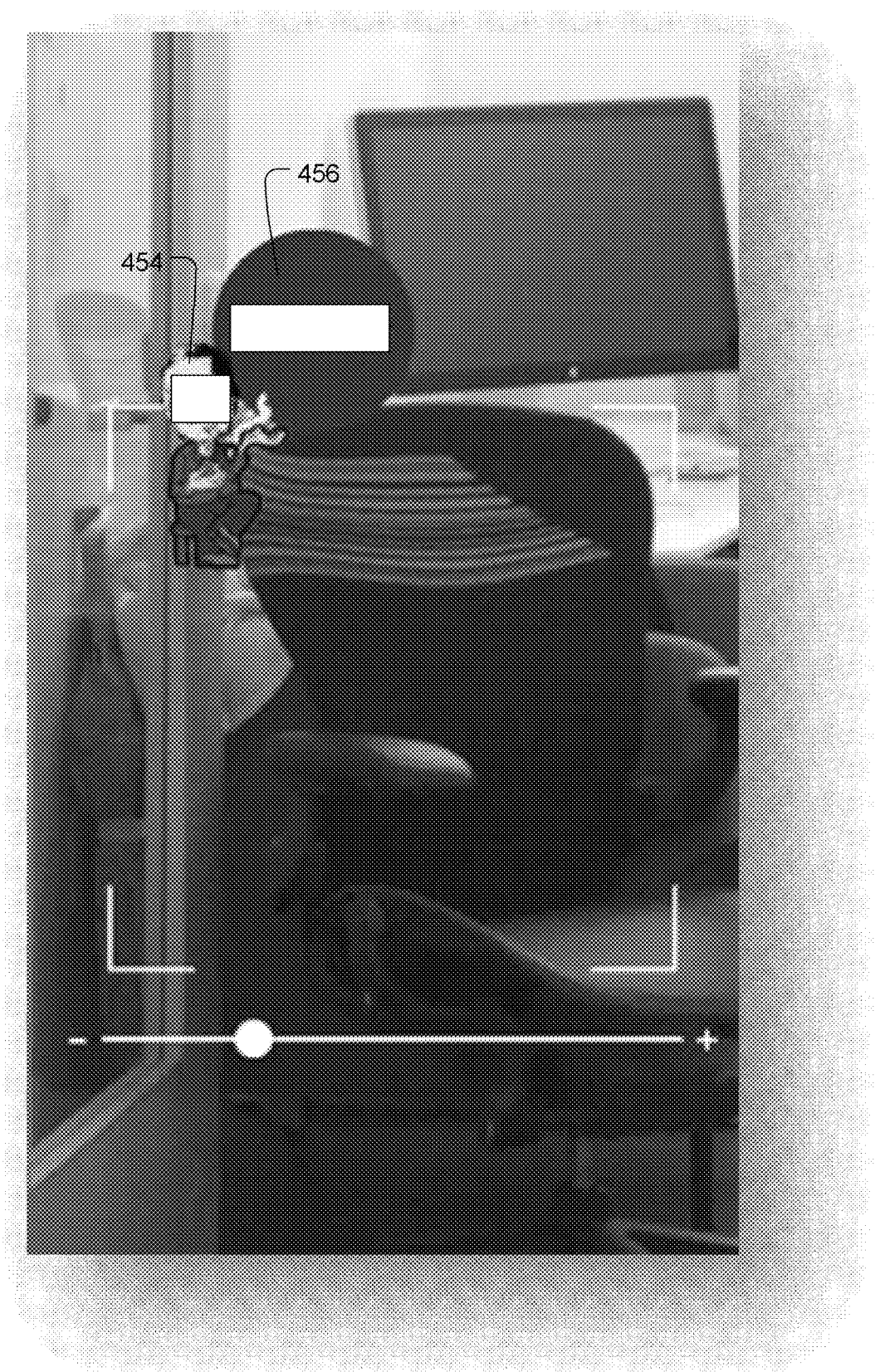

In FIG. 45A, the fabric of a chair is shown to have impressed thereon an encoded pattern 452, and in FIG. 45B, this decoded pattern is used to produce an augmented reality experience in which an avatar 454 and name 456 associated with the code are caused to overlie the image of the pattern.

Figure 45C:
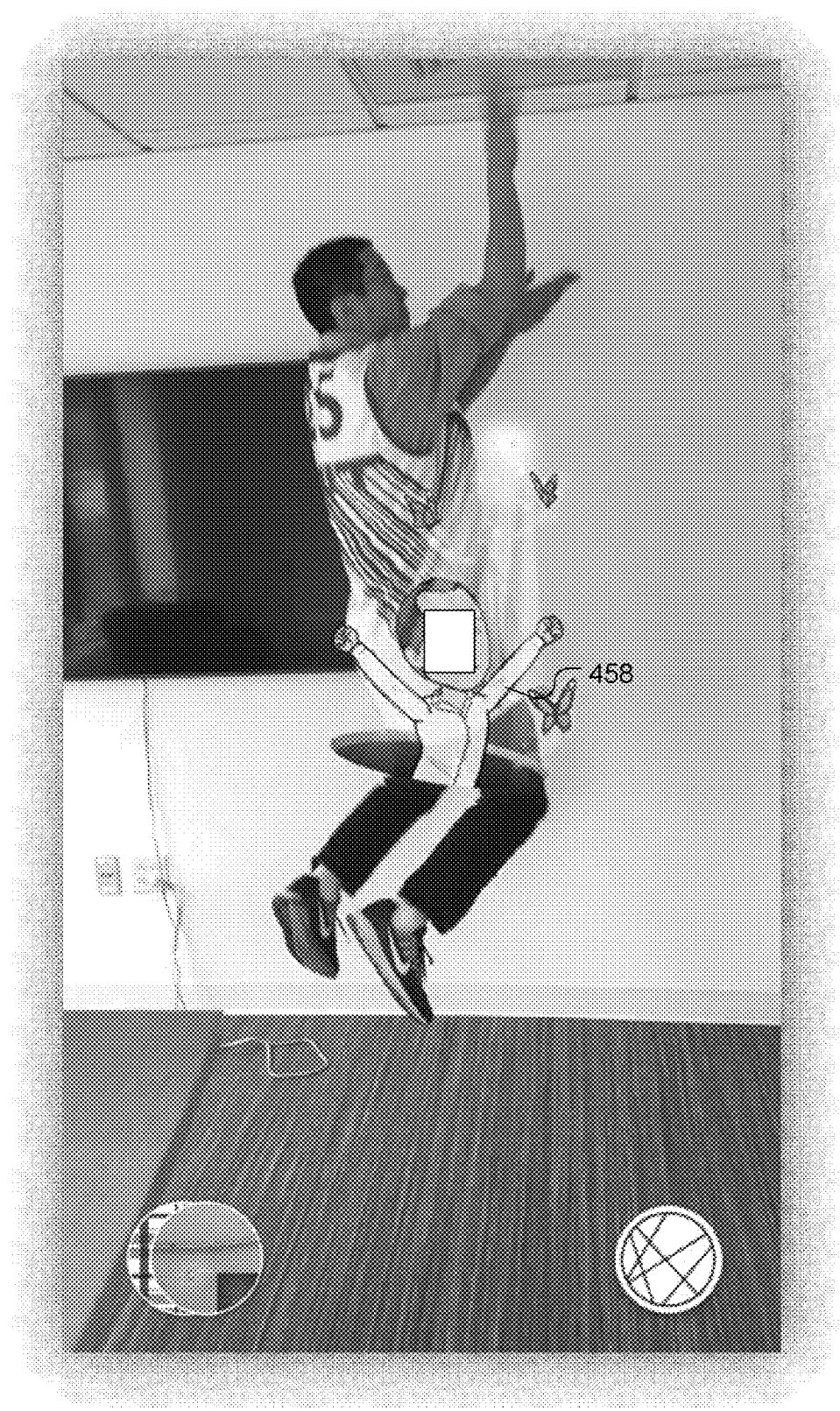

FIG. 45C shows that the avatar 458 can follow the fabric pattern even when the wearer of the fabric is in motion.

Figure 45D:
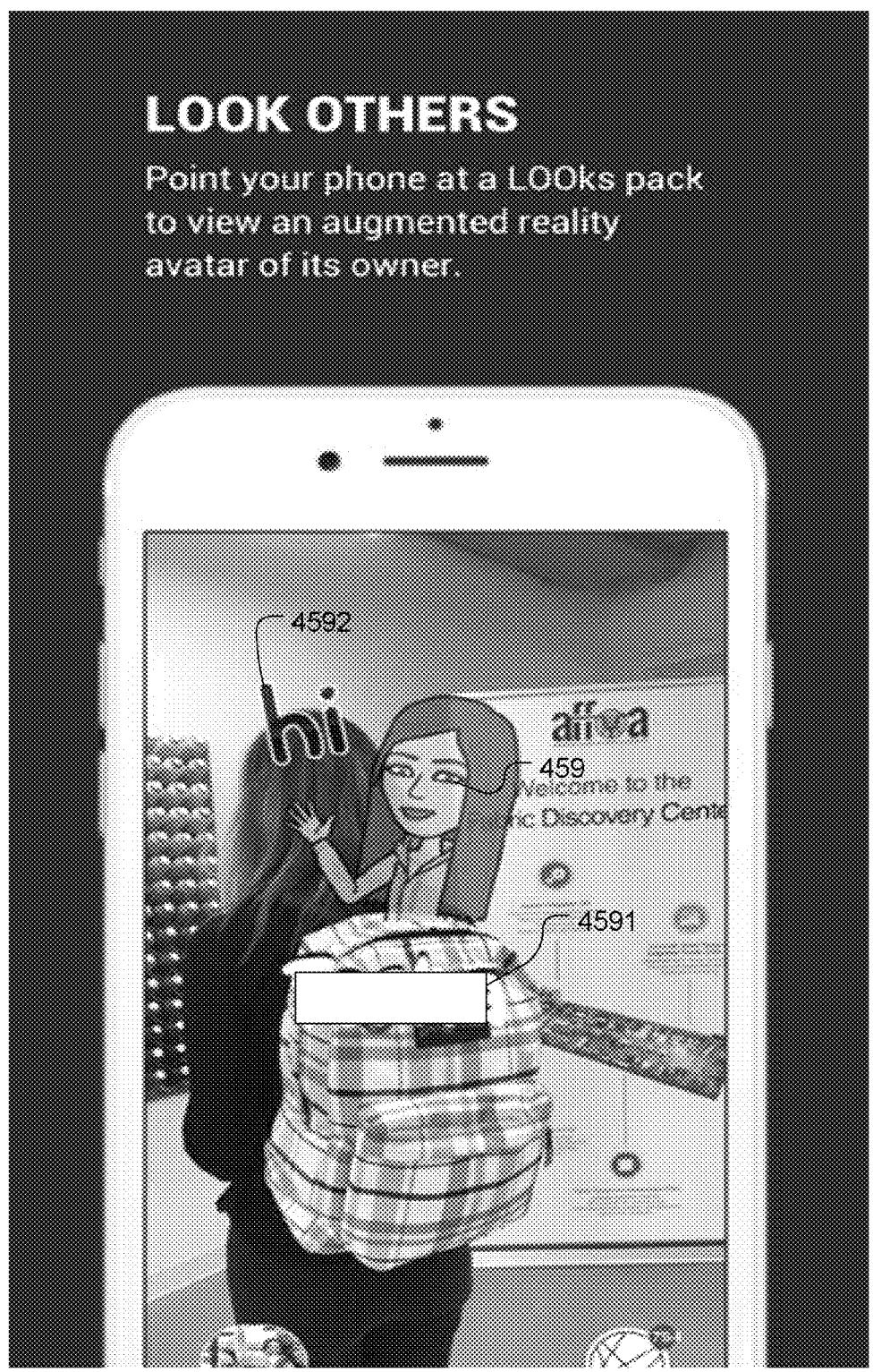
Figure 45E:

In FIG. 45D, the fabric pattern is associated with a backpack and the avatar 459, name 4591, and greeting 4592 are displayed over the pattern of the backpack.

In FIG. 45E, there are present three different backpacks, each with a different pattern, and the augmented reality system overlays on each distinct pattern a distinct name and avatar associated with the distinct pattern.

Figure 46A:
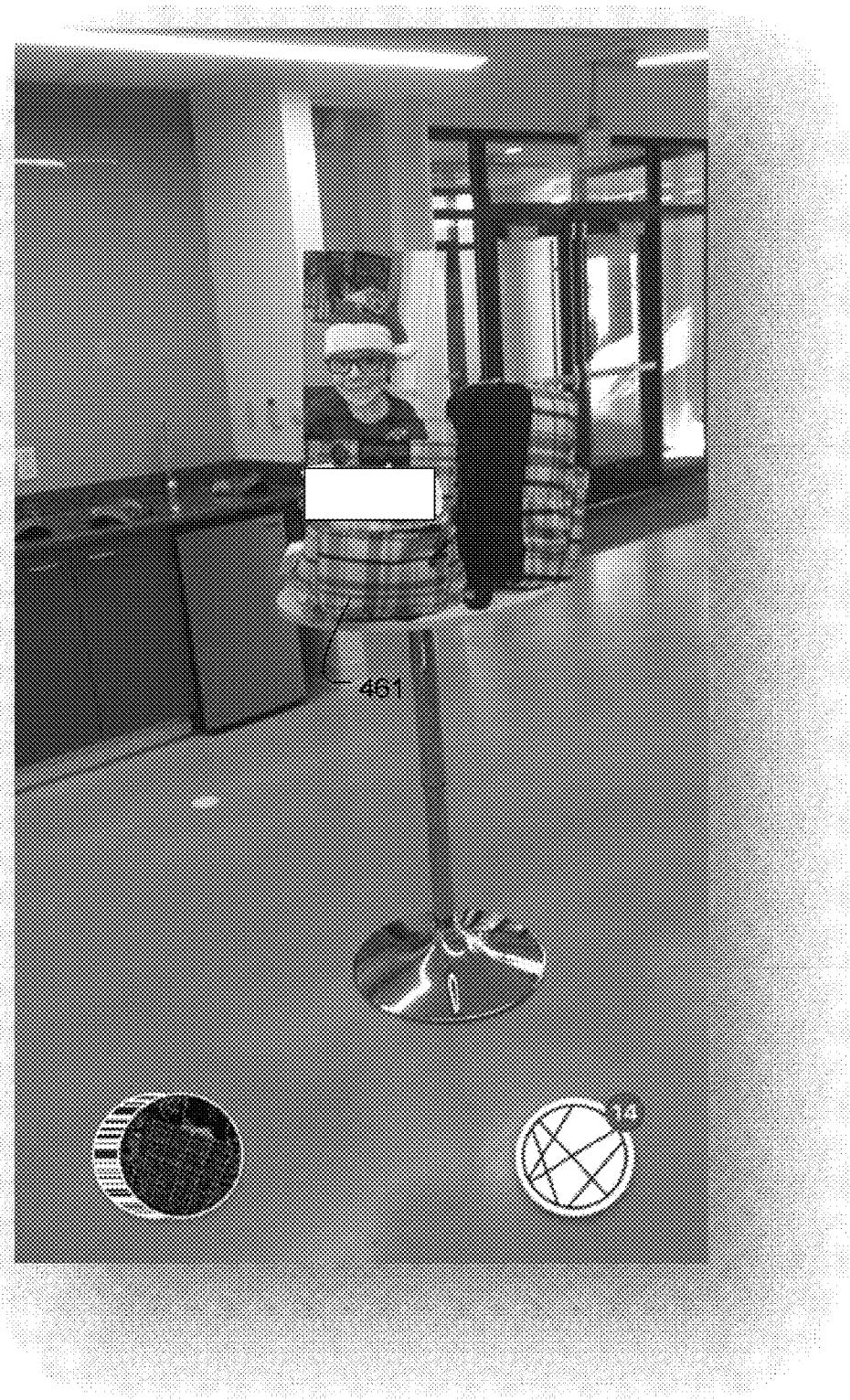
FIGS. 46A and 46B illustrate that, in different image sizes of the patterned backpack (e.g., owing to different distances between the smartphone camera and the backpack or different zoom settings of the smartphone camera), the augmented reality system overlays on the pattern a correspondingly scaled name and avatar associated with the pattern.
Figure 46B:

FIGS. 46A and 46B illustrate that, in different image sizes of the patterned backpack 461 (e.g., owing to different distances between the smartphone camera and the backpack or different zoom settings of the smartphone camera), the augmented reality system overlays on the pattern a correspondingly scaled name and avatar associated with the pattern.

Figure 47:
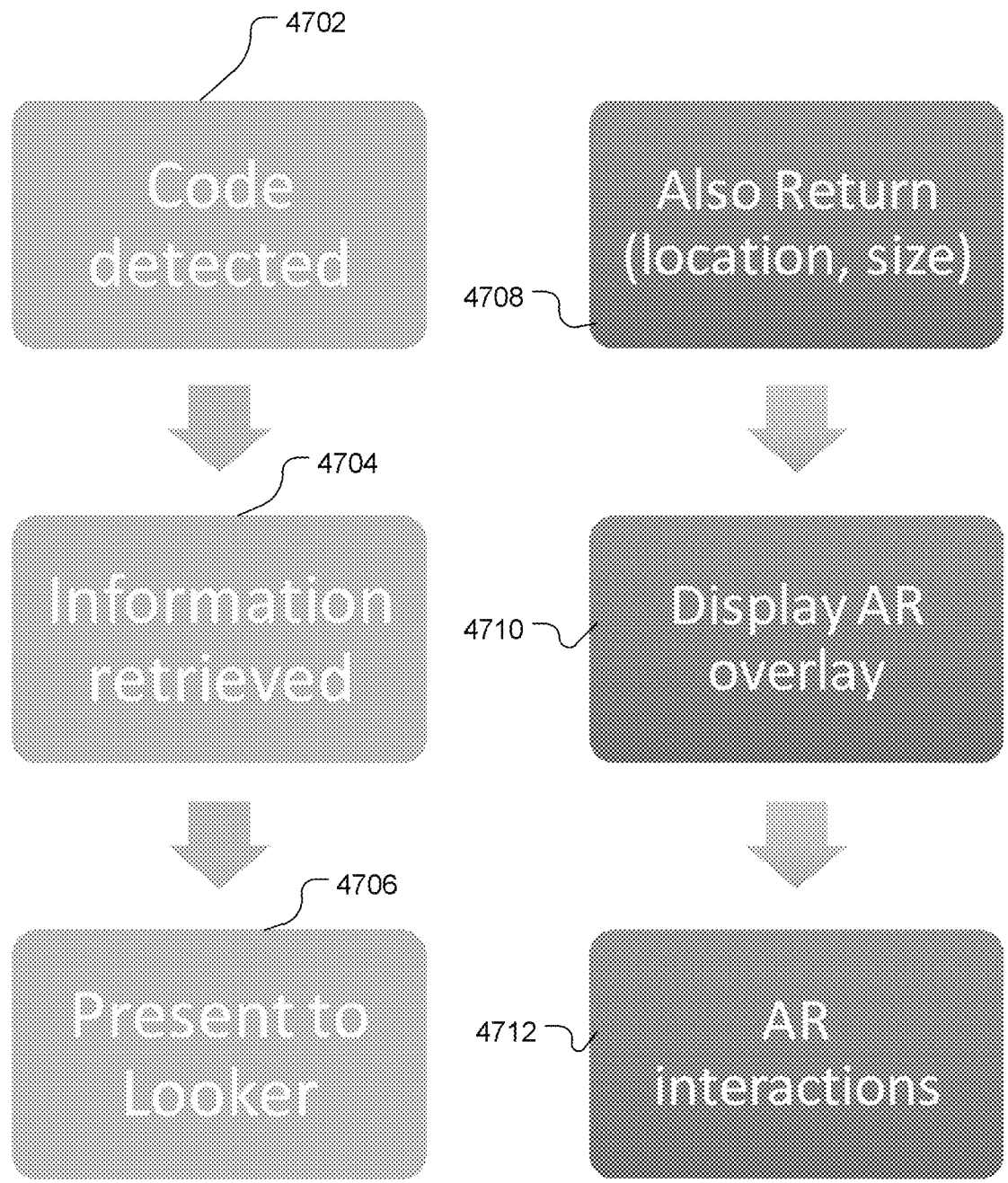
FIG. 47 is a logical flow diagram illustrating processes for a basic encoded pattern system (in the first column) and for an augmented reality system (occupying both columns) in accordance with embodiments of the present invention.

FIG. 47 is a logical flow diagram illustrating processes for a basic encoded pattern system (in the first column) and for an augmented reality system (occupying both columns) in accordance with embodiments of the present invention. The image frame is processed to detect a code in a pattern in the image (in block 4702) and also (in block 4704) to return information such as the location and visual size of the pattern in the image frame. The decoded pattern can be used to retrieve relevant information including the identity of the owner and an owner-selected graphical element (block 4706). For operation of the augmented reality aspect of the system, in processing of the image data, there is returned the location and size of the pattern in block 4708. The owner-selected and optionally resized graphical element can then be overlayed (in block 4710) on the image frame based on the location of the code in the image frame and updated with any augmented or virtual reality interactions (block 4712) that are presented to the user.

Miscellaneous

Aspects of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claim below is also included in the present invention. Likewise, a computer program product including computer executable instructions for executing the process steps in the claims below and stored on a computer readable medium is included within the present invention.

What is claimed is:

1. An article, the article being a selected one of a set of articles, each article of the set associated with a unique identification code, the article comprising:
   a fabric on an exposed surface of the article that is normally visible to an observer when the article is in normal use, the fabric having a pattern, distributed over at least 10% of the exposed surface of the selected article, the pattern encoding the identification code associated with the selected article, wherein the pattern is configured to be readable and decodable by a mobile computing device in a manner wherein the selected article is contextually recognizable, wherein the pattern includes at least one pattern unit having, in a first direction, a first leading strip and a first set of associated data strips and, in a second direction, a second leading strip and a second set of associated data strips, the second direction distinct from the first direction, each data strip of the first set of data strips having a first set of stripes shaped to convey data, each stripe of the first set of stripes defined by a first transition edge from a first color to a second color and a second transition edge from the second color to a third color, the first transition edge having a corresponding distance D1 from the first leading strip and the second transition having a corresponding distance D2 from the first leading strip, wherein D2>D1, and D1 and D2 collectively encode data, each data strip of the second set of data strips having a second set of stripes shaped to convey data, each stripe of the second set of stripes defined by a first transition edge from a first color to a second color and a second transition edge from the second color to a third color, the first transition edge having a corresponding distance D1 from the second leading strip and the second transition having a corresponding distance D2 from the second leading strip, wherein D2>D1, and D1 and D2 collectively encode data.

2. An article according to claim 1, wherein each item of information content in the identification code is represented in the pattern by a set of attributes, each attribute of the set of attributes having a minimum dimension of 1 mm.

3. An article according to claim 1, wherein the exposed surface of the selected article includes a front and a back of the selected article.

4. An article according to claim 1, wherein the pattern includes an error correction code.

5. An article according to claim 1, wherein the pattern encodes a minimum of 24 bits of information comprising the identification code.

6. An article according to claim 1, wherein the pattern is not visually discernible to an ordinary unaided human observer as including the presence of an encoded identification code.

7. An article according to claim 1, wherein the first and second directions correspond to directions associated with a warp and a weft of the fabric respectively, and wherein the warp and weft directions vary over at least a portion of the fabric.

8. An article according to claim 1, wherein the first and second directions are orthogonal to one another.

9. An article according to claim 1, wherein the first set of data strips encodes data distinct from the data encoded by the second set of data strips.

10. An article according to claim 1, wherein each of the first and second leading strips comprises stripes of the first and second color, the first leading strip having a stripe of the first color with a minimum width W1 and the second leading strip having a stripe of the first color with a minimum width W2, wherein W1 does not equal W2.

11. An article according to claim 1, wherein the pattern unit has a dimension of at least 75 mm in the first direction and a dimension of at least 75 mm in the second direction.

12. An article according to claim 1, wherein the pattern includes a plurality of pattern units.

13. An article according to claim 1, wherein the article is an article of clothing.

14. An article according to claim 1, wherein the article is a tangible item.

15. An article according to claim 14, wherein the tangible item is one of a brief case, a backpack, a messenger bag, or a piece of luggage.

16. An article according to claim 1, wherein the pattern is a plaid pattern.

17. An article according to claim 1, wherein the pattern is an argyle pattern.

18. A system comprising:
a plurality of articles, each article being a selected one of a set of articles, each article of the set associated with a unique identification code, each article having a fabric on an exposed surface of the article that is normally visible to an observer when the article is in normal use, the fabric having a pattern, distributed over at least 10% of the exposed surface of the article, the pattern encoding the identification code associated with the article, wherein the pattern is configured to be readable and decodable by a mobile computing device in a manner wherein the selected article is contextually recognizable, wherein the pattern includes at least one pattern unit having, in a first direction, a first leading strip and a first set of associated data strips and, in a second direction, a second leading strip and a second set of associated data strips, the second direction distinct from the first direction, each data strip of the first set of data strips having a first set of stripes shaped to convey data, each stripe of the first set of stripes defined by a first transition edge from a first color to a second color and a second transition edge from the second color to a third color, the first transition edge having a corresponding distance D1 from the first leading strip and the second transition having a corresponding distance D2 from the first leading strip, wherein D2>D1, and D1 and D2 collectively encode data, each data strip of the second set of data strips having a second set of stripes shaped to convey data, each stripe of the second set of stripes defined by a first transition edge from a first color to a second color and a second transition edge from the second color to a third color, the first transition edge having a corresponding distance D1 from the second leading strip and the second transition having a corresponding distance D2 from the second leading strip, wherein D2>D1, and D1 and D2 collectively encode data.

19. A system according to claim 18, further comprising:
a scanner configured to capture an image including at least a portion of the article and to decode the pattern to recover the unique identification code associated with the article.

20. A system according to claim 19, wherein the scanner comprises a mobile computing device.

* * * * *